(12) United States Patent
Gray

(10) Patent No.: US 8,024,068 B2
(45) Date of Patent: Sep. 20, 2011

(54) MACHINE TOOL CONTROL SYSTEM

(75) Inventor: Paul J. Gray, Indianapolis, IN (US)

(73) Assignee: Hurco Companies, Inc., Indianapolis, IN (US)

(*) Notice: Subject to any disclaimer, the term of this patent is extended or adjusted under 35 U.S.C. 154(b) by 475 days.

(21) Appl. No.: 11/833,958

(22) Filed: Aug. 3, 2007

(65) Prior Publication Data

US 2008/0058982 A1    Mar. 6, 2008

Related U.S. Application Data

(60) Provisional application No. 60/821,523, filed on Aug. 4, 2006, provisional application No. 60/821,503, filed on Aug. 4, 2006.

(51) Int. Cl.
| | |
|---|---|
| G05B 19/18 | (2006.01) |
| G05B 15/00 | (2006.01) |
| G06F 19/00 | (2006.01) |
| G05B 19/418 | (2006.01) |
| G06K 9/00 | (2006.01) |

(52) U.S. Cl. ........ 700/252; 382/153; 700/159; 700/186; 700/245; 700/248; 700/262; 700/275

(58) Field of Classification Search .......... 700/159, 700/252, 245, 262, 248, 275, 258, 186; 382/153
See application file for complete search history.

(56) References Cited

U.S. PATENT DOCUMENTS

| | | | |
|---|---|---|---|
| 3,576,979 A | 5/1971 | McCall et al. | |
| 3,602,090 A | 8/1971 | Whetham | |
| 3,656,124 A * | 4/1972 | McGee | 700/275 |
| 3,679,955 A | 7/1972 | Rhoades | |
| 3,728,595 A | 4/1973 | Adams | |
| 3,838,258 A | 9/1974 | Logan | |
| 3,849,712 A | 11/1974 | Lankford et al. | |
| 3,860,805 A | 1/1975 | Strukel | |
| 3,882,304 A | 5/1975 | Walters | |
| 4,055,787 A | 10/1977 | Beadle et al. | |
| 4,130,788 A | 12/1978 | Fiegehen et al. | |
| 4,131,837 A | 12/1978 | Whetham | |
| 4,208,718 A | 6/1980 | Chung | |
| 4,415,867 A | 11/1983 | Rubin | |
| 4,433,382 A | 2/1984 | Cunningham et al. | |
| 4,477,754 A | 10/1984 | Roch | |

(Continued)

FOREIGN PATENT DOCUMENTS

EP    0672507    9/1995

(Continued)

OTHER PUBLICATIONS

Mangla-S., "Interpolation Algorithms for Machine Parametric Curves", 2003, Masters Thesis, Dept. of Mechanical Engineering,Thapar Institute of Engineering & Technology, p. 1-59.*

(Continued)

*Primary Examiner* — Albert Decady
*Assistant Examiner* — Thomas H Stevens
(74) *Attorney, Agent, or Firm* — Baker & Daniels LLP

(57) ABSTRACT

The present disclosure includes a generalized kinematics library which may be used to control the motion of a machine tool system and to process data for other applications, such as simulation graphics. Methods are disclosed to interpolate the movement of various axes of a machine tool system through a machine singularity point.

30 Claims, 24 Drawing Sheets

U.S. PATENT DOCUMENTS

| | | | |
|---|---|---|---|
| 4,490,781 A | 12/1984 | Kishi et al. | |
| 4,501,998 A | 2/1985 | Nozawa et al. | |
| 4,542,471 A | 9/1985 | Inaba et al. | |
| 4,543,625 A | 9/1985 | Nozawa et al. | |
| 4,571,686 A | 2/1986 | Torisawa | |
| 4,590,573 A | 5/1986 | Hahn | |
| 4,616,326 A | 10/1986 | Meier et al. | |
| 4,623,971 A * | 11/1986 | Ailman et al. | 700/252 |
| 4,626,756 A | 12/1986 | Inaba et al. | |
| 4,635,206 A | 1/1987 | Bhatia et al. | |
| 4,697,239 A * | 9/1987 | Sicard et al. | 700/113 |
| 4,723,203 A | 2/1988 | Kishi et al. | |
| 4,728,872 A | 3/1988 | Kishi et al. | |
| 4,739,488 A | 4/1988 | Asakura | |
| 4,750,105 A | 6/1988 | Ohkawa et al. | |
| 4,763,276 A | 8/1988 | Perreirra et al. | |
| 4,777,603 A * | 10/1988 | Woodman et al. | 700/159 |
| 4,791,575 A * | 12/1988 | Watts et al. | 700/194 |
| 4,797,825 A | 1/1989 | Shimanuki et al. | |
| 4,833,617 A | 5/1989 | Wang | |
| 4,835,710 A * | 5/1989 | Schnelle et al. | 700/262 |
| 4,878,172 A | 10/1989 | Matsumura | |
| 4,884,373 A | 12/1989 | Suzuki et al. | |
| 4,897,964 A * | 2/1990 | Vetter | 451/72 |
| 4,901,220 A | 2/1990 | Matsumura et al. | |
| 4,908,555 A | 3/1990 | Ikeda et al. | |
| 4,926,311 A | 5/1990 | Matsumura et al. | |
| 4,951,338 A * | 8/1990 | Brown et al. | 12/77 |
| 4,959,597 A | 9/1990 | Kawamura et al. | |
| 4,963,805 A | 10/1990 | Suzuki et al. | |
| 4,973,895 A | 11/1990 | Torii et al. | |
| 5,028,855 A | 7/1991 | Distler et al. | |
| 5,060,164 A | 10/1991 | Yoneda et al. | |
| 5,062,755 A | 11/1991 | Lawrence et al. | |
| 5,089,950 A | 2/1992 | Miyata et al. | |
| 5,091,861 A | 2/1992 | Geller et al. | |
| 5,117,169 A | 5/1992 | Kakino et al. | |
| 5,134,570 A | 7/1992 | Nankaku | |
| 5,177,421 A | 1/1993 | Sasaki et al. | |
| 5,179,514 A | 1/1993 | Rastegar et al. | |
| 5,198,984 A | 3/1993 | Yamaguchi et al. | |
| 5,247,447 A | 9/1993 | Korncoff et al. | |
| 5,278,766 A | 1/1994 | Takashashi | |
| 5,287,049 A | 2/1994 | Olomski et al. | |
| 5,288,209 A | 2/1994 | Therrien et al. | |
| 5,334,918 A | 8/1994 | McMurtry et al. | |
| 5,339,249 A | 8/1994 | Schaeffer | |
| 5,369,592 A | 11/1994 | Honda | |
| 5,375,064 A | 12/1994 | Bollinger | |
| 5,378,091 A | 1/1995 | Nakamura | |
| 5,378,218 A | 1/1995 | Daimaru et al. | |
| 5,402,367 A | 3/1995 | Sullivan et al. | |
| 5,453,933 A | 9/1995 | Wright et al. | |
| 5,471,395 A | 11/1995 | Brien | |
| 5,473,532 A | 12/1995 | Unno et al. | |
| 5,493,502 A | 2/1996 | Niwa | |
| 5,508,596 A | 4/1996 | Olsen | |
| 5,544,046 A | 8/1996 | Niwa | |
| 5,548,195 A | 8/1996 | Doran | |
| 5,563,484 A | 10/1996 | Otsuki et al. | |
| 5,604,677 A | 2/1997 | Brien | |
| 5,668,459 A | 9/1997 | Kim | |
| 5,682,319 A | 10/1997 | Boland et al. | |
| 5,687,084 A | 11/1997 | Wertz | |
| 5,691,909 A * | 11/1997 | Frey et al. | 700/159 |
| 5,723,961 A | 3/1998 | Fujino et al. | |
| 5,751,589 A | 5/1998 | Sato et al. | |
| 5,798,928 A | 8/1998 | Niwa | |
| 5,815,400 A | 9/1998 | Hirai et al. | |
| 5,825,017 A | 10/1998 | Pryor | |
| 5,827,020 A | 10/1998 | Fujita et al. | |
| 5,828,574 A | 10/1998 | Robinson et al. | |
| 5,844,804 A | 12/1998 | Schussler | |
| 5,871,391 A | 2/1999 | Pryor | |
| 5,892,345 A | 4/1999 | Olsen | |
| 5,917,726 A | 6/1999 | Pryor | |
| 5,919,012 A | 7/1999 | Nakagawa et al. | |
| 5,926,389 A | 7/1999 | Trounson | |
| 5,946,449 A | 8/1999 | Dickerson et al. | |
| 5,991,528 A | 11/1999 | Taylor et al. | |
| 6,019,554 A | 2/2000 | Hong | |
| 6,052,628 A | 4/2000 | Hong | |
| 6,064,168 A | 5/2000 | Tao et al. | |
| 6,135,857 A | 10/2000 | Shaw et al. | |
| 6,163,735 A | 12/2000 | Yamada et al. | |
| 6,242,880 B1 | 6/2001 | Hong | |
| 6,310,621 B1 | 10/2001 | Gagne et al. | |
| 6,317,646 B1 | 11/2001 | de Caussin et al. | |
| 6,330,483 B1 | 12/2001 | Dailey | |
| 6,350,222 B2 | 2/2002 | Susnjara | |
| 6,368,879 B1 | 4/2002 | Toprac | |
| 6,400,998 B1 | 6/2002 | Yamazaki et al. | |
| 6,401,004 B1 | 6/2002 | Yamazaki et al. | |
| 6,427,098 B1 | 7/2002 | Alverson et al. | |
| 6,438,445 B1 | 8/2002 | Yoshida et al. | |
| 6,456,897 B1 | 9/2002 | Papiermik et al. | |
| 6,470,225 B1 | 10/2002 | Yutkowitz | |
| 6,493,602 B1 | 12/2002 | Kranitzky et al. | |
| 6,521,856 B1 | 2/2003 | Marchesi et al. | |
| 6,535,788 B1 | 3/2003 | Yoshida et al. | |
| 6,536,317 B2 | 3/2003 | Yamazaki et al. | |
| 6,587,747 B2 | 7/2003 | Hirai et al. | |
| 6,597,142 B2 | 7/2003 | Shibukawa et al. | |
| 6,643,563 B2 | 11/2003 | Hosek et al. | |
| 6,671,571 B1 | 12/2003 | Matsumiya et al. | |
| 6,675,061 B2 | 1/2004 | Hirai et al. | |
| 6,704,611 B2 | 3/2004 | Coleman et al. | |
| 6,766,216 B2 | 7/2004 | Erichsen et al. | |
| 6,772,038 B2 | 8/2004 | Kadono | |
| 6,774,598 B1 | 8/2004 | Kohler et al. | |
| 6,775,586 B2 | 8/2004 | Shibata et al. | |
| 6,782,306 B2 | 8/2004 | Yutkowitz | |
| 6,795,749 B2 | 9/2004 | Suh et al. | |
| 6,804,575 B2 | 10/2004 | Sagawa et al. | |
| 6,845,295 B2 * | 1/2005 | Cheng et al. | 700/245 |
| 6,850,806 B2 | 2/2005 | Yutkowitz | |
| 6,865,499 B2 | 3/2005 | Yutkowitz | |
| 6,879,874 B2 | 4/2005 | Sinn | |
| 6,920,408 B2 | 7/2005 | Yutkowitz | |
| 6,922,606 B1 | 7/2005 | Yutkowitz | |
| 6,957,121 B2 | 10/2005 | Lottgen et al. | |
| 6,999,841 B1 | 2/2006 | Rutkowski | |
| 7,012,395 B2 | 3/2006 | Haunerdinger et al. | |
| 7,016,763 B2 | 3/2006 | Fauser et al. | |
| 7,050,883 B2 | 5/2006 | Cho et al. | |
| 7,096,087 B2 | 8/2006 | Sagawa et al. | |
| 7,462,490 B2 * | 12/2008 | Wollenberg et al. | 436/60 |
| 7,847,506 B2 | 12/2010 | Ogawa | |
| 7,853,351 B2 | 12/2010 | Corey | |
| 7,869,897 B2 | 1/2011 | Otsuki et al. | |
| 2002/0100659 A1 * | 8/2002 | Carmichael | 194/201 |
| 2003/0065424 A1 | 4/2003 | Erichsen et al. | |
| 2003/0171847 A1 | 9/2003 | Cheng et al. | |
| 2003/0204285 A1 | 10/2003 | Thomas et al. | |
| 2004/0181305 A1 | 9/2004 | Hertinger | |
| 2005/0049743 A1 | 3/2005 | Fauser et al. | |
| 2005/0055323 A1 | 3/2005 | Zetek et al. | |
| 2005/0085940 A1 | 4/2005 | Griggs et al. | |
| 2005/0188309 A1 | 8/2005 | Tasker et al. | |
| 2005/0190185 A1 | 9/2005 | Fauser et al. | |
| 2005/0199424 A1 * | 9/2005 | Stump et al. | 175/45 |
| 2005/0246052 A1 | 11/2005 | Coleman et al. | |
| 2005/0251030 A1 | 11/2005 | Azar | |
| 2005/0256604 A1 | 11/2005 | Diehi et al. | |
| 2006/0149410 A1 | 7/2006 | Erichsen et al. | |
| 2006/0271241 A1 | 11/2006 | Freeman | |
| 2007/0061037 A1 | 3/2007 | Grossmann et al. | |
| 2008/0091295 A1 | 4/2008 | Corey | |

FOREIGN PATENT DOCUMENTS

| | | |
|---|---|---|
| EP | 1168128 | 1/2002 |
| EP | 1300739 | 4/2003 |
| EP | 1850198 A2 * | 10/2007 |
| JP | 57114325 | 7/1982 |
| JP | 62130130 | 6/1987 |
| WO | WO9222023 | 12/1992 |

OTHER PUBLICATIONS

Aronson-R.B., "Spindles are the Key to HSM" 2004, Manufacturing Engineering. p. 1-6.*

Liu et al., "Coordinare Control of Energy-Saving Programmable Values" 2003 ASME International Mechanical Engineering Congress. p. 1-9.*

Zhanag et al.,"Web-based Remote Manipulation in Advanced Manufacturing System", 2005, IEEE business networks. p. 1-7.*

Yao Y et al: "VMMC: A Test-Bed for Machining" Computers in Industry, Mar. 3, 2002, pp. 255-268, vol. 47 No. 3, Elevier Science Publishers, Amsterdam, NL.

Yoonho Seo et al.: "Structure Modeling Of Machine Tools and Internet-Based Implementation" Winter Simulation Conference, 2005 Proceedings of the Dec. 4, 2005, pp. 1699-1704, Piscataway, NJ, USA, IEEE.

International Search Report and Written Opinion for PCT/US2007/075270, 17 pages.

Bullock, T., "Motion Control and Industrial Controllers," Motion Control, Sep./Oct. 1990, p. 1-5.

"Automated Manufacturing Inspection System," NTIS Tech Notes, U.S. Department of Commerce, Springfield, VA, Feb. 1, 1991, p. 179, 1&2.

Imamura, Fumihiko and Kaufman, Howard, "Time Optimal Contour Tracking for Machine Tool Controllers," IEEE Control Systems, Apr. 1991, p. 11-17.

Berthiaume, D., "Justification for AC vs. DC Drive Systems," Pulp and Paper Industry Technical Conference, Conference Record of 1991 Annual Volume, Jun. 3-7, 1991, pp. 234-238.

Chuang, Hua-Yi and Liu, Chang-Huan, "A Model-Referenced Adaptive Control Strategy for Improving Contour Accuracy of Multiaxis Machine Tools," IEEE Transactions on Industry Applications, vol. 28., No. 1., Jan./Feb. 1992, p. 221-227.

Bullock, T., "Linear and Circular Interpolation," Motion Control, Apr. 1992, p. 40-41.

Wilson, C., "How Close Do You Have to Specify Points in a Contouring Application?", Motion Control, May 1993.

Goto, Satoru and Nakamura, Masatoshi, "Accurate Contour Control of Mechatronic Servo Systems Using Gaussian Networks," IEEE Transactions on Industrial Electronics, vol. 43., No. 4, Aug. 1996, p. 469-476.

Yeh, Zong-Mu, "Cross-Coupled Fuzzy Logic Control for Biaxial Servomechanisms," IEEE 1996, p. 1184-1190.

Lee, Je-Hie, Huh, Uk-Youl and Park, Ho-Joon, "Improved Contouring Control for Multi-Axis System with Two-Degrees-of-Freedom Structure," International Symposium on Industrial Electronics (ISIE), Guimaraes, Portugal, pp. 901-905, 1997.

Yeh, Syh-Shiuh and Hsu, Pau-Lo, "Theory and Applications of the Robust Cross-Coupled Control Design" Proceedings of the American Control Conference, Albuquerque, New Mexico, Jun. 1997, p. 791-795.

Li, Perry Y., "Coordinated Contour Following Control for Machining Operations—A Survey," Proceedings of the American Control Conference, San Diego, California, Jun. 1999, p. 4543-4547.

Lee, Hyun C. and Jeon, Gi J, "Real-time Compensation of Two-dimensional Contour Error in CNC Machine Tools," Proceedings of the 1999 IEEE/ASME International Conference on Advanced Intelligent Mechatronics, Sep. 19-23, 1999, Atlanta, USA, p. 623-628.

Lacerda, Helder Barbieri and Belo, Eduardo Morgado, "A Modified Contour Error Controller for a High Speed XY Table," Journal of the Brazilian Society of Mechanical Sciences, vol. 22., No. 3, pp. 443-455, 2000.

Yeh, Syh-Shiuh and Hsu, Pau-Lo, "A New Approach to Biaxial Cross-coupled Control," Proceedings of the 2000 IEEE, International Conference on Control Applications, Anchorage, Alaska USA, Sep. 25-27, 2000, p. 168-173.

Chiu, George T.-C., and Tomizuka, Masayoshi, "Contouring Control of Machine Tool Feed Drive Systems: A Task Coordinate Frame Approach," IEEE Transactions on Control Systems Technology, vol. 9, No. 1., Jan. 2001, p. 130-139.

Yeh, Syh-Shiuh and Hsu, Pau-Lo, "Estimation of the Contouring Error Vector for the Cross-Coupled Control Design," IEEE/ASME Transactions on Mechatronics, vol. 7., No. 1., Mar. 2002, p. 44-51.

Chen, Shyh-Leh, Liu, Hung-Liang and Ting, Sing Ching, "Contouring Control of Biaxial Systems Based on Polar Coordinates," IEEE/ASME Transactions on Mechatronics, vol. 7., No. 3., Sep. 2002, p. 329-345.

Hsieh, Chen-Chou, Wang, An-Ping and Hsu, Pau-Lo, "Can-Based Motion Control Design," SICE Annual Conference in Fukui, Aug. 4-6, 2003, Fukui University, Japan, p. 2504-2509.

Wang, Lisong and Zhang, Jing, "The Research of Static De-coupled Contour Control Technique of the Ultra-precision Machine Tool, Proceedings of the 5th World Congress on the Intelligent Control and Automation," Jun. 15-19, 2004 Hangzhou, China, p. 4508-4511.

Xiao, Yong, Zhu, Kuanyi and Liaw, Hwee Choo, "Generalized Synchronization Control of Multi-axis Motion Systems," www.sciencedirect.com, Control Engineering Practice, vol. 13, pp. 809-819, 2005.

John Kieffer, Aidan J. Cahill, and Matthew R. James, "Robust and Accurate Time-Optimal Path-Tracking Control for Robot Manipulators," IEE Transactions on Robotics and Automation, vol. 13, No. 6, Dec. 1997, p. 880-890.

John Kieffer, Aidan J. Cahill, and Matthew R. James, "Time-Opitamal Path Tracking to a Specified tolerance in the Presence of Plant Uncertaintu," Australian National University, p. 31-35.

L.M. Galantucci, L. Tricarico, and A Dersha, "Automatic Clamping Selection in Process Planning using Tolerance Verification Algorithms," Advanced Manufacturing Systems and Technology, Springer Verlag, Wein, New York, 1996, 8 pages.

Ales Hace, et al., "Rubust Motion Control and Trajectory Planning for Planar Laser Cutting System," IEEE Advanced Motion Control Proceedings Coimbra, 1998, p. 1-7.

Hong C. Zhang and J. Mei, "Automated Tolerance Anaysis for CAPP System," International Journal of Advance Manufacturing Technology, 10:219-224, 1995.

Parimal Kopardekar and Sam Anand, "Tolerance Allocation using Neural Networks," International Journal of Advance Manufacturing Technology, 10:269-276, 1995.

M.M. Sfantiskopoulos, et al., "Concurrent Dimensioning for Accuracy and Cost," International Journal of Advance Manufacturing Technology, 10:236-268m 1995.

O.H. Chai, et al., "An Interpolation Scheme for Tool-Radius Compensated Parabolic Paths for CNC," IIE Transactions, 28:11-17, 1996.

Y.D. Chen, J. Ni, and S.M. Wu, "Real-Time CNC Tool Path Generation for Machining IGES Surfacs," Transactions of the ASME, vol. 115, Nov. 1993.

G.S. Li, et al., "In-Process Drilling States Monitoring in Machine Centre By Time Series Analysis," International Conference on Manufacturing Autmation, vol. 1712, 1992, 13 pages.

International Search Report and Written Opinion for PCT/US2010/051408 (18 pages).

International Search Report and Written Opinion for PCT/US2007/075274, 14 pages.

Office Action from Taiwan Patent Office for Application No. 096128900 Dated Jan. 28, 2011 (3 pgs.).

Office Action from Taiwan Patent Office for Application No. 096128899 Dated Jan. 28, 2011 (8 pgs.).

* cited by examiner

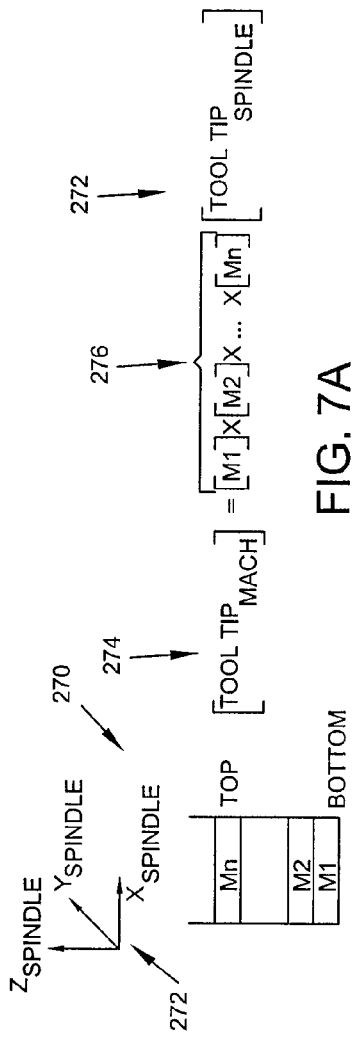
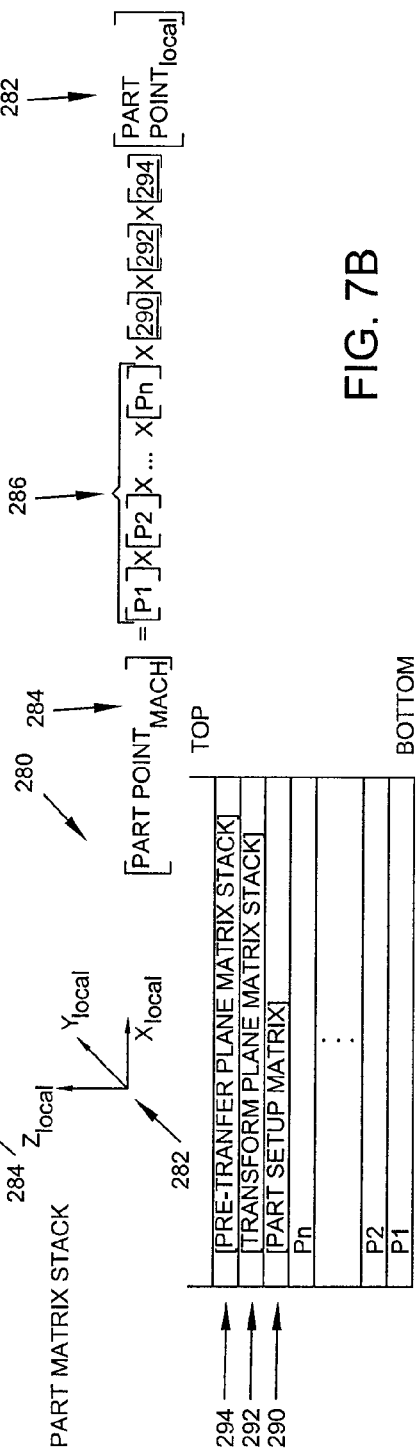
FIG. 7A
FIG. 7B

442 – TOOL VECTOR • TILT AXIS
444 – TOOL VECTOR • CROSS VECTOR 0
446 – PROJ. TOOL VECTOR

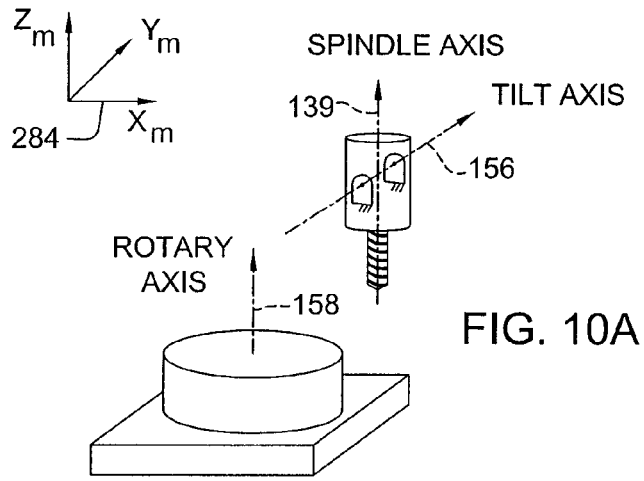
FIG. 10A
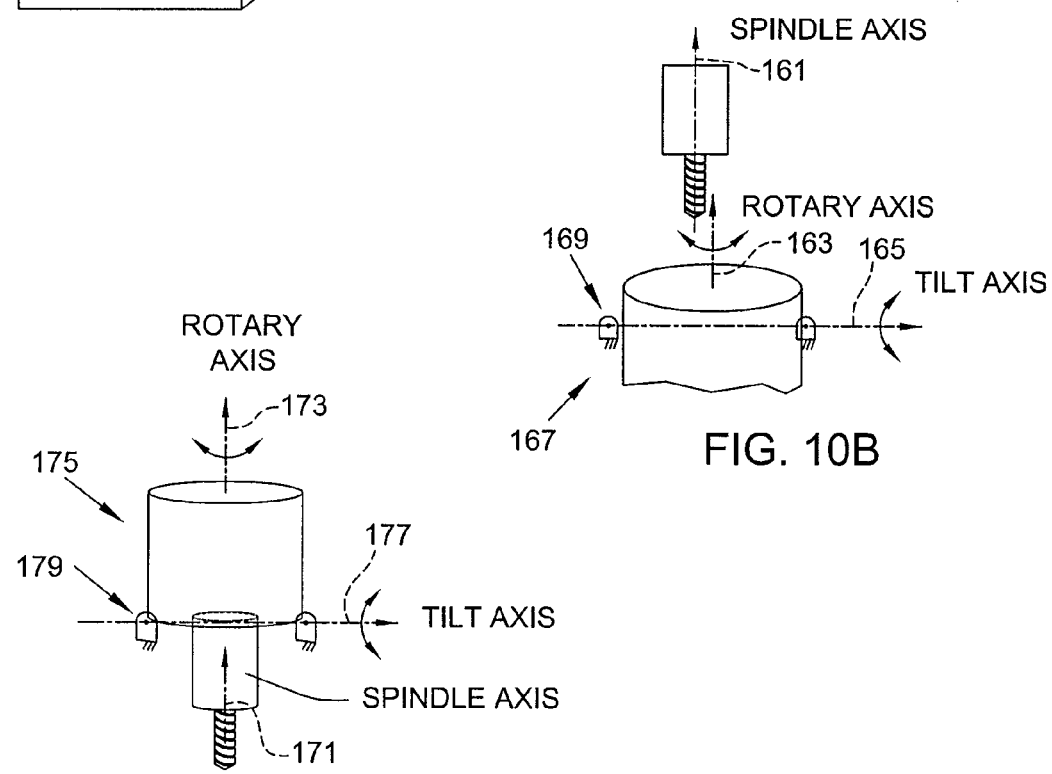
FIG. 10B
FIG. 10C

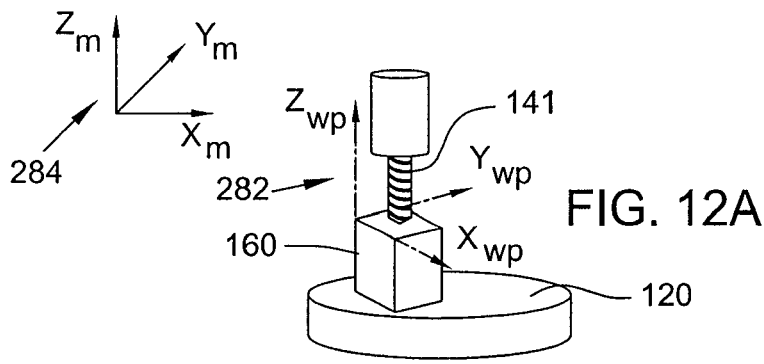
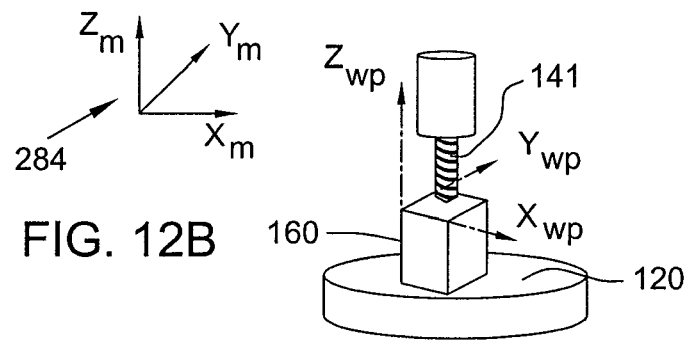
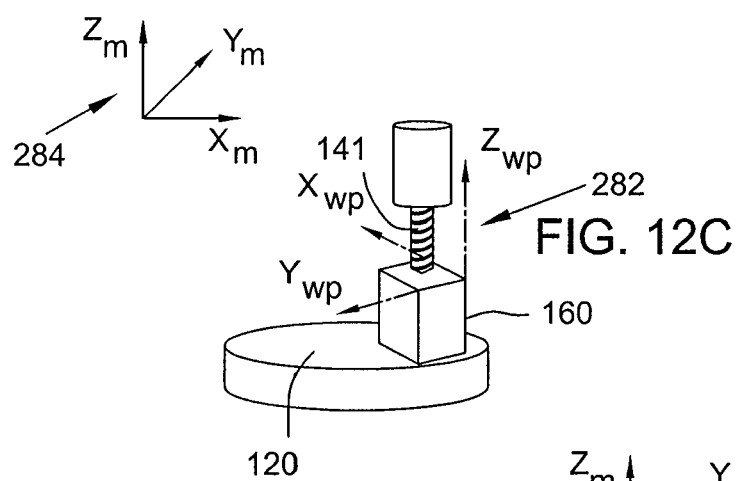
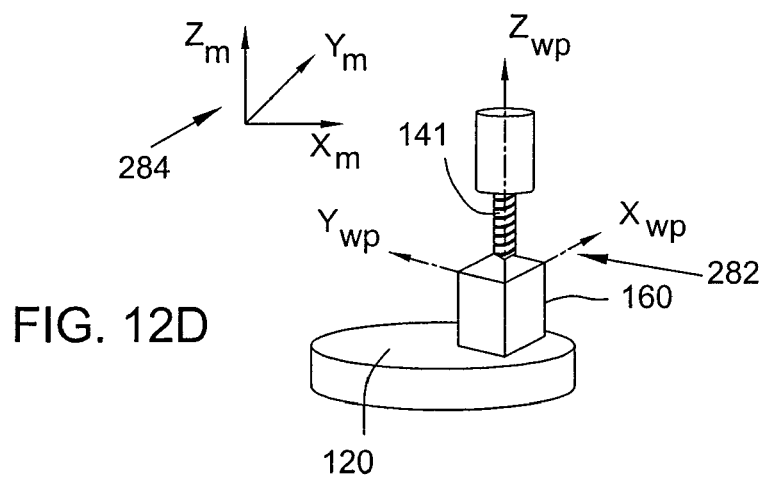
FIG. 12A
FIG. 12B
FIG. 12C
FIG. 12D

LAST POSITION, NEGATIVE TILT AXIS PREFERENCE

NEXT POSITION SOLUTION #1

180° ROTATION IN ROTARY AXIS

LAST POSITION

NEXT POSITION SOLUTION #1

180° ROTATION IN ROTARY AXIS

CHOOSE NEXT POSITION SOLUTION #2

0° ROTATION IN ROTARY AXIS (NEGATIVE TILT AXIS PREFERENCE)

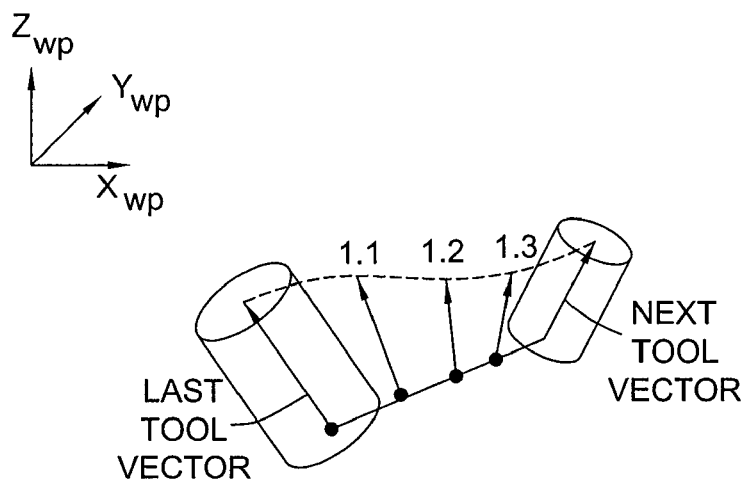
FIG. 24
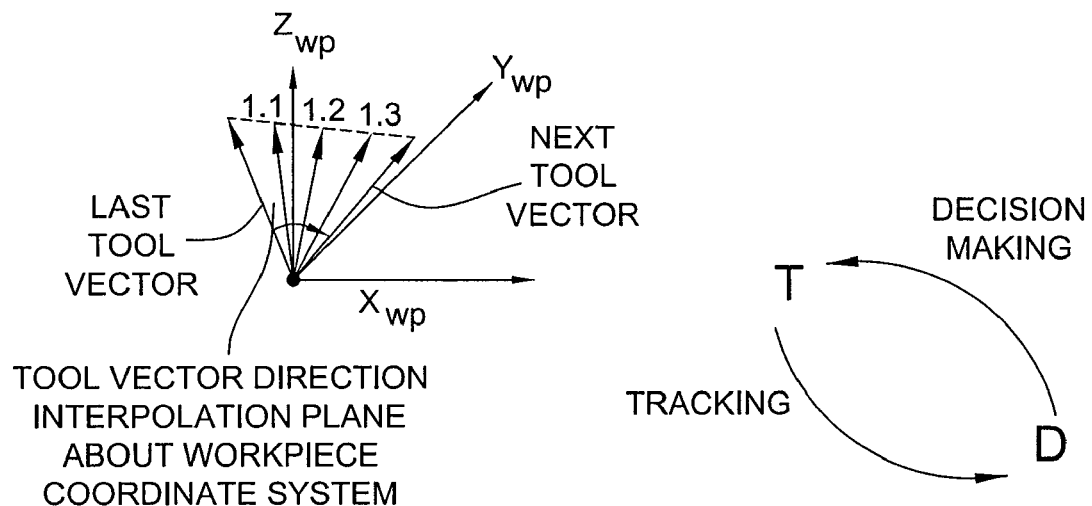
FIG. 25
FIG. 26
FIGURE 1 CORRESPONDENCE

MACHINE TOOL CONTROL SYSTEM

CROSS REFERENCE TO RELATED APPLICATIONS

This application claims the benefit of U.S. Provisional Patent Application Ser. No. 60/821,523, filed Aug. 4, 2006, titled "KINEMATICS COMPENSATION OBJECT ORIENTED SYSTEM AND METHOD FOR MACHINE TOOL CONTROL", and U.S. Provisional Patent Application Ser. No. 60/821,503, filed Aug. 4, 2006, titled "SYSTEM AND METHOD FOR TOOL CENTER POINT MANAGEMENT", the disclosures of which are expressly incorporated by reference herein including the source code appendix of each.

Further, this application is related to U.S. Patent Application Ser. No. 11/833,971, filed Aug. 3, 2007, titled "GENERALIZED KINEMATICS SYSTEM", the disclosure of which is expressly incorporated by reference herein.

BACKGROUND AND SUMMARY OF THE INVENTION

The invention relates to machine tool control software. More specifically, the field of the invention is that of machine tool control software for object oriented machine tool control software and the operation of machine tool control software.

An object oriented machine tool control system may provide real-time machine tool software system control that isolates system responsibilities into classes that permit a machine tool manufacturer or system integrator to manage complexity and change. One example of a machine tool control system is disclosed in U.S. Pat. No. 5,453,933, assigned to the assignee of the present invention, the disclosure of which is incorporated by reference herein. The system of the '933 patent allows different systems to be created from a core set of procedures without redesigning or making massive software changes Engineers changing a control system of the '933 patent may easily make changes to the system because they do not need to be experts on the entire system to make a modification to a single component in a class. One change does not have a ripple effect of change throughout the system. Portions of the system that are most likely to change such as the user interface and device drivers are separated from the Kernel. These components are more accessible to change through PLC programs, customizations to the Machine class and addition to or modification of operator programs.

In an exemplary embodiment of the present disclosure, a motion control system is provided for a machine tool system. In an example of the present disclosure, the motion control system includes a generalized kinematics library which may model various machine tool systems. In a further example, multiple instances of the generalized kinematics library are generated to provide data for the machine tool system or other machine tool systems.

In a further exemplary embodiment of the present disclosure, a method for controlling the movement of a machine tool system to machine a part is provided. The method comprising the steps of contacting the part with a tool and moving the tool relative to the part from a first position to a second position while the tool remains in contact with the part. The tool interpolating through a machine singularity point of the machine tool system.

In another exemplary embodiment of the present disclosure, a method for determining position information for a plurality of moveable axes of a machine tool system to machine a part is provided. The method comprising the steps of providing a cascading method accepting a plurality of different tool position input types; receiving a first tool position, the first tool position corresponding to one of the plurality of different input types; and determining with the cascading method the positional information based on the received first tool position.

In yet another exemplary embodiment of the present disclosure, a method for controlling the movement of a machine tool system to machine a part, the machine tool system having a plurality of rotatable axes. The method comprising the steps of contacting the part with a tool at a first position; identifying a second position to move the tool; and selecting a shortest angular traverse solution for each of the plurality of rotatable axes from a plurality of possible solutions for each of the plurality of rotatable axes.

In yet a further exemplary embodiment of the present disclosure, a method for controlling the movement of a machine tool system to machine a part, the machine tool system having a plurality of rotatable axes including a tilt axis. The method comprising the steps of contacting the part with a tool at a first position; identifying a second position to move the tool; and selecting a first solution for each the plurality of rotatable axes from a plurality of possible solutions for each of the plurality of rotatable axes based on a specified tilt axis preference. The first solution having a tilt angle for the tilt axis which satisfies the tilt axis preference.

In still another exemplary embodiment of the present disclosure, a method for controlling the movement of a machine tool system to machine a part, the machine tool system having a plurality of moveable axes. The method comprising the steps of contacting the part with a tool at a first position; identifying a second position to move the tool; and determining a plurality of interpolated positions from the first position to the second position with a two stage interpolation method.

In still yet another exemplary embodiment of the present disclosure, an apparatus for machining a part with at least one tool. The apparatus comprising a frame; a moveable support supported by and moveable relative to the frame, the moveable support supporting the part; a machine tool spindle supported by the frame and moveable relative to the part, the machine tool spindle adapted to couple the at least one tool, the moveable support and the machine tool spindle including a plurality of moveable axes; and a motion control system operably coupled to the machine tool spindle and the moveable support. The motion control system executing the machining of the part through the controlled movement of the plurality of moveable axes of the machine tool spindle and the moveable support. The motion control system contacts the part with a first tool at a first position and moves the first tool relative to the part from the first position to a second position while the first tool remains in contact with the part. The first tool interpolating through a machine singularity point of the machine tool system.

In further still another exemplary embodiment of the present disclosure, an apparatus for machining a part with at least one tool. The apparatus comprising a frame; a moveable support supported by and moveable relative to the frame, the moveable support supporting the part; a machine tool spindle supported by the frame and moveable relative to the part, the machine tool spindle adapted to couple the at least one tool, the moveable support and the machine tool spindle including a plurality of moveable axes; and a motion control system operably coupled to the machine tool spindle and the moveable support. The motion control system executing the machining of the part through the controlled movement of the plurality of moveable axes of the machine tool spindle and the moveable support, wherein the motion control system contacts the part with a first tool at a first position and moves the first tool relative to the part from the first position to a second position by selecting a shortest angular traverse solution for each of a plurality of rotatable axes of the plurality of moveable axes from a plurality of possible solutions for each of the plurality of rotatable axes.

In another exemplary embodiment of the present disclosure, an apparatus for machining a part with at least one tool is provided. The apparatus comprising a frame; a moveable support supported by and moveable relative to the frame, the moveable support supporting the part; a machine tool spindle supported by the frame and moveable relative to the part, the machine tool spindle adapted to couple the at least one tool, the moveable support and the machine tool spindle including a plurality of moveable axes; and a motion control system operably coupled to the machine tool spindle and the moveable support. The motion control system executing the machining of the part through the controlled movement of the plurality of moveable axes of the machine tool spindle and the moveable support. The motion control system contacts the part with a first tool at a first position and moves the first tool relative to the part from the first position to a second position by selecting a first solution for each of a plurality of rotatable axes of the plurality of moveable axes from a plurality of possible solutions for each of the plurality of rotatable axes based on a specified tilt axis preference, the first solution having a tilt angle which satisfies the tilt axis preference for a tilt axis of the plurality of the moveable axes.

In still another exemplary embodiment of the present disclosure, an apparatus for machining a part with at least one tool is provided. The apparatus comprising a frame; a moveable support supported by and moveable relative to the frame, the moveable support supporting the part; a machine tool spindle supported by the frame and moveable relative to the part, the machine tool spindle adapted to couple the at least one tool, the moveable support and the machine tool spindle including a plurality of moveable axes; and a motion control system operably coupled to the machine tool spindle and the moveable support. The motion control system executing the machining of the part through the controlled movement of the plurality of moveable axes of the machine tool spindle and the moveable support. The motion control system contacts the part with a first tool at a first position and moves the first tool relative to the part from the first position to a second position by determining a plurality of interpolated positions from the first position to the second position with a two stage interpolation method.

In a further exemplary embodiment of the present disclosure, a method for controlling the movement of a machine tool system to machine a part is provided. The method comprising the steps of receiving a machine configuration corresponding to the machine tool system, the machine configuration identifying a plurality of moveable axes of the machine tool system and a plurality of interdependencies therebetween; generating based on the machine configuration and a generalized kinematics library a virtual kinematics machine; receiving input data corresponding to a shape of the part; and generating positions for the plurality of moveable axes of the machine tool system based on the virtual kinematics machine and the input data.

In another exemplary embodiment of the present disclosure, a method for controlling the movement of a machine tool system having a plurality of moveable axes to machine a part is provided. The method comprising the steps of receiving input data corresponding to a shape of the part; generating a first virtual kinematics machine based on a machine configuration of the machine tool system and a generalized kinematics library, the first virtual kinematics machine generating positions for the plurality of moveable axes of the machine tool system based on the input data; and generating a second virtual kinematics machine based on the machine configuration of the machine tool system and the generalized kinematics library, the second virtual kinematics machine generating position information for a moveable portion of the machine tool system.

In yet still another exemplary embodiment of the present disclosure, a method of programming multiple machine tool systems with a software controller is provided. The method comprising the steps of providing a generalized kinematics library accessible by the software controller; generating a first virtual kinematics machine having a first configuration corresponding to a first machine tool system, the first virtual kinematics machine based on the generalized kinematics library; and generating a second virtual kinematics machine having a second configuration corresponding to a second machine tool system, the second virtual kinematics machine based on the generalized kinematics library.

In another exemplary embodiment of the present disclosure, an apparatus for machining a part with at least one tool is provided. The apparatus comprising a frame; a moveable support supported by and moveable relative to the frame, the moveable support supporting the part; a machine tool spindle supported by the frame and moveable relative to the part, the machine tool spindle adapted to couple the at least one tool, the moveable support and the machine tool spindle including a plurality of moveable axes; and a motion control system operably coupled to the machine tool spindle and the moveable support, the motion control system executing the machining of the part through the controlled movement of the plurality of moveable axes of the machine tool spindle and the moveable support. The controlled movement of the plurality moveable axes is provided by an instance of a generalized kinematics library. The instance including a plurality of virtual axes which correspond to the plurality of moveable axis.

In still a further exemplary embodiment of the present disclosure, a method of configuring a software controller of a machine tool system is provided. The method comprising the steps of providing a generalized kinematics library accessible by the software controller; receiving information regarding a configuration of the machine tool system, the machine tool system having a plurality of orthogonal moveable axes; generating an instance of the generalized kinematics library which corresponds to the machine tool system based on the received information regarding the configuration of the machine tool system; and controlling a movement of the plurality of orthogonal moveable axes through the instance of the generalized kinematics library.

In a further exemplary embodiment of the present disclosure, a computer readable medium having computer-executable instructions for controlling the movement of a plurality of moveable axes of a machine tool system to machine a part is provided. The computer executable instructions comprising a generalized kinematics library; instructions to generate an instance of the generalized kinematics library based on a configuration of the machine tool system; instructions to provide input data to the instance of the generalized kinematics library; and instructions to get output data from the generalized kinematics library, the output data being related to the movement of the plurality of moveable axes.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIGS. 7A and 7B illustrate representative views of the Tool Matrix Stack and the Part Matrix Stack;

FIGS. 10A-C illustrate a machine singularity point for various machine tool systems;

FIGS. 12A-D illustrate that a tool remains in contact with a part during a rotation about the machine singularity point;

FIG. 24 illustrates a tool vector interpolation from a last position to a next position;

FIG. 25 illustrates interpolated tool vectors; and

FIG. 26 illustrates a correspondence between the Boolean Decision Matrix and the Transformation Matrix.

Corresponding reference characters indicate corresponding parts throughout the several views.

DETAILED DESCRIPTION OF THE DRAWINGS

The embodiments disclosed herein are not intended to be exhaustive or limit the invention to the precise form disclosed in the following detailed description. Rather, the embodiment is chosen and described so that others skilled in the art may utilize its teachings.

Figure 1:
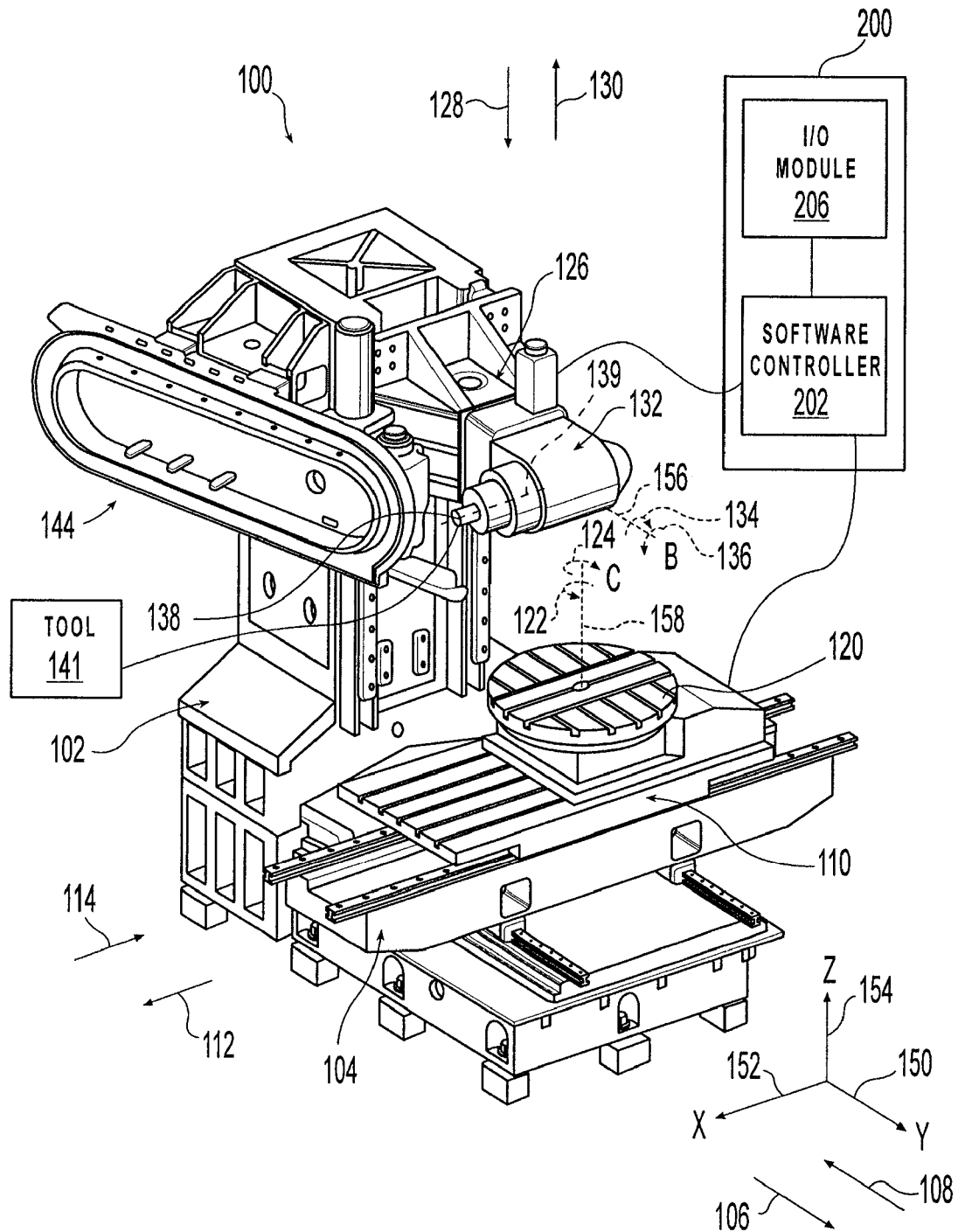
FIG. 1 illustrates an exemplary machine tool system.

Referring to FIG. 1, a machine tool system 100 is shown having a motion control system 200. Machine tool system 100 includes a frame 102 having a first saddle 104 coupled thereto. Saddle 104 is translatable in directions 106 and 108. A second saddle 110 is supported by first saddle 104. Saddle 110 is translatable in directions 112 and 114 relative to saddle 104. A platform 120 is supported by saddle 110 and is rotatable relative to saddle 110 in directions 122 and 124. In one embodiment, each of saddle 104, saddle 110, and platform 120 are moveable through motors which are controlled by motion control system 200.

Further, a third saddle 126 is supported by frame 102. Saddle 126 is translatable in directions 128 and 130. Saddle 126 supports a rotatable member 132. Rotatable member 132 is rotatable in directions 134 and 136 relative to saddle 126. In one embodiment, each of saddle 126 and rotatable member 132 are moveable through motors which are controlled by motion control system 200.

A tool spindle 138 is supported by platform 132. Various tools 141 may be coupled to tool spindle 138 to perform various operations with machine tool system 100. Exemplary tools include and an end mill, a drill, a tap, a reamer, and other suitable tools. Tool spindle 138 is rotatable about a tool spindle axis 139 to input a rotation to the tool 141. In one embodiment, a plurality of tools 141 are stored in a tool carousal 144. Additional details about tool carousal 144 are provided in U.S. Provisional Application Ser. No. 60/821,481, the disclosure of which is expressly incorporated by reference herein.

The movement of saddle 104 in direction 106 or direction 108 is illustrated as a movement in an y-axis 150. The movement of saddle 110 in direction 112 or direction 114 is illustrated as a movement in an x-axis 152. The movement of saddle 126 in direction 128 and direction 130 is illustrated as a movement in an z-axis 154. The rotation of rotatable member 132 in direction 134 or direction 136 is illustrated as a movement in an B-axis 156. The rotation of platform 120 in direction 122 or direction 124 is illustrated as a movement in an C-axis 158. Machine tool system 100 is an exemplary 5-axis machine. In one embodiment, one of B-axis 156 and C-axis 158 is replaced with an A-axis wherein platform 120 is tiltable about one of x-axis 152 and y-axis 150.

Through the movement of one or more of the 5-axes of machine tool system 100 a tool 141 may be positioned relative to a part 160 (see FIG. 9A) supported by platform 120 to be machined. Part 160 may be secured to platform 120 to maintain the position of part 160 to platform 120.

Figure 2:
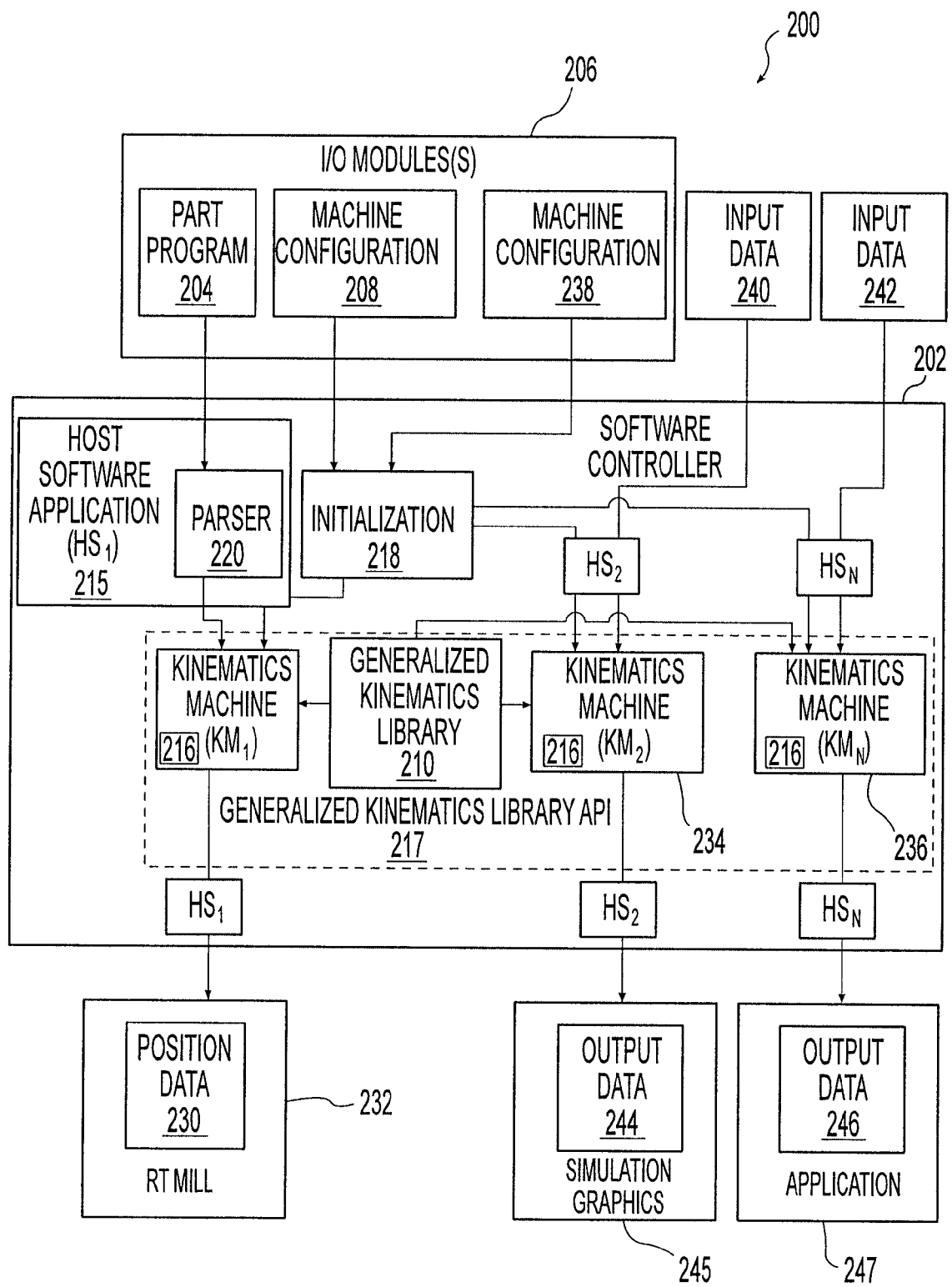
FIG. 2 illustrates a representative view of the of a motion control system of the exemplary machine tool system of FIG. 1.

The movement of one or more of the 5-axes of machine tool system 100 is controlled through motion control system 200. Referring to FIG. 2, motion control system 200 includes a software controller 202 and one or more I/O modules 206. It should be understood that the methods disclosed herein may be executed by software controller 202 and be stored in a manner associated with software controller 202.

Software controller 202 receives a machine configuration 208 and input data, such as a part program 204, and then provides output data, such as position data for the various axes 150, 152, 154, 156, and 158 of machine tool system 100. In the illustrated example in FIG. 2, software controller 202 receives part program 204 and machine configuration 208 from one or more I/O modules 206. Machine configuration 208 provides the dependencies between the various axes 150, 152, 154, 156, and 158 of machine tool system 100 as well as the attributes of each axis. For instance, as saddle 104 moves in direction 106 the location of C-axis 158 is changed. Therefore, the location of C-axis 158 depends on the location of saddle 104.

Exemplary I/O modules 206 includes input members, such as a user interface, a touch display, a keyboard, a mouse, one or more buttons or switches, a CD drive, a floppy drive, an interface to a determiner network (wireless or wired), and other suitable devices for providing information to software controller 202 and output members, such as a display (such as a touch screen), lights, printer, and other suitable devices for presenting information.

In one embodiment, part program 204 is entered through a conversational mode of operation whereby a user during a programming session is presented with one or more screens through a user interface (such as a touch screen and keyboard). An exemplary method of conversational programming is disclosed in U.S. Pat. No. 5,453,933, assigned to the assignee of the current application, the disclosure of which is expressly incorporated by reference herein. During the programming session, the user may program the desired geometry for the machined part and specify one or more attributes. In one example, the user specifies the desired geometry for the machined part by creating blocks of code each of which specifies a tool and a trajectory of the tool. As such, the geometry of the machined part is defined based on the operations used to create the machined part.

In one embodiment, part program 204 is provided through a NC mode of operation whereby an NC program is loaded into software controller 202. Part programs are frequently expressed in a standard G&M code language, or a close derivative of this language based on either the International Standards Organization (ISO) or the Electronics Industries Association (EIA) RS-274-D, using codes identified by letters such as G, M, F. The codes define a sequence of machining operations to control motion in the manufacture of a part. Software controller 202 converts the codes to provide location positions for the various axes 150, 152, 154, 156, and 158 of machine tool system 100. In one embodiment, part program 204 is parsed by a parser 220 of software controller 202. Parser 220 reviews part program 204 and identifies various geometry segments. Exemplary geometry segments include lines and arcs.

Regardless of the origin of part program 204, part program 204 defines the desired geometry for the machined part either directly or based on the operations used to create the part. However, part program 204 may not specify the positions of saddles 104, 110, and 126 nor the rotations of platform 120 and rotatable member 132. These positions are determined by software controller 202.

In one embodiment, software controller 202 is an object-oriented software component. In one embodiment, software controller 202 is based on the software described in U.S. Pat. No. 5,453,933 issued on Sep. 26, 1995 and titled CNC CONTROL SYSTEM, the disclosure of which is expressly incorporated by reference herein.

In one embodiment, software controller 202 includes an object oriented generalized kinematics library 210 and one or more host software applications 215. The host software application 215 interfaces with instances (identified herein as virtual kinematics machines 214, 234, and 236) of the generalized kinematics library 210 through an interface, such as an API interface 217. Host software application 215 also interfaces with other components of software controller 202, such as the real time application for the real time mill and the graphics application.

Generalized kinematics library 210 includes a collection of objects or classes from which objects may be derived that are used to develop virtual kinematics machine 214 from an instance of the library 210. In one embodiment, the machine configuration 208 is provided to software controller 202. Based on machine configuration 208 software controller 202 creates the virtual kinematics machine 214 from the kinematics library 210. Virtual kinematics machine 214 is stored in memory. Virtual kinematics machine 214 has the same configuration as the actual machine described in the machine configuration 208.

Design Overview of Generalized Kinematics Library

The Generalized Kinematics Library contains an application programming interface (API) 217 that a host software application 215 uses to communicate data via Set data functions and receive data via Get data functions. Thus, as per the object oriented design paradigm, the host software application 215 cannot directly access private member data in the generalized kinematics library 210 or instances thereof.

Interfacing to the Generalized Kinematics Library

The host software application 215 interfaces to the generalized kinematics library 210 through an API 217 designed using the object-oriented paradigm by communicating data via Set data functions and receiving data via Get data functions.

Generalized Kinematics Library Initialization

In accordance with object oriented paradigm, the host software application 215 initializes the virtual kinematics machines with the data required for the generalized kinematics library 214 to assemble the virtual kinematics machine 214. The host software application 215 begins by creating an instance of the general kinematics library 21 0. The initialization procedure follows using configuration data 208 about the machine axes that may originate from numerous sources including configuration files, user-input, and or automatic drive recognition by the real-time components of the machine tool system 100.

The host software application 215 cycles through each axis that is present in the system and calls the function AddAxis (ID, Connection). The Axis ID is a number that uniquely identifies the axis. Exemplary axis ids include the set {0,1,2,3,4,5} which corresponds to linear and rotational axes {x,y,z,a,b,c}. With the call of this function, the generalized kinematics library 210 creates an axis object in memory, which can then initialized with any or all of the following data as required for the axis type by the host software application 215.

Each axis may include some or all of the following attributes 303:

ID
Type (linear/rotary/tilt/spindle)
Direction
Coordinate location (centerline if rotational axis)
Limits
Maximum velocities
Connection (whether the axis is connected to the tool or to the part)

After all the axes have been created and initialized with the appropriate data, the generalized kinematics library End-Setup( ) function is called by the host software application 215, which validates the machine kinematics, assembles the Tool and Part Matrix Stacks 270 and 280 (see FIGS. 7A and 7B), and determines the tilt axis angle for the machine singularity point if it is a 5-axis machine. The singularity point tilt angle of the tilt axis (B-axis 158) is determined by locating the tilt angle where the spindle axis aligns with the rotary axis, (C-axis 156).

At this point the generalized kinematics library 210 is ready to be used by the host software application 215. Normally the generalized kinematics library 210 is initialized with a starting position, and other initial modes, each of which are explained in more detail herein, are set either on or off including:

Shortest angular traverse,
Interpolation on/off
Interpolation type if on
Tilt axis preference direction or off or force use of preference direction Multiple Instances of the Generalized Kinematics Library The design of the generalized kinematics library 210 allows the host software application 215 to create multiple instances of the generalized kinematics library 210 for different processes (different host software applications within the machine tool control software 200). For example, one instance is used to interpret programs for the real-time running of the actual machine tool system 100. Another instance is used to display the real-time graphics and position data during program runtime on the machine tool system 100. A third instance may be used to interpret programs for different machines to display in graphics. This third instance allows the user to program parts 160 for different machines than that which the software controller 202 is connected to and to check these programs using graphical verification. Each instance of the general kinematics library 210 is independent and may be used simultaneously.

The software controller 202 contains an initialization class that acts as an API layer between the generalized kinematics library 210 and the host application software 215. This configuration permits different components (i.e. different host software applications) within software controller 202 to initialize their instances of the general kinematics library 210 through a common, universally accessible singleton class. The host software applications 215 may also modify the kinematics models for different machines when necessary. An example would be the concurrent programming graphics instance of the generalized kinematics library 210 that may be modified to model machines other than the one the CNC controller 200 is connected to. Also, in one embodiment the general kinematics library 210 permits the simultaneous control of multiple machine tool systems with a single controller.

Using Generalized Kinematics Library in Tool Position Computation Mode for Motion Control The API to determine machine joint positions for any of the given input types 1 through 4 (see FIG. 8) is a simple overloaded SetPosition(Input Data) function, where Input Data is the requisite data corresponding to Type 4 through Type 1. Interpolation modes, feedrates or time steps, tool information, and part setup are set prior to calling the SetPosition (Input Data) function. The generalized kinematics library 210 updates its internal NextPosition data object with the input data and uses this object to determine the next tool position. When using the generalized kinematics library 210 to determine tool positions, the joint positions and time step for the input move are determined and stored in memory. The generalized kinematics library 210 then updates its internal LastPosition data object with the input and determined data, which will be used to make decisions to determine the next input tool position. The host software application 215 will then pick up the determined information using a GetPositionData( ) function, which returns a reference to a class in the generalized kinematics library 210 that contains the determined data.

The host software application 215 can configure the generalized kinematics library 210 to store additional information other than the machine joint positions and time step for each move. For example, tool tip location with respect to the workpiece, tool vector direction with respect to the machine reference coordinate system 284 (See FIG. 7A).

Using Generalized Kinematics Library in Computation Mode

The generalized kinematics library 210 may be used in a pure computation mode where the LastPosition internal data object does not get updated with the determined tool position. This can be useful when making logical decisions about the tool path in the host software application such as computing the clipping point of an oriented retract plane to the machine limits. The API is a simple overloaded DeterminePosition (Input Data) function, where Input Data is the requisite data corresponding to Type 4 through Type 1. The requisite machine states must be set prior to calling DeterminePosition, which is identical to using SetPosition described in the previous section.

In addition to computing machine joint angles for input tool positions, the generalized kinematics library 210 may also determine tool tip and tool vector data with respect to any of the coordinate systems in the kinematics linkages of the modeled machine. An example would be the computation of the tool vector in the machine reference coordinate given the machine joint positions and angles: GetToolVectorWrtMachine(Machine Joint Positions), where Machine Joint Positions is a vector containing all the relevant axes positions. This function call would not update the generalized kinematics library 210 internal LastPosition data object.

The Virtual Kinematics Machines

Generalized kinematics library 210 consolidates the kinematics calculations in a single library source that can be shared throughout the code. The generalization of the library provides a means for the library to create a virtual kinematics machine of any orthogonal machine tool system of up to 5 axes. In one embodiment, this is achieved with an object-oriented design in which a virtual mathematical model of the machine tool system 100 is created in the library. Although the generalized kinematics library 210 is described herein for use with machine tool systems of up to 5 orthogonal axes, due to the object-oriented design of the generalized kinematics library 210, it can be specialized for non-orthogonal systems and for systems with more than 5 axes. The object-oriented design provides the flexibility to generate a plug-and-play library that may connect and configure itself to model any orthogonal machine tool system from 1 to 5 axes. Further, although described herein for use with a machine tool system 100, the motion control system 200 may be used with any type of motion system including robotics.

Virtual kinematics machine 214 is based on one or more matrix stacks discussed herein. These matrix stacks, such as 270 and 280 in FIGS. 7A and 7B, include matrices that describe the characteristics of one or more of the various axes 150, 152, 154, 156, and 158 of machine tool system 100. Additional characteristics of machine tool system 100 may also be accounted for in the matrix stacks 216. For instance, part 160 is coupled to platform 120.

Axis Objects

Figure 3:
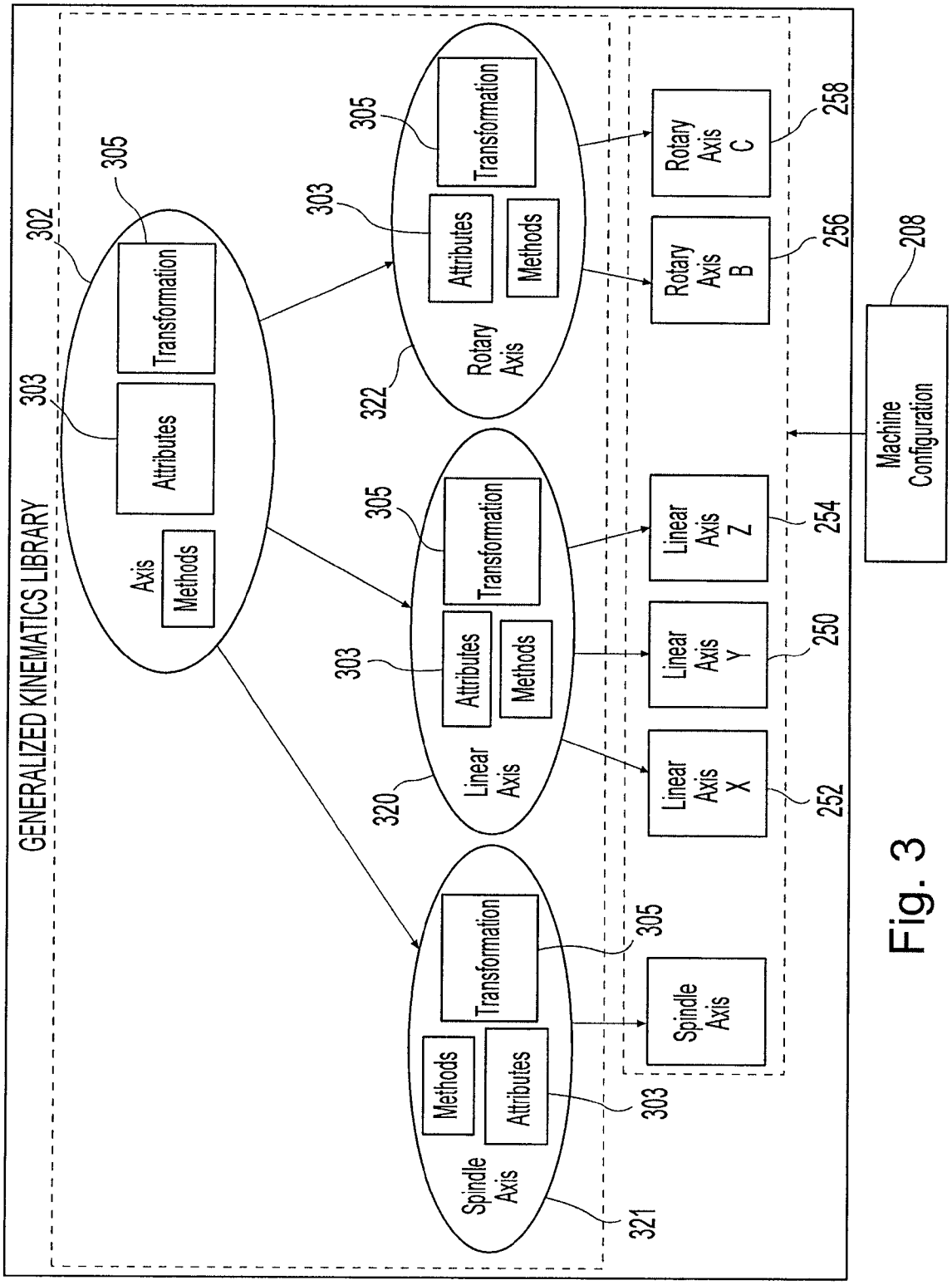
FIG. 3 illustrates a representative view of axis objects.

Referring to FIG. 3, each axis of the various axes 150, 152, 154, 156, and 158 of machine tool system 100 is described as an object. The axis objects are derived from a generic axis class 302 represented in FIG. 3. Axis class 302 is the base class for all axis objects and defines properties and methods for axis objects. Axis class 302 includes various axis attributes 303 and transformation matrices 305. The Axis base class 302 contains common data and methods that all derived axes objects own.

The following is a list of data included in the Axis base class 302:

Data:
Axis ID=integer {0,1,2,3,4,5,6,7} corresponding to {X,Y,Z,A,B,C,S}
Name=string {"X","Y","Z","A","B","C","S"}
Type=enumeration {Linear, Rotary, Tilt, Spindle}
Position=axis position
Matrix=axis transformation matrix
Connection=enumeration {Tool, Part}
MinPosition=lower bound of motion
MaxPosition=upper bound of motion
AxisLimitsExists=Boolean {True, False}
InitialMachineDirectionVector=Vector in Machine reference frame representing positive axis movement direction. For rotation axes, vector direction of axis centerline for Right-hand positive rotation.
MaxContourSpeed=interpolation speed
MaxRapidSpeed=rapid move speed
Methods:
Several methods are included in the Axis base class including Set( ) and Get( ) functions for each of the above data.

Derived from axis class 302 are three derived-classes, linear axis 320, spindle axis 321, and rotary axis 322. The SpindleAxis Class 321 is derived from the Axis base class. In addition to the Axis base class 202 data and methods, the SpindleAxis Class 321 includes:
Data:
Location=spindle coordinate system origin with respect to axis it is connected to
Methods:
SetAxisS( )=initialization function
SetInitSpindleAxisDirectionWrtMachine(DirectionVector) =function to set InitialMachineDirection Vector from base Axis class
SetLocationWrtLastAxis( )=function to set the location of the spindle coordinate system with respect to the last axis it is connected to The Linear Axis class 320 is derived from the Axis base class 302. In addition to the axis base class data 302 and methods, the LinearAxis Class 320 includes:
Methods:
Translate( )=functions to translate a vector or multiply a matrix by the linear axis translation matrix
SetAxis(x,y,z)=initialization functions The RotationAxis class 322 is derived from the Axis base class 302. In addition to the Axis base class 302 data and methods, the RotationAxis Class 322 includes:
Data:
Centerline=Location of axis of rotation
Methods:
SetAxis(a,b,c)=Initialization functions
Rotate( )=functions to rotate a vector or multiply a matrix by the rotation
GetPerpendicularDistanceToAxis(Point)=function returns perpendicular radial distance to axis of rotation Based on machine configuration 208, virtual kinematics machine 214 includes five machine specific axis objects 250, 252, 254, 256, and 258 which correspond to axes 150, 152, 154, 156, and 158 of FIG. 1. Exemplary input screens of a user interface of I/O modules 206 are provided for specifying some exemplary attribute information for C-axis 258 (FIGS. 4A and 4B) and for B-axis 256 (FIGS. 5A and 5B).

Figure 4A:
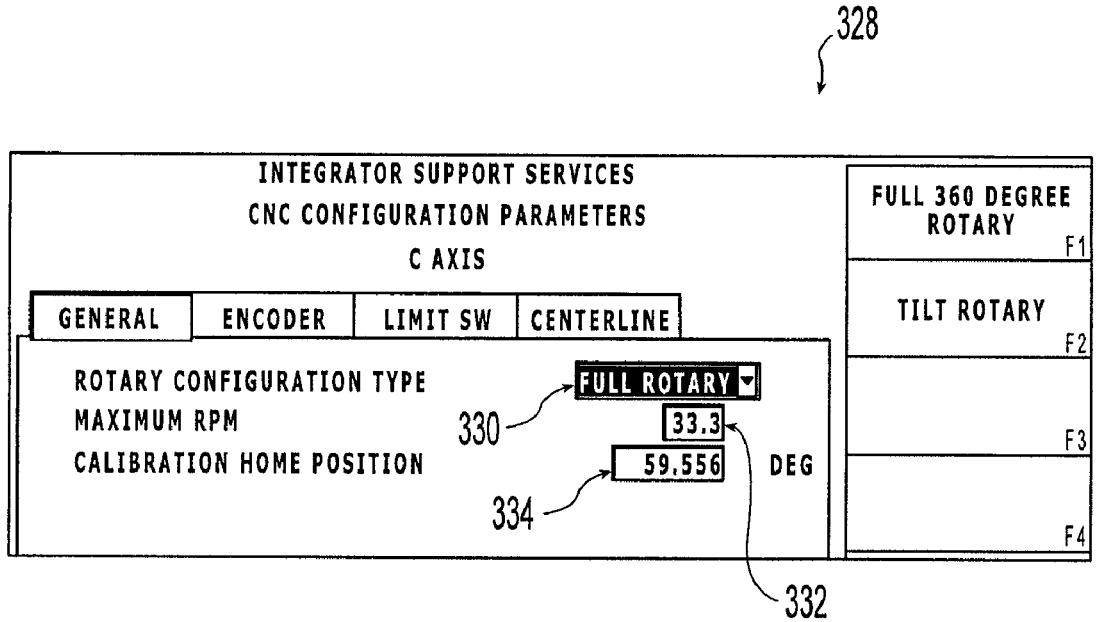
FIGS. 4A and 4B illustrate exemplary input screens of a user interface for providing characteristics regarding a rotary C-axis.
Figure 4B:
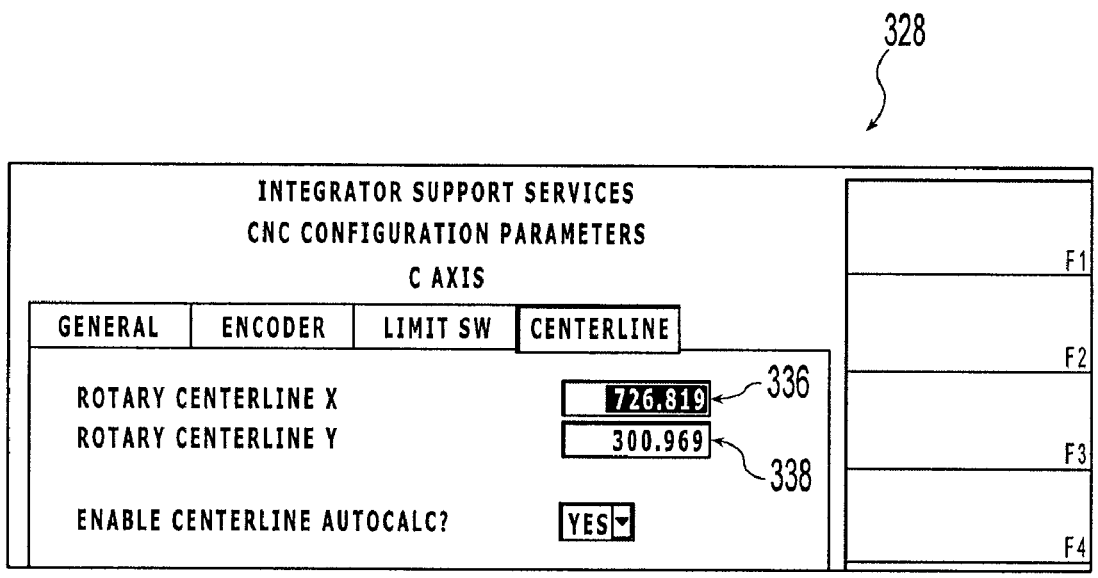

Referring to FIGS. 4A and 4B, attribute information is specified for C-axis 258 through a user interface 328 of I/O modules 206. In FIG. 4A a rotation configuration type attribute 330 is set to full rotate, a maximum speed attribute 332, and an angular default position attribute 334. Referring to FIG. 4B, the centerline attribute 324 of C-axis 258 is defined as an offset 336 from x-axis 252 and an offset 338 from y-axis 250.

Figure 5A:
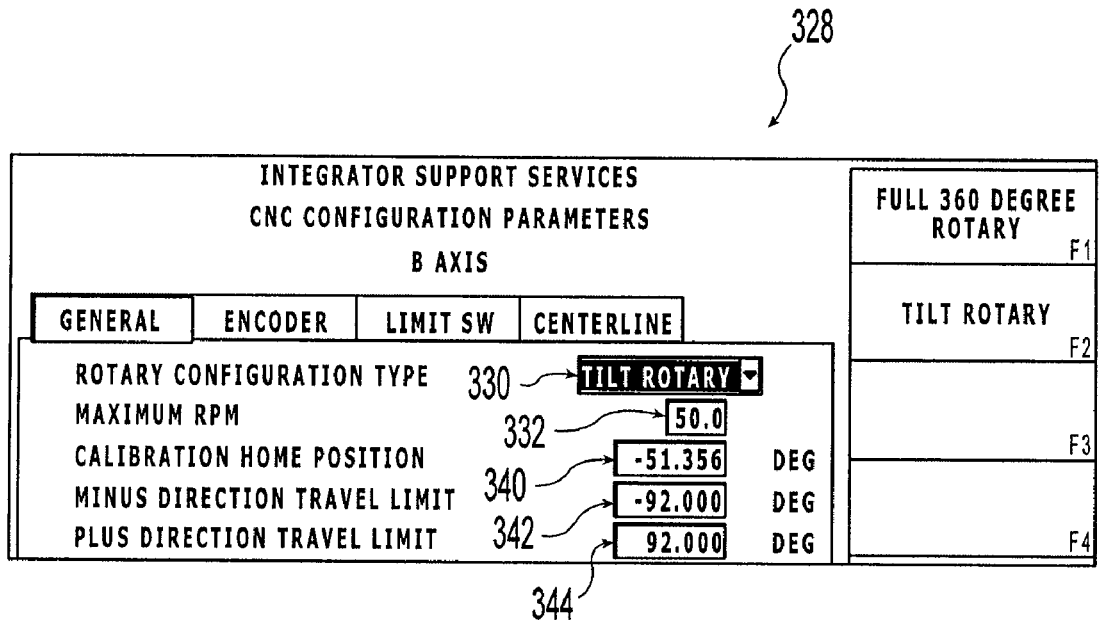
FIGS. 5A and 5B illustrate exemplary input screens of a user interface for providing characteristics regarding a rotary C-axis.
Figure 5B:
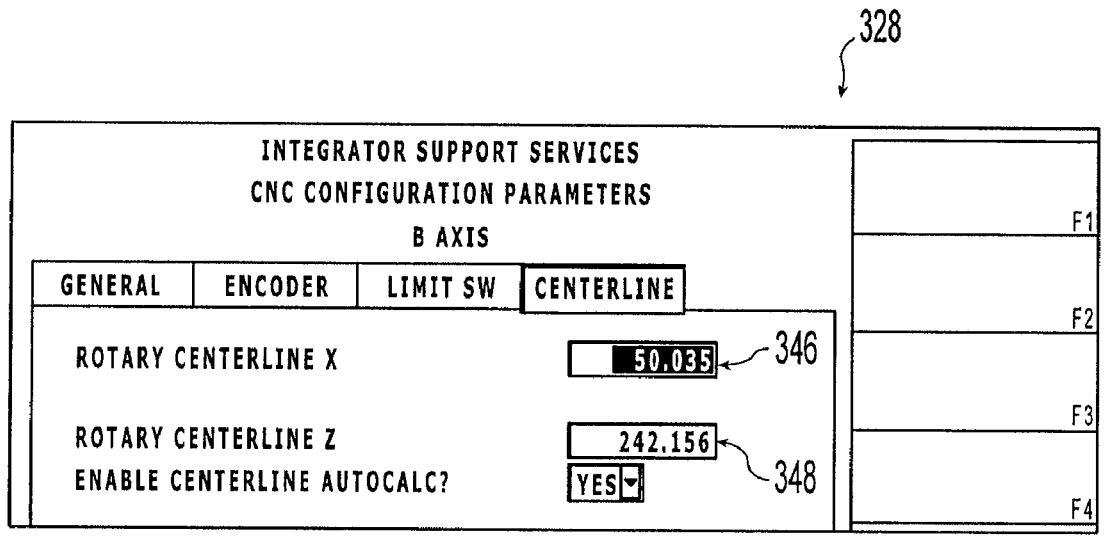

Referring to FIGS. 5A and 5B, attribute information is specified for B-axis 256 through a user interface 328 of I/O modules 206. In FIG. 4A a rotation configuration type attribute 330 is set to tilt rotary, a maximum speed attribute 332, a calibration home position 340, a minus direction travel limit 342, and a plus direction travel limit 344. Referring to FIG. 5B, the centerline attribute 324 of B-axis 258 is defined as an offset 346 from x-axis 252 and an offset 348 from y-axis 250.

Similar attribute information is received by motion control system 200 from an operator through I/O modules 206 for linear axes 250, 252, and 254. Further, additional attributes may be provided for the rotary axes 256 and 258. The attributes 303 and transformations 305 listed in FIGS. 3-5 are exemplary and are not intended to be exhaustive.

Figure 6:
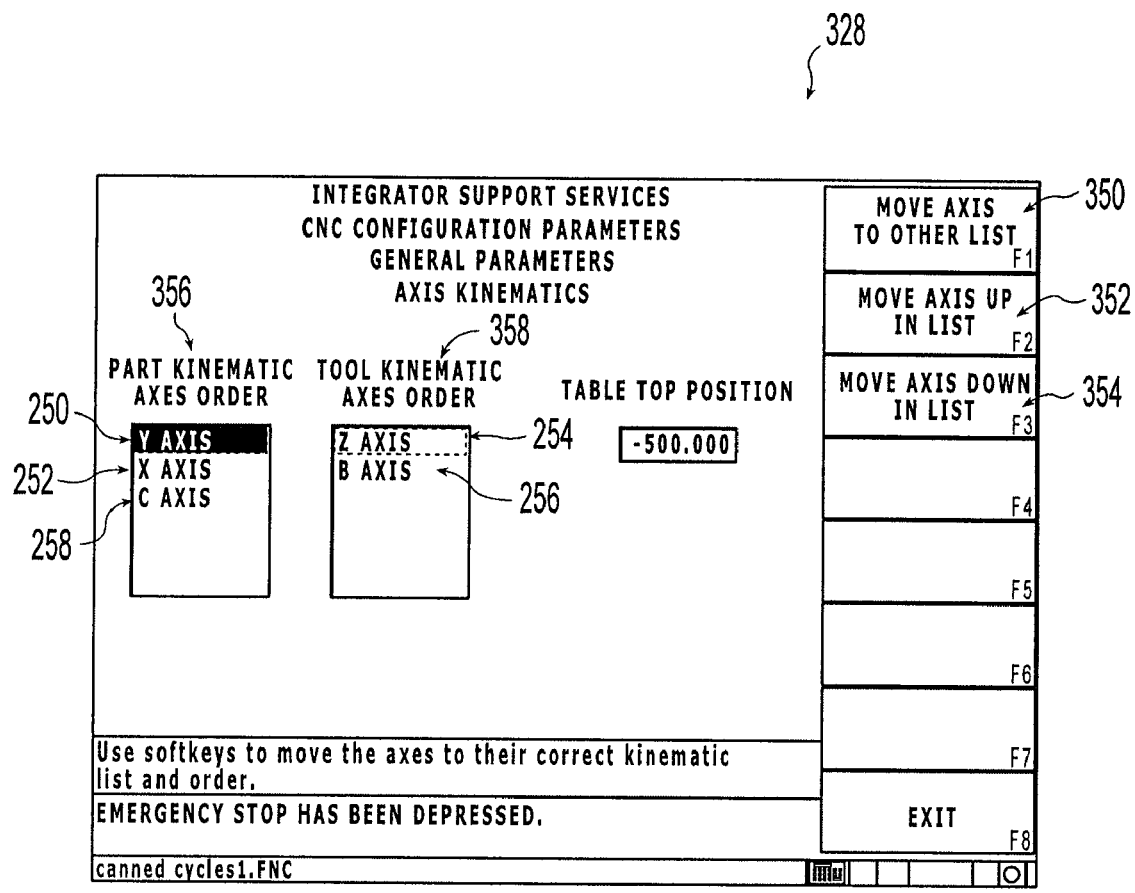
FIG. 6 illustrates an exemplary input screen for specifying the interdependencies between a plurality of axes of the machine tool system of FIG. 1.

Once all of the axes are defined, motion control system 200 receives from an operator the interdependencies between the various axes 150, 152, 154, 156, and 158 so that virtual kinematics machine 214 has the same interdependencies between the corresponding axes objects 250, 252, 254, 256, and 258. An exemplary input screen of user interface 328 of I/O module 206 for setting the interdependencies between axes 250, 252, 254, 256, and 258 is shown in FIG. 6. In one embodiment, the definition of the axes is accomplished during an initial setup of a machine tool system 200 and does not need to be altered during subsequent operations unless desired.

In FIG. 6, each of the axes 250, 252, 254, 256, and 258 defined by the operator are displayed. An operator may highlight a given axis, y-axis 250 is illustrated, through an input member, such as a touch screen. The operator then may move the y-axis 250 to the other of a part kinematics axes order list 356 and a tool kinematics axes order list 358 by selecting input 350. The operator may move the y-axis 250 higher in the current list 356 by selecting input 352. The operator may move the y-axis 250 lower in the current list 356 by selecting input 354.

The order of the various axes in the part kinematics axes order list 356 and the tool kinematics axes order list 358 provides software controller 202 with the interdependencies of the various axes. The first listed axis in each list 356 and 358 is the base axis for that particular list. As illustrated in FIG. 6, the order of axes 250, 252, 254, 256, and 258 corresponds to the axes 150, 152, 154, 156, and 158 of machine tool system 100. As ordered in FIG. 6 in the part kinematics axes order list 356, x-axis 252 and C-axis 258 both move along with y-axis 250. Further, C-axis 258 moves along with x-axis 252, but y-axis does not move along with x-axis. Neither x-axis 250 nor y-axis 252 moves along with a movement of C-axis. For the tool kinematics axes order list 358, B-axis 256 moves along with z-axis 254, but z-axis 254 does not move along with B-axis 256. Finally the movement of y-axis 250, x-axis, and C-axis is independent of the movement of z-axis 254 and B-axis 256.

Matrix Stacks

As mentioned above, each of various axes 250, 252, 254, 256, and 258 has a corresponding transformation matrix 305. By knowing the interdependencies of the various axis 250, 252, 254, 256, and 258, virtual kinematics machine 214 may generate one or more matrix stacks to calculate various types of output data. Virtual kinematics machine 214 includes one or more matrix stacks 216 created by an initialization component 218. Matrix stacks 216 are a general method used in the generalized kinematics library 210 to concatenate multiple transformations together.

Two exemplary matrix stacks 216 are represented in FIGS. 7A and 7B. A tool matrix stack 270 is used to mathematically model the transformation from the tool tip position in a spindle coordinate system (spindle) 272 to the tool tip position in a machine reference coordinate system (m) 274 through a concatenation of transformation matrices 276. Tool matrix stack 270 is graphically represented in a leftmost portion of FIG. 7A and mathematically represented in the rightmost portion of FIG. 7A. In one embodiment for machine tool system 100, which is represented by virtual kinematics machine 214, the tool matrix stack 270 is represented by equation (1).

$$[\overrightarrow{ToolTip_M}] = [Transform_Z] \times [Transform_B] \times \qquad (1)$$
$$[Transform_{spindle}] \times [\overrightarrow{ToolTip_{spindle}}]$$

wherein $[\overrightarrow{ToolTip_{spindle}}]$ is a column vector representing the location of the tool tip in the spindle coordinate system;

[$Transform_{spindle}$] is the transformation from the spindle coordinate system to the rotary B-axis coordinate system;

[$Transform_B$] is the transformation from the rotary B-axis coordinate system to the z-axis coordinate system;

[$Transform_Z$] is the transformation from the z-axis coordinate system to a machine coordinate system; and $[\overrightarrow{ToolTip_M}]$ is a column vector representing the tool tip position in the machine coordinate system.

A part matrix stack 280, shown in FIG. 7B, is used to mathematically model the transformation from a part point in the workpiece coordinate system (wp) 282 to the part point in the machine reference coordinate system (m) 284 through a concatenation of transformation matrices 286. Part matrix stack 280 is graphically represented in a leftmost portion of FIG. 7B and mathematically represented in the rightmost portion of FIG. 7B. The part matrix stack 280 contains all the axes kinematics matrices for the part kinematics chain along with the Part Setup Matrix 290. A method of determining the Part Setup Matrix 290 is provided herein. Additional matrices can be pushed onto the Part Matrix Stack when the user program is defined relative to a transform plane or when patterning transformations are called in the program. The Generalized Kinematics Library uses a Transform Plane Matrix Stack 292 onto which any number of transform planes can be stacked. It also has a Pre-Transform Plane Matrix Stack 294 onto which any number of patterning transformations may be stacked. Exemplary pattern transformations include translate, rotate, and mirror. As with any matrix stack, both the Transform Plane and Pre-Transform Plane Matrix Stacks can be turned on and off without having to delete the matrices in the matrix stack. So the complete part matrix stack 280 may contain the transformations illustrated in FIG. 7B.

In one embodiment, for the machine tool system 100, which is represented by virtual kinematics machine 214, the part matrix stack 280 is represented by equation 2.

$$[\overrightarrow{PartPoint_M}] = [Transform_y] \times [Transform_x] \times [Transform_C] \times \qquad (2)$$
$$[PartSetupMatrix] \times [TransformPlaneMatrixStack] \times$$
$$[Pre\text{-}TransformPlaneMatrixStack] \times [\overrightarrow{PartPoint_{local}}]$$

wherein $[\overrightarrow{PartPoint_{local}}]$ is a column vector representing the location of the point of the part in the workpiece coordinate system if no transform planes are active or to the top transform plane in the TransformMatrixStack if at least one transform plane is active;

[Pre—TransformPlaneMatrixStack] is the patterning transformations applied to the input position;

[TransformPlaneMatrixStack] is the concatenated TransformPlaneMatrixStack matrix transformation from the system defined in the patterning transformation stack to the part setup coordinate system;

[PartSetupMatrix] is the transformation from the part coordinate system to the C-axis coordinate system;

[$Transform_C$] is the transformation from the rotary C-axis coordinate system to the x-axis coordinate system;

[$Transform_x$] is the transformation from the x-axis coordinate system to the y-axis coordinate system;

[$Transform_y$] is the transformation from the y-axis coordinate system to the machine reference coordinate system; and $[\overrightarrow{PartPoint_M}]$ is a column vector representing the part point position in the reference machine coordinate system.

It should be understood that the above illustrative examples for the tool tip and the part point positions are only exemplary and various matrix stacks may be used to transform various types of input data to various types coordinate systems once the interdependencies between the various axes 250, 252, 254, 256, and 258 has been established.

In one embodiment, matrices are pushed on to matrix stack 270 in the order from machine reference coordinate system 284 outward to the spindle coordinate system 272 and on to part matrix stack 280 from the machine reference coordinate system 284 outward to the workpiece coordinate system 282. Every movement of one of the axes of machine tool system 100 does not necessarily require recalculation of the various matrix stacks 270 and 280. In one embodiment, the generalized kinematics library 210 decides whether a recalculation of a given matrix stack is needed.

For example, assume that the tool tip position and the part position are both desired in the machine coordinate system 284. Machine tool system 100 translates along x-axis 152 (x-axis 252 in virtual machine 214) as part 160 is being cut. The generalized kinematics library 210 will recalculate the part matrix stack 280 because the part has moved relative to the machine coordinate system 284, but will not recalculate the tool matrix stack 270 because the tool 141 has not moved relative to the machine coordinate system. This reduces the number of matrix multiplications that are preformed. In one example, when axes positions are set, virtual machine 214 updates each axis object position if the axis position is different from the current position. If an axis position changes, then a flag is set in the appropriate tool or part matrix stack 270 and 280 indicating that the forward and inverse Matrix Stack transformation matrices must be re-determined. The Matrix Stack will re-determine the required matrices when they are next requested for use.

Figure 20:
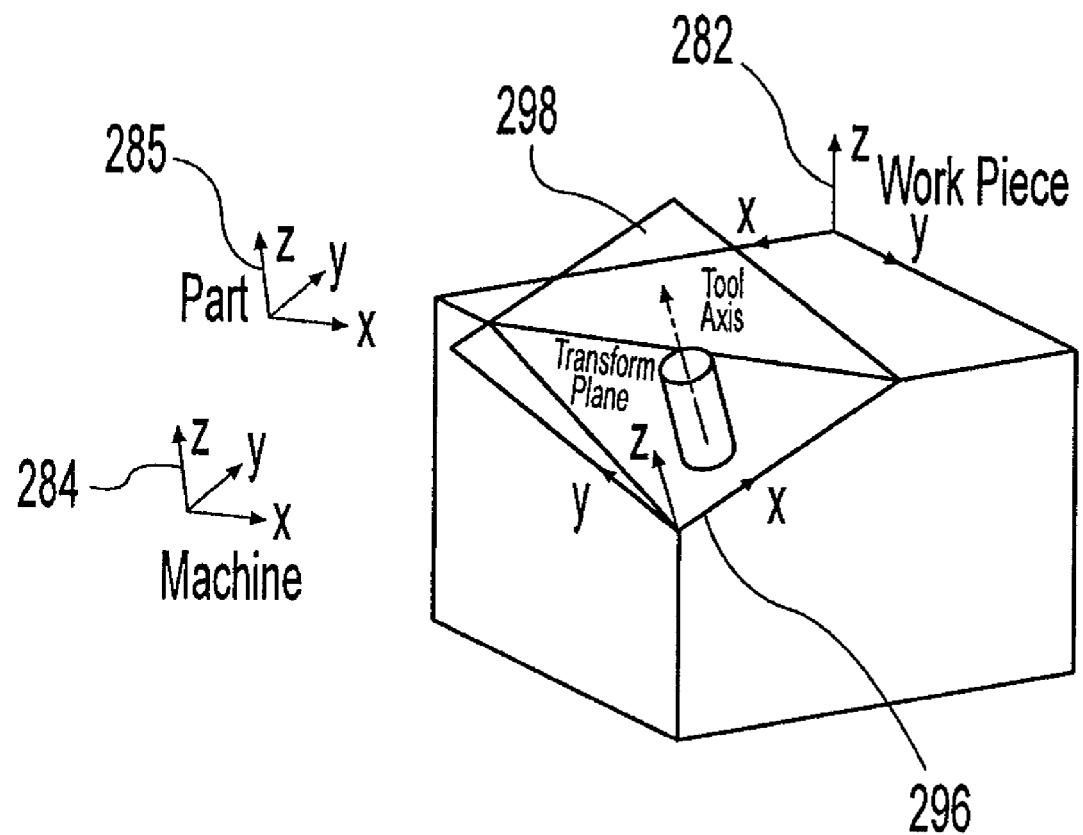
FIG. 20 illustrates a transform plane.

Various matrix stacks may be implemented to determine any point or vector relative to any axis coordinate system, the workpiece coordinate system 282, the spindle coordinate system 272, or the machine reference coordinate systems 284. Other matrix stacks may be implemented for transformations to a transform plane coordinate systems 296, such as shown in FIG. 20. Transform planes 298 may be defined in a programming session of a conversational part program.

Returning to FIG. 2, virtual kinematics machine 214 receives the geometry information from parser 220 and determines the actual machine positions for each of axes 350, 352, 354, 356, and 358 (see FIG. 3) which correspond to machine axes 150, 152, 154, 156, and 158. These machine positions are provided to the motion systems of axes 150, 152, 154, 156, and 158 to position the tool 141 supported by tool spindle 138 and part 160. Exemplary motion systems include servo motors. The machine positions determined by virtual kinematics machine 214 are represented by position data 230 which are sent to a real time mill machine 232. Position data 230 does not need to be presented to real time mill 232 all at once, but rather virtual kinematics machine 214 may place one or more next positions for a given axis on a stack that is read by real time mill 232 as needed. Therefore, real time mill 232 may be moving from a first position to a second position (through a series of intermediate points) while virtual kinematics machine 214 is determining the steps to take from the second position to a third position.

Concurrent Programming

By having software controller 202 generate virtual kinematics machine 214 based on a specified machine configuration 208 and a generalized kinematics library 210, software controller 202 may be used in combination with a variety of actual machines. For instance, if platform 120 was tiltable about x-axis 152 this may be taken into account by the machine configuration 208 passed to software controller 202.

This increases not only the flexibility of software controller 202, but also the usefulness of software controller 202. For example, as shown in FIG. 2 two additional virtual machines 234 and 236 are generated. Virtual machine 234 is also based on machine configuration 208. As such, virtual machine 234 is the same as virtual kinematics machine 214, but may be used in a different part of software controller 202 for a different purpose, such as simulation graphics application 245. Virtual machine 236 is based on a second machine configuration 238 received through I/O modules 206. Virtual machines 234 and 236 each receive input data 240 and 242, respectively.

Virtual machines 234 and 236 provides output data 244 and 246. Output data 244 and 246 provides the information requested for an application. In one embodiment, the output data for one or both of virtual machines 234 and 236 is machine axis positions, such as for a real time mill. In the illustrated embodiment, virtual machine 234 is coupled to a simulation graphics software application 245. In one embodiment, the simulation graphics application 245 is requesting the tool tip position to present on a display the tool tip position during machine run-time tool graphics display. This may be determined from the positions of all of the machine tool system axes positions. Other exemplary applications include a wire frame graphics software application, and an exporter software application, or other suitable applications 247. In one embodiment, exemplary output data includes the current shape of the machined part or a simulated shape of the machined part based on the programmed movements of the tool 141 to be displayed by simulation graphics application 245 including the position of the tool 141.

In one embodiment, virtual kinematics machine 214 is based on machine configuration 208 and is processing part program 204 to provide position data 230 to real time mill 232 and virtual machine 236 is based on machine configuration 238 and is processing a part program, as input data 242, to provide position data as output data 246. As such, a user of software controller 202 may be cutting a part 160 with real time mill 232, such as the 5-axis machine illustrated in FIG. 1, while programming another part on a four axis machine defined by machine configuration 236 for verification with the simulation graphics software application 245 or for provision to a real time mill 232 associated with the four axis machine. One reason for displaying the output data 246 on a display is to check for interferences and other trouble geometries or to check the estimated time for cutting the part 160. In this manner, software controller 202 permits concurrent programming of multiple machines through the implementation of virtual machines, such as virtual machines 214, 234, and 236. Software controller 202 may also be implemented on a stand-alone determiner, such as a laptop. In this manner, a user may program a virtual machine corresponding to machine tool system 100 and then provide the resultant machine program to a machine tool system to machine a part or view with a simulation graphics application 245. In this example, the resultant position data may be an NC program or a conversational program.

Cascading Method

As stated herein, in one example virtual kinematics machine 214 determines the positions of axes 250, 252, 254, 256, and 258 based on a plurality of input tool positions. In one embodiment, virtual machine 214 determines the positions of axes 250, 252, 254, 256, and 258 through a cascading method 400.

Figure 8:
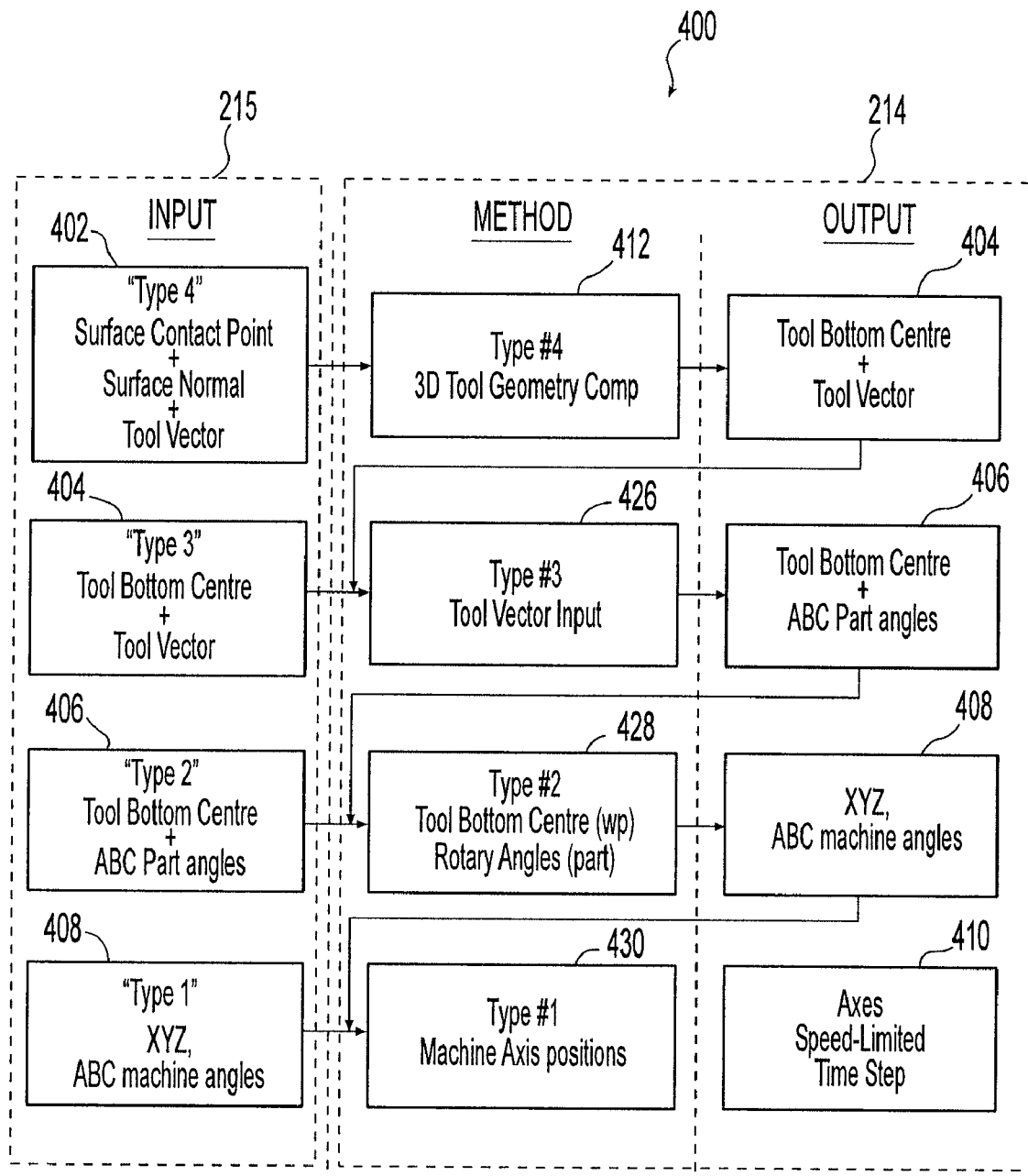
FIG. 8 illustrates a representative view of a cascade method of the motion control system of FIG. 2.

The cascading method 400 is illustrated in FIG. 8. Referring to FIG. 8, four different types of input tool position information 402, 404, 406, and 408 may be provided to the cascading method 400 from which the positions of axes 250, 252, 254, 256, and 258 may be determined. Tool position information 402 is referred to herein as Type 4 data and includes a surface contact point on the part for the tool, a surface normal vector of the part surface at the contact point, and a tool vector relative to the workpiece coordinate frame 282. Tool position information 404 is referred to herein as Type 3 data and includes a linear tool tip position and a tool vector direction relative to the workpiece coordinate frame 282. Tool position information 406 is referred to herein as Type 2 data and includes a linear tool tip position relative to the workpiece coordinate system 282 and rotary axes positions relative to the part coordinate system 285 (FIG. 20). The part coordinate system 285 includes rotary offsets to align the workpiece coordinate system to the machine reference coordinate system 284. If the offsets are zero then it is directly relative to the machine coordinate frame 284. As is known in the art, the part setup coordinate system 285 is a commonly referenced coordinate system and is included herein to provide the ability to either process received data or output data relative to that frame of reference. The offsets for the part setup coordinate system 285 are taken into account in the Part Setup Matrix 290 in FIG. 7B. Tool position information 408 is referred to herein as Type 1 data and includes linear axes positions and rotary axes positions relative to the machine coordinate frame 284.

As illustrated in FIG. 8, depending on what "Type" of input tool data is received, the cascading method 400 cascades down determining the lower number types of input tool data until the axis positions and corresponding times 410 of axes 250, 252, 254, 256, and 258 are ultimately determined.

The host application software 215 calls virtual kinematics machine 214 using Get and Set functions in accordance with standard object-oriented design principles. There are separate Set functions for each of the four input types listed above. When a Set function is called, virtual kinematics machine 214 processes the data through the cascading method 400.

In one example Type 4 data is provided to virtual kinematics machine 214 through a command from host software application 215, KM1.SetPositionType#4(x,y,z, u,v,w, i,j,k). The surface contact point is specified by (x,y,z). The surface normal vector is specified by (u,v,w). The tool axis vector is specified by (i,j,k). Each of the input surface point, surface normal vector and tool vector are defined relative to the workpiece coordinate system 282.

Determination of Type 3 Data

The cascading method 400 includes a method for determining Type 3 data from the provided Type 4. As stated earlier, the Type 3 data includes a tool bottom center and a tool vector both relative to the workpiece coordinate system 282. Method 412 takes into account the shape of the tool 141 in determining the tool bottom center 416 (see FIG. 22) and the tool vector 422. In one example, method 412 uses the current tool outer radius and corner radius to determine the tool bottom center 416 and the tool vector 422.

Figure 22:
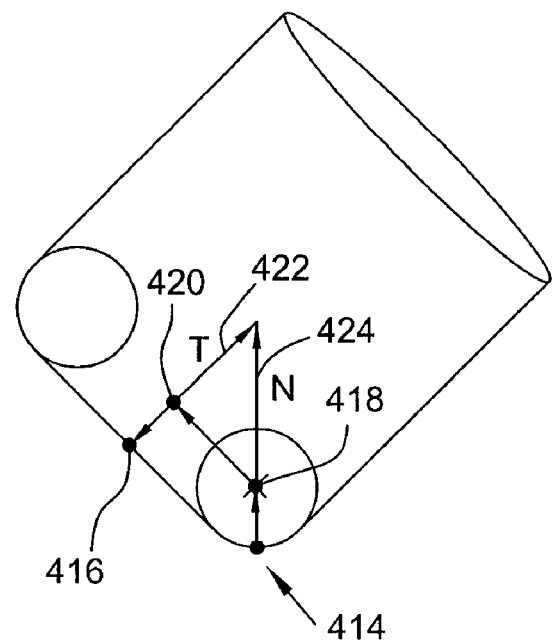
FIG. 22 illustrates the relationship between a surface contact point at a surface normal, a tool vector and the and a tool bottom center point.

Referring to FIG. 22, a surface contact point 414 and a tool bottom center point 416 are shown. A center 418 of the tool corner radius and a tool center 420 point are also shown. Finally a tool vector 422 and a surface normal vector 424 through point 414 are shown.

The relationship between the surface contact point 414 and tool bottom center point 416 is provided by equation 3

$$ToolTip = P + r \times (\hat{N} - \hat{T}) + (R - r) \times \left( \frac{\hat{N} - (\hat{N} \cdot \hat{T})\hat{T}}{|\hat{N} - (\hat{N} \cdot \hat{T})\hat{T}|} \right) \quad (3)$$

wherein $P$ = surface contact point on workpiece;

$N$ = surface normal vector at $P$;

$T$ = tool axis vector;

$R$ = tool outer major radius;

$r$ = Radius of tool

Equation 3 describes the movement from the surface contact point 414 to the tool bottom center point. The term $r \times (\hat{N} - \hat{T})$ combines 414→418 and 420→416 and the term $$(R - r) \times \left( \frac{\hat{N} - (\hat{N} \cdot \hat{T})\hat{T}}{|\hat{N} - (\hat{N} \cdot \hat{T})\hat{T}|} \right) \text{ determines vector } 418 \rightarrow 420.$$

Variables P, N, and T are provided through the Type 4 input data provided. Variables R and r are provided through a tool configuration file. Based on equation 3, tool bottom center point 416 is determined.

Figure 23:
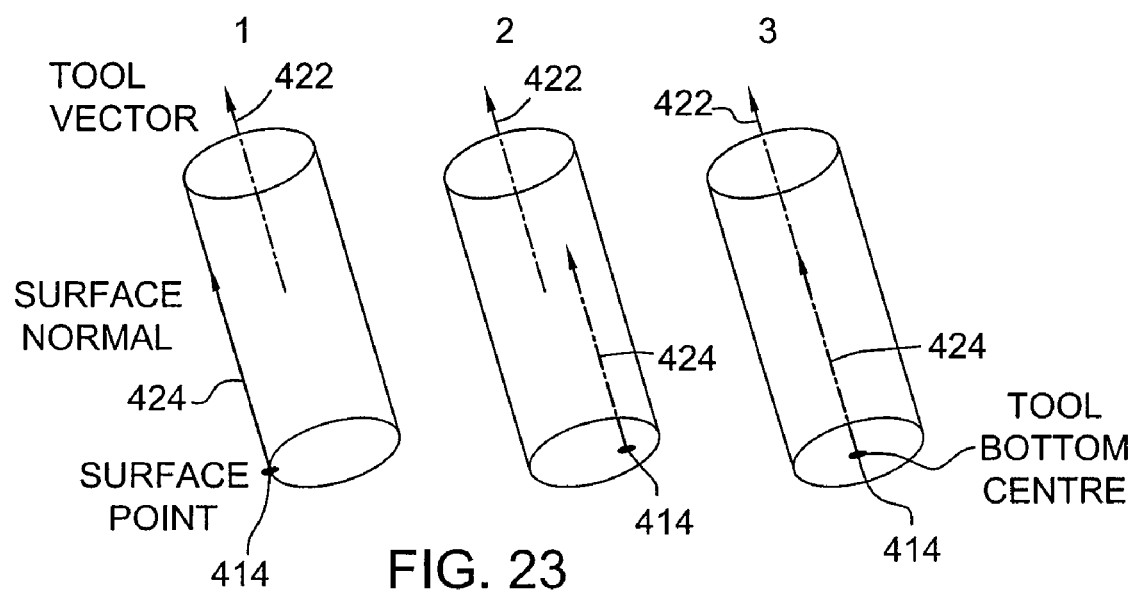
FIG. 23 illustrates the selection of a tool bottom center point in a case having multiple solutions.

In the case shown in FIG. 23, wherein the tool vector 422 is coincident with the surface normal vector 424, there are infinite solutions to position the tool tangentially if the tool outer radius is not equal to the tool corner radius. In this case, method 412 positions tool bottom centre 416 to contact the surface point 414, which eliminates the ambiguity of the solution. The infinite solution case does not exist for ballnose endmills where the tool corner radius equals the tool center radius.

Method 412 returns the tool bottom center location 416 relative to the workpiece coordinate system 282 along with the tool vector 422 provided as part of the Type 4 data. Type 3 data is provided to the next level of method 400 in virtual kinematics machine 214 through a command KM1.SetPositionType#3(x,y,z, i,j,k). This command could also be initiated external to virtual kinematics machine 214 by the host software application 215.

The cascading method 400 includes a method 426 for determining Type 2 data 406 from the Type 3 404. As stated earlier, the Type 2 data 406 includes a tool bottom center 416 relative to the workpiece coordinate system 282 and the rotary axes positions relative to the part setup coordinate system 285. Method 426 determines a solution for the machine rotational axes (B-axis 256 and C-axis 258) to align the tool spindle 138 of machine tool system 100 to the orientation of the tool vector 422 of the Type 3 data relative to the workpiece. For machine tool system 100, there may be two or more solutions for the positions of B-axis 256 and C-axis 258 that result in spindle 138 being aligned with the tool vector 422 of the input tool position. The determination of the Type 2 data 406 is described herein.

The cascading method 400 further includes a method 428 for calculating Type 1 data 408 from Type 2 data 406. The method 428 selects one of the two possible solutions of the B-axis 256 and C-axis 258 that result in spindle axis 138 being aligned with the tool vector 422 of the input tool position. Further, the linear axes positions are different for each of the two solutions of the B-axis 256 and C-axis 258. In one embodiment, method 428 selects the rotary positions of the B-axis 256 and C-axis 258 based on the last position of the tool, the movement type, the machine axes limits, and/or whether the tool will move through the machine's point. The output of method 428 is the type 1 data (linear and rotary axes positions for machine tool system 100).

The Type 1 data 408 is provided to a method 430 of cascading method 400. Method 430 determines an axis speed-limited time step for the movement of the various axes to the positions specified in Type 1 data 408. In one embodiment, the time step is based on the feedrate of the tool tip relative to the workpiece. The feedrate may be adjusted to accommodate violations of the maximum machine axes velocities, if necessary. The method updates the kinematics machine axes positions and stores the position data for output. As mentioned herein, the updated axes positions are provided to virtual kinematics machine 214 for updating of matrix stacks 216 as needed.

Determination of Type 2 Data

Returning to method 426 of cascading method 400, the Type 2 data 406 is determined from the Type 3 data 404. In one embodiment, method 426 includes a vector-based method to determine the inverse kinematics of the system 100 based on the tool bottom center point 416 and the tool vector 422 which is a vector for the tool orientation relative to the workpiece coordinate system 282. Although discussed in connection with system 100, method 426 may accommodate any orthogonal 5-axis machine.

Method 426, in one embodiment, follows the following progression. First, the tool vector 422 with respect to the workpiece coordinate system is transformed into the machine coordinate frame 284 by applying the Part Setup transformation matrix. The Part Setup transformation matrix, as illustrated in FIG. 7B, contains all the offsets for the machine axes connected in the kinematics linkage of the axes that move the part.

In general there are two possible solutions for any given tool position for an orthogonal 5-axis machine except when the tilt axis 156 aligns the spindle axis 139 to the rotary axis direction vector 158. In this case, there are infinite solutions because the machine is positioned to the machine singularity point.

Method 426 checks to determine if the spindle axis 139 of rotation lies along the machine singularity point. Exemplary situations wherein the spindle axis 139 of rotation lies along the machine singularity point are shown in FIGS. 10A-C. FIG. 10A illustrates the situation of machine tool system 100 wherein a spindle axis 139 is parallel to a rotary axis 158 platform 120 due to the position of tilt axis 156. Referring to FIG. 10B, a spindle axis 161 is parallel to a rotary axis 163 of a rotatable platform 167 which is supported on a tiltable platform 169 due to the position of a tilt axis 165. Referring to FIG. 10C, a spindle axis 171 is parallel to a rotary axis 173 of a rotatable member 175 due to a position of a tilt axis 177 of an intermediate tiltable member 179.

Figure 9A:
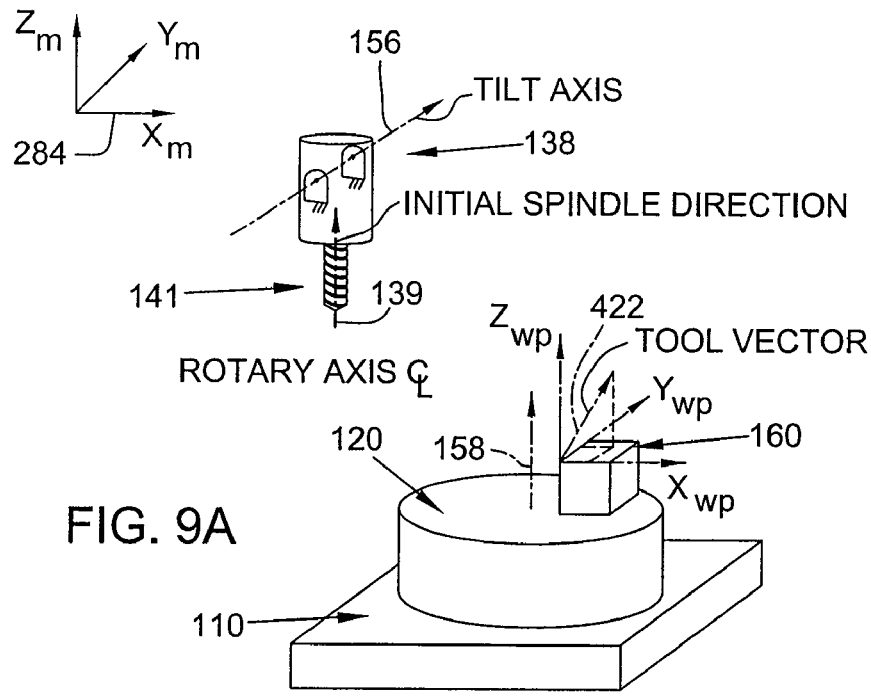
FIGS. 9A-9C relate to a method to determine the rotary angle of the tilt axis of the machine tool system of FIG. 1.
Figure 9B:
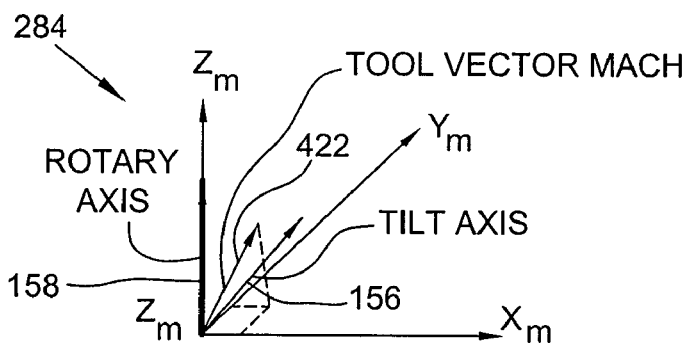
Figure 9C:
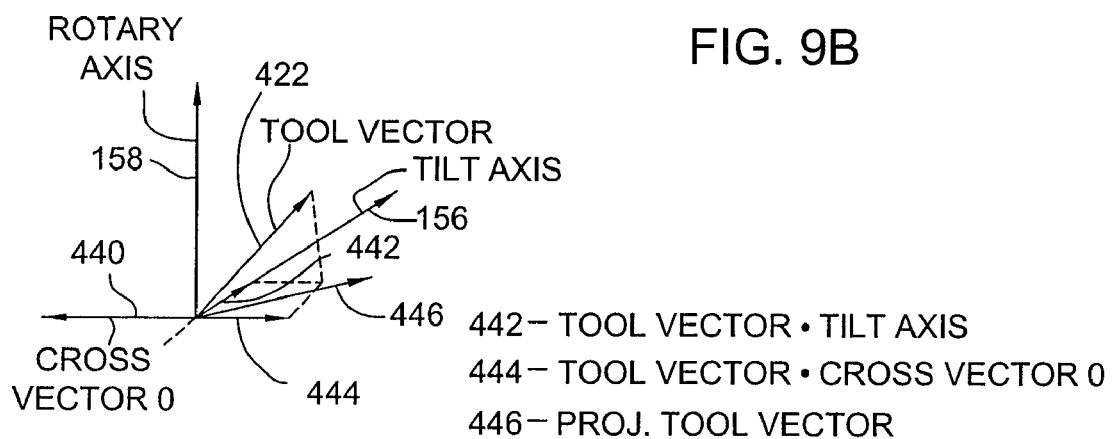

Method 426 determines the rotary angle of the tilt axis, B-axis 156 for machine tool system 100, based on the relationship of equation 4 as illustrated in FIGS. 9A-C.

$$TiltAngel = \arccos(\overrightarrow{ToolVector_{mach}} \cdot \overrightarrow{InitialSpindleAxisDirection}) \quad (4)$$

wherein the

TiltAngle is the rotary angle of the B-axis;

$\overrightarrow{ToolVector_{mach}}$ 434 is the input tool vector in the machine coordinate system 436; and $\overrightarrow{InitialSpindleAxisDirection}$ 432 is the spindle axis of rotation with respect to the machine coordinate system when the Tilt Axis angle is zero.

If the TiltAngle is equal to the singularity point tilt angle within a tolerance of the tilt axis encoder resolution or alternatively within an operator specified tilt axis precision, then method 426 considers tool vector 422 is lying along the machine singularity point. In this situation, method 426 sets the rotary angle for B-axis 156 to the last rotary angle position or to zero, if no last rotary position has been set in the virtual kinematics machine. This prevents the attempted determination of rotary angles for degenerate cases.

If the transformed tool vector 422 does not lie along the machine's singularity point, the rotary angle for the C-axis 158 is determined with the following steps with reference to FIGS. 9A-C. An orthogonal coordinate system is setup using the rotary axis 158, the tilt axis 156, and the CrossVector0 440 ("TCR coordinate system"), which is perpendicular to the rotary axis 158 and the tilt axis 156. The direction of CrossVector0 440 is given by equation 5

$$\overrightarrow{CrossVector0} = \overrightarrow{RotaryAxis} \otimes \overrightarrow{TiltAxis} \quad (5)$$

The component of the tool vector 422 along the tilt axis 156 is expressed by equation 6 and labeled as 442 in FIG. 9C.

$$ToolVector_{TCR}[0] = \overrightarrow{ToolVector_{Mach}} \cdot \overrightarrow{TiltAxis} \quad (6)$$

The component of the tool vector 422 along the CrossVector0 440 direction is expressed by equation 7 and labelled as 444 in FIG. 9C.

$$ToolVector_{TCR}[1] = \overrightarrow{ToolVector_{Mach}} \cdot \overrightarrow{CrossVector0} \quad (7)$$

The tool vector projected in the TiltAxis and CrossVector0 plane is expressed by equation 8 and labeled as 446 in FIG. 9C $$\overrightarrow{ProjToolVector_{TCR}} = \begin{bmatrix} ToolVector_{TCR}[0]/mag \\ ToolVector_{TCR}[1]/mag \\ 0 \end{bmatrix}, \quad (8)$$

wherein $$mag = \sqrt{(ToolVector_{TCR}[0])^2 + (ToolVector_{TCR}[1])^2} \quad (9)$$

The rotary angle of C-axis 158 is determined by equation 10.

$$RotaryAngle = \arctan2\left(\frac{ProjToolVector_{TCR}[0]}{ProjToolVector[1]}\right) \quad (10)$$

As mentioned herein the tilt and rotary angles determined by method 426 for b-axis 156 and c-axis 158, respectively are only one of two possible solutions for a general orthogonal 5-axis machine. The best solution is selected in method 428.

Determination of Type I Data

In one embodiment, method 428 determines which of the solutions for the rotary and tilt angles to select. Several factors may be considered in determining the preferred solution for the rotary and tilt angles. Exemplary factors include the interpolation path of the tool from the last commanded position to the next tool position that is being determined and whether a tilt axis preference has been selected. Two exemplary interpolation paths include (1) interpolating the tool vector 422 along a trajectory between the tool positions and (2) interpolating the machine rotary and tilt angles linearly between the tool positions. In one embodiment, the interpolation is a linear interpolation.

In one embodiment, virtual machine 214 further includes a method to interpolate the shortest angular traverse direction between tool positions. This method is automatically applied for Type 4 and Type 3 input tool positions. This method is also automatically used when Interpolation Type 1 is active.

Figure 21:
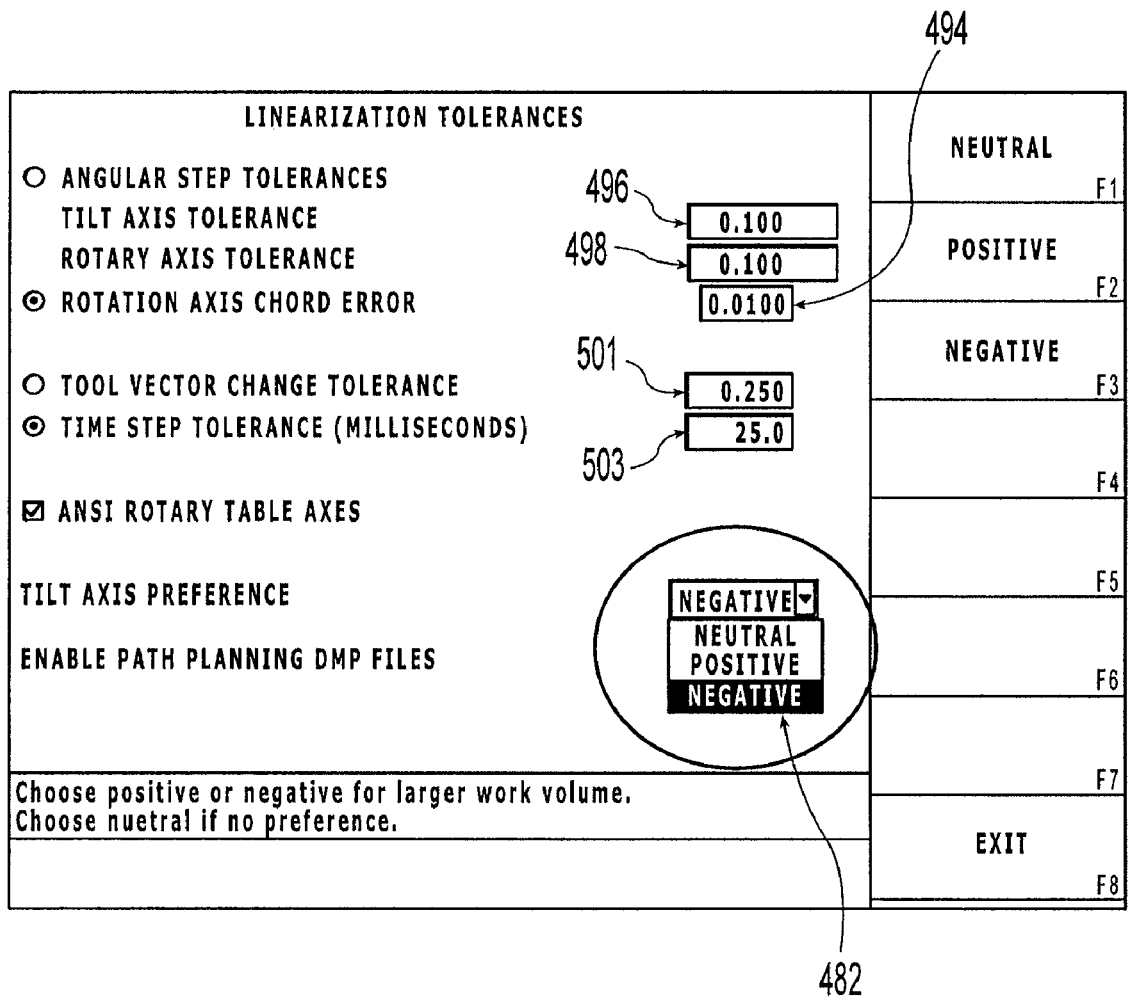
FIG. 21 illustrates an exemplary input screen for specifying a tilt axis preference and various parameters.

Through the tilt axis preference, an operator may force virtual kinematics machine 214 to keep the tilt axis on either side of the machine's singularity point. As shown in FIG. 21, an operator may select a negative tilt axis preference, a positive tile axis preference, or no preference (neutral) through a selection input 482 or within the part program. The operator may simply specify a preference so that the machine uses that tilt preference if possible or may force a preference so that the machine cannot use the other tilt axis direction (negative or positive). One application wherein an operator or software controller 202 may specify a required or forced tilt axis preference is when a feature is being defined relative to a transform plane 298 (see FIG. 20). The tilt axis preference feature is useful when the tilt axis has highly asymmetric axes limits in the positive and negative directions about the singularity point and or when the machine work volume is much larger on one side of the singularity point than the other. The user may also force the virtual kinematics machine 214 to use the specified tilt axis preference side when the interpolation path of the tool is not of any concern.

Figure 11A:
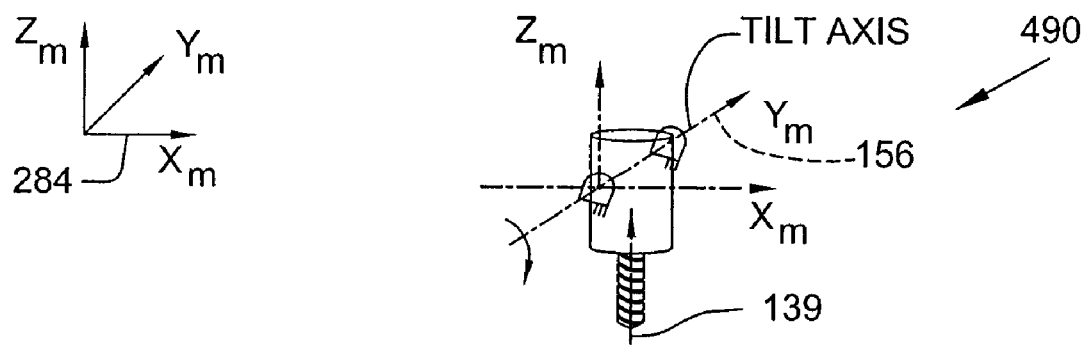
FIG. 11A illustrates a machine singularity point of the machine tool system of FIG. 1.
Figure 11A:
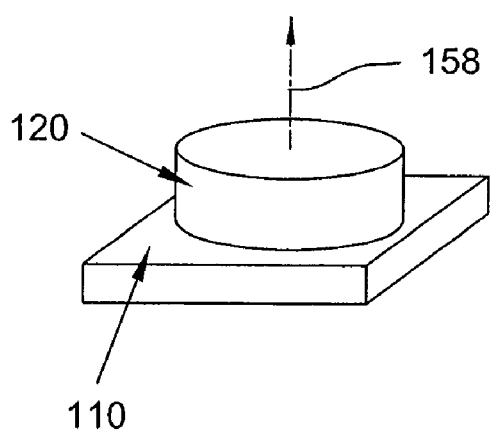
Figure 11B:
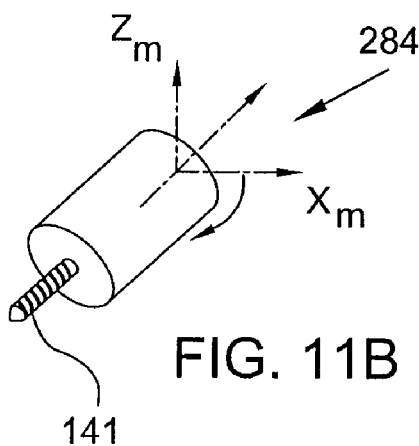
FIG. 11B illustrates a tilt angle corresponding to a positive tilt axis preference.
Figure 11C:
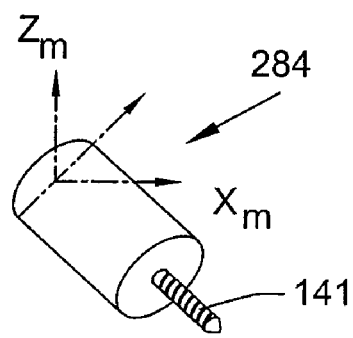
FIG. 11C illustrates a tilt angle corresponding to a negative tilt axis preference.

Referring to FIG. 11A, the machine singularity point 490 for machine tool system 100 is shown. Referring to FIG. 11B, a tilt angle corresponding to a positive tilt axis preference is shown. Referring to FIG. 11C, a tilt angle corresponding to a negative tilt axis preference is shown.

In one embodiment, method 428 proceeds as follows. First, if a tilt axis preference is activated, then the solution corresponding to the preferred tilt axis direction is selected and the rotary and tilt angles are stored as a first solution. Otherwise, if (1) Type 4 data is input, (2) Type 3 data is input, (3) a shortest angular traverse mode is active, or (4) a tool vector interpolation is active, then a shortest angular traverse rotary and tilt axis angular solution is determined with the following method.

Shortest Angular Traverse Method

First, the change in rotary angle and the change in tilt angle are determined as expressed in equations (11) and (12).

$$\Delta RotaryAngle1 = RotaryAngleNext - RotaryAngleLast \quad (11)$$

wherein $\Delta RotaryAngle1$ is the change in the rotary angle

RotaryAngleNext is the rotary angle being considered; and

RotaryAngleLast is the rotary angle of the previous position.

$$\Delta TiltAngle1 = TiltAngleNext - TiltAngleLast \quad (12)$$

wherein $\Delta TiltAngle1$ is the change in the tilt angle;

TiltAngleNext is the tilt angle being considered; and

TiltAngleLast is the tilt angle of the previous position.

There are three cases to consider when computing the shortest angular traverse solution:

Case I- If $\Delta RotaryAngle1 > \frac{\pi}{2}$

Calculate the alternate rotary solution.

Case II- If $\Delta RotaryAngle1 < \frac{\pi}{2}$

Solution #1 is the shortest angular traverse solution.

Case III- If $\Delta RotaryAngle1 = \frac{\pi}{2}$

In case III, both of the rotary axis angular solutions are equidistant; neither solution is shorter. In this case, $\Delta TiltAngle$ is considered. The alternate angular solution and the angular differences to the last position are determined:

$$\Delta TiltAngle2 = AlternateTiltAngle - TiltAngleLast \quad (13)$$

wherein

AlternateTiltAngle is the alternate angular solution;

$\Delta TiltAngle2$ is the difference between the last tilt axis position and the alternate angular solution.

If ($\Delta TiltAngle1 == \Delta TiltAngle2$), then both solutions are equidistant and the tilt axis preference option is selected, then the tilt angle is set to solution #1. Else, if ($\Delta TiltAngle1 \neq \Delta TiltAngle2$) the shortest tilt axis solution is selected and is set equal to solution #1.

Returning to the determination of Type 1 data, next, the forward kinematics are determined for the selected solution's rotary and tilt axes angles to determine the linear machine axes positions. The linear axis positions for the x-axis and the y-axis are determined through the part matrix stack 280. The linear axis position for the z-axis is determined through the tool matrix stack 270. In one embodiment, the linear axes positions are determined by setting the rotary axis and tilt axes object positions to the chosen solution 1 or solution 2; set all linear axes object positions to zero; and recompute the Part and Tool Matrix stacks (280 and 270), compute forward kinematics to determine the part point in machine coordinate system and the tool tip in the machine coordinate system as represented by equations 14 and 15.

$$TransformedPartPoint_{Mach} = PartMatrixStack.ForwardTransform(PartPoint_{WP})$$

$$TransformedToolTip_{Mach} = ToolMatrixStack.ForwardTransform(ToolTip_{SpindleZeroPoint}) \quad (14\text{-}16)$$

$$DeltaVector_{Mach} = TransformedPartPoint_{Mach} - TransformedToolTip_{Mach}$$

DeltaVector is the difference between the transformed part point and the transformed tool tip. This vector is used to translate the linear axes to touch the tool to the correct location on the part. The generalized kinematics library 210 knows the interdependencies between the various axes 270 and whether a given axis is a part of the part matrix stack 280 or the tool matrix stack 270.

The determined rotary and tilt axes positions and the linear axes positions are checked to determine if they are within a predefined region. An exemplary predefined region is the region bounded by the limits of the various axes. If any of the axes positions are out of machine limits, then an error is reported to an operator through I/O modules 206. In one embodiment, the error is reported through an error message on a display. In one embodiment, the error is reported if any one of the following three conditions is satisfied: (1) there are less than 5-axes on the machine tool system; (2) the tilt axis preference is active and the operator has specified that a particular tilt axis direction must be used (force tilt axis preference); or (3) Type 2 input data was the highest order data provided to cascading method 400 and tool vector interpolation is turned off. Otherwise, solution #2 is considered.

Determine Second Solution

For situations wherein the machine positions are not at the machine singularity point 490, the alternate or second solution for machine tool system 100 may be determined based on equations 17 and 18

AlternateRotaryAngle=ConvertToZeroTo2PI(Rotary-
Angle+π)

AlternateTiltAngle=(SingularityTiltAngle−Tilt-
Angle)+SingularityTiltAngle          (17, 18)

wherein
RotaryAngle is the rotary angle for solution 1;
TiltAngle is the tilt angle for solution 1; and
SingularityTiltAngle is the angle of the tilt axis at the singularity point.

Interpolation Relative to the Machine Singularity Point

Interpolation through the machine singularity point must be considered when the last tool position is at the machine singularity point 490 or when interpolation from the last tool position to the next tool position will result in the spindle passing through the machine singularity point 490. In either situation, a method is invoked by method 428 to interpolate known herein as Interpolate About Machine Singularity Point Method ("MSP Interpolation"). In one embodiment, MSP Interpolation keeps the tool 141 in contact with the workpiece and stationary relative to the workpiece as the tool 141 rotates about the machine singularity point 490.

Referring to FIGS. 12A-D, tool 141 remains in contact with part 160 as one or more of the axes of machine tool system 100 moves. In FIGS. 12A-D, part 160 and tool 141 remain in contact through 180 degree rotation about the machine singularity point 490. Tool 141 essentially remains stationary relative to the workpiece 160 during the MSP Interpolation.

Interpolation permits method 428 to select either Solution #1 or Solution #2 when the following conditions are met because MSP Interpolation can handle the spindle axis 139 passing through the machine singularity point 490: MSP Interpolation may be used if any of the following are true (1) Type 4 input data is provided; (2) Type 3 input data is provided; (3) the shortest angle traverse option is active; or (4) tool vector interpolation is active.

Figure 13A:
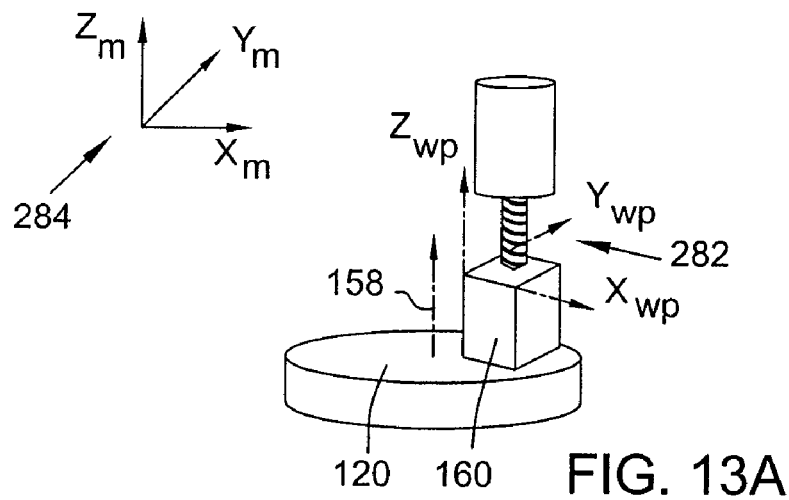
FIGS. 13A-C represent a method which interpolates the tool vector from last position at the machine singularity point, rotates about the machine singularity point, and then interpolates the tool vector from the machine singularity point to next tool position.
Figure 13B:
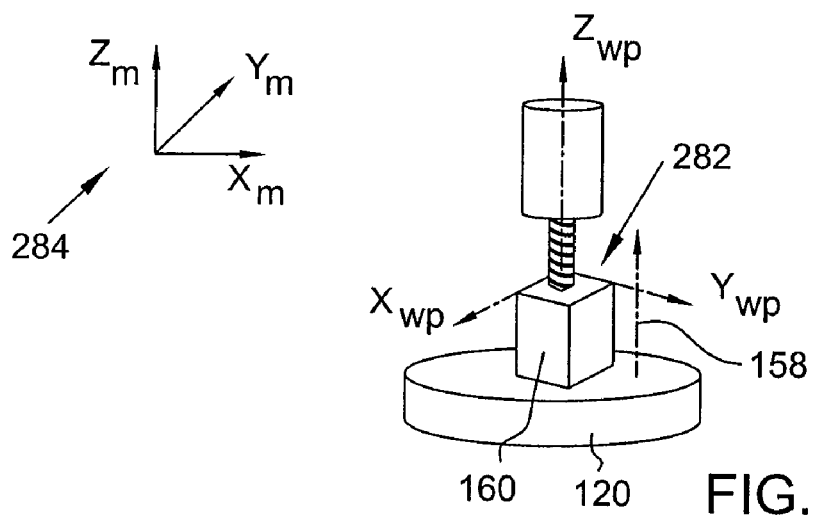
Figure 13C:
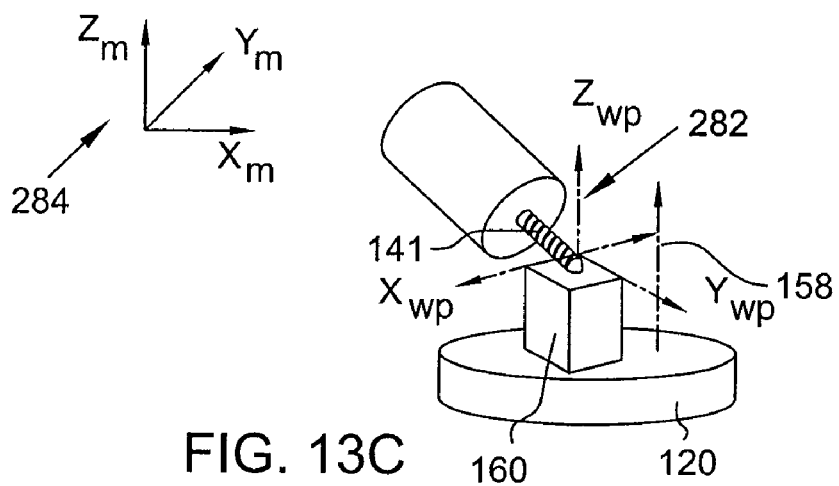

In a first scenario (FIGS. 13A-C), the last tool position is at the machine singularity point 490 and the next tool position is not at the machine singularity point 490. If the tilt axis preference is active, then the solution corresponding to preferred tilt axis side is selected if it is within machine limits. If necessary, the method 428 will invoke the MSP Interpolation to linearly interpolate the tool vector between the last tool position to the next tool position. In this situation, interpolation is then carried out from the machine singularity point 490 to the next tool position using the tilt axis preference solution.

Figure 14A:
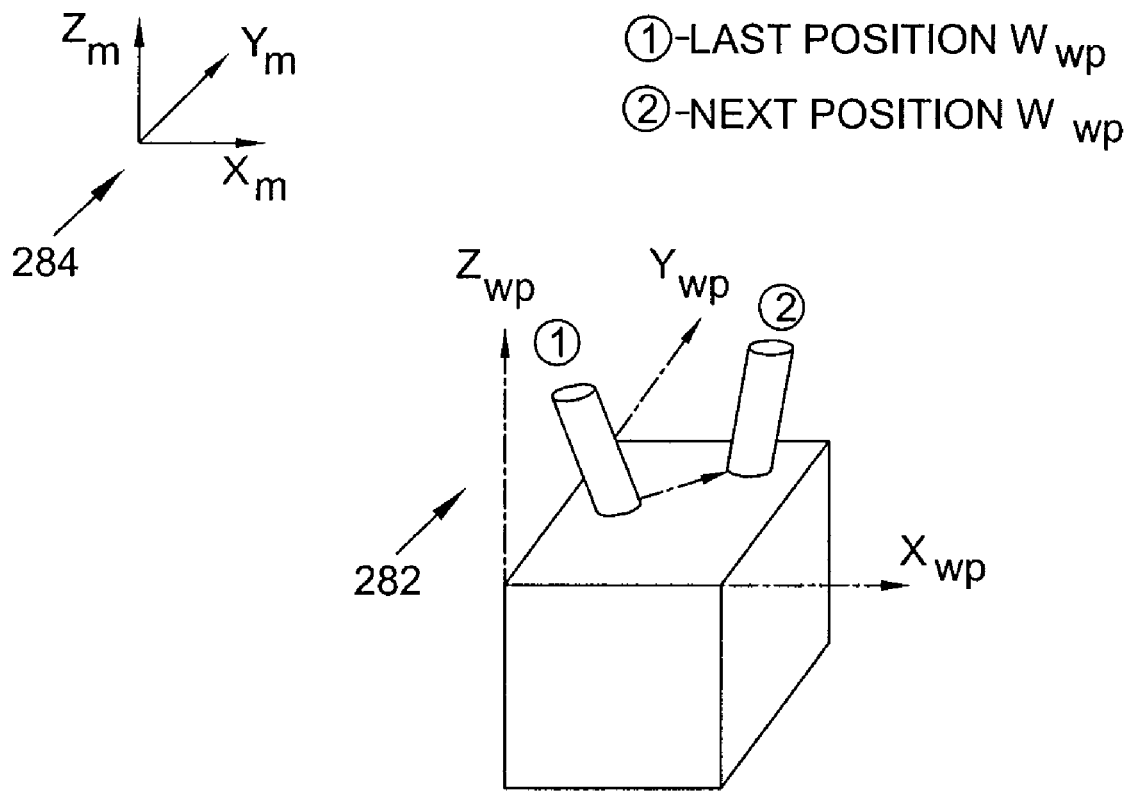
FIG. 14A illustrates a last tool vector position and a next tool vector position.
Figure 14B:
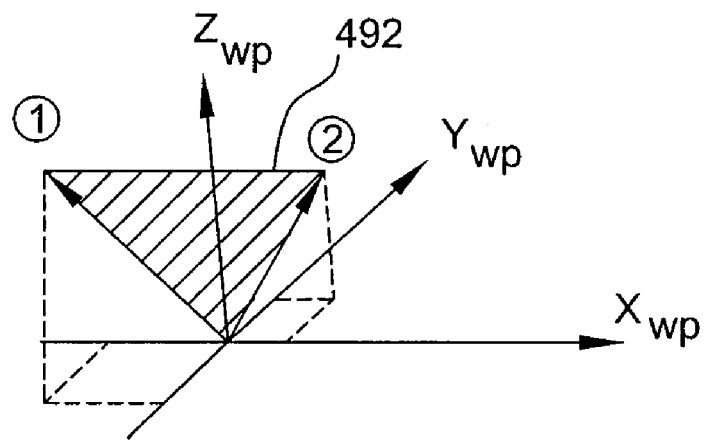
FIG. 14B illustrates a plane defined by the tool vector for the last position and the tool vector for the next position about the coordinate system origin and includes a tool vector that coincides with the machine singularity point.
Figure 14C:
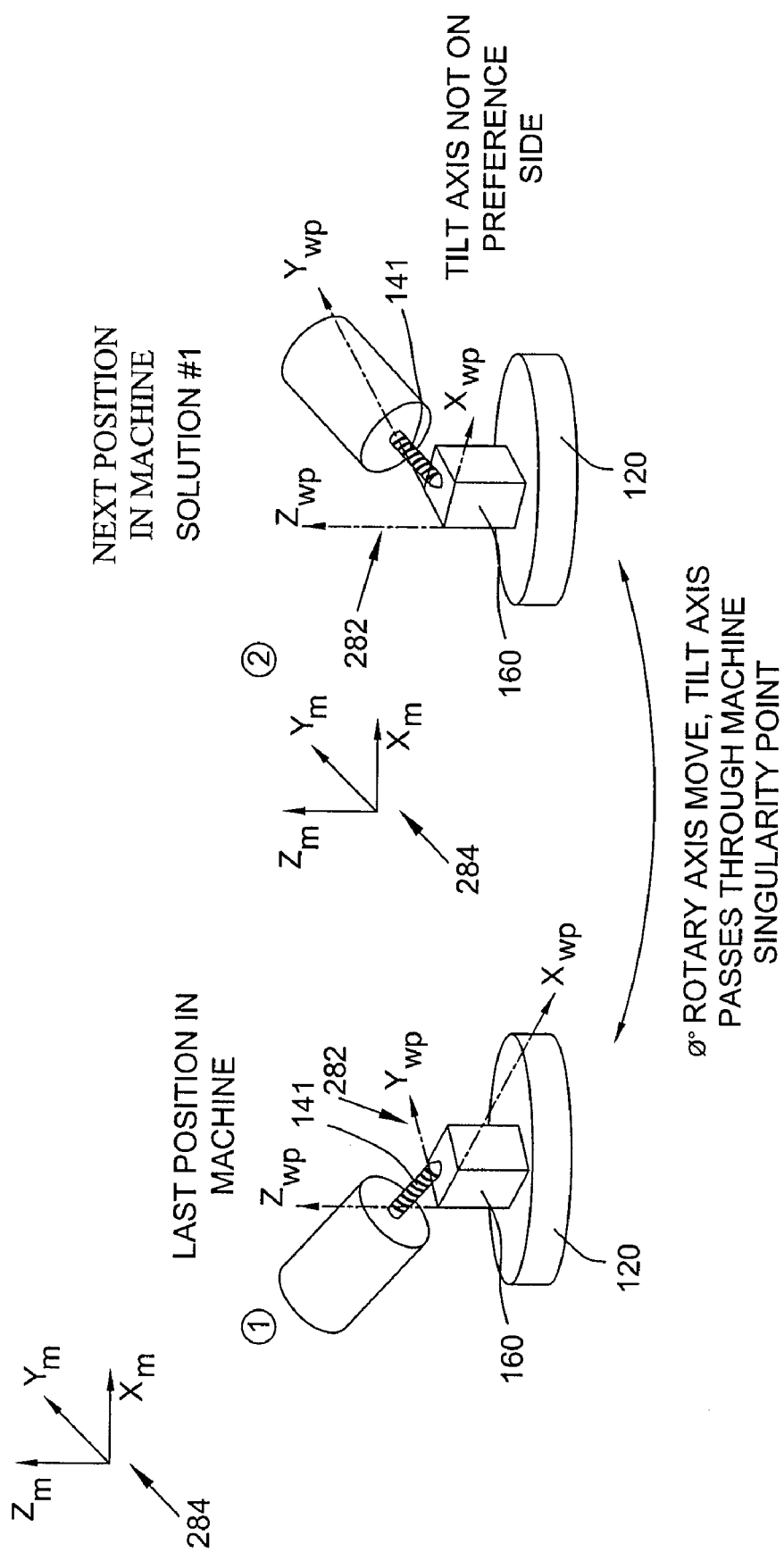
FIG. 14C illustrates a move from the last position to the next position solution #1.

In a second scenario, wherein a zero degree rotation of the rotary axis 158 is contemplated; solution 1 tilt axis is on the opposite side of the singularity point to the last tool position; and solution 1 tilt axis angle is not on the tilt axis preference side as illustrated in FIGS. 14A-C. Referring to FIG. 14B, a plane 492 defined by the tool vector for the last position and the tool vector for the next position (solution 1) about the coordinate system origin and includes a tool vector that coincides with the machine singularity point 490.

Figure 15A:
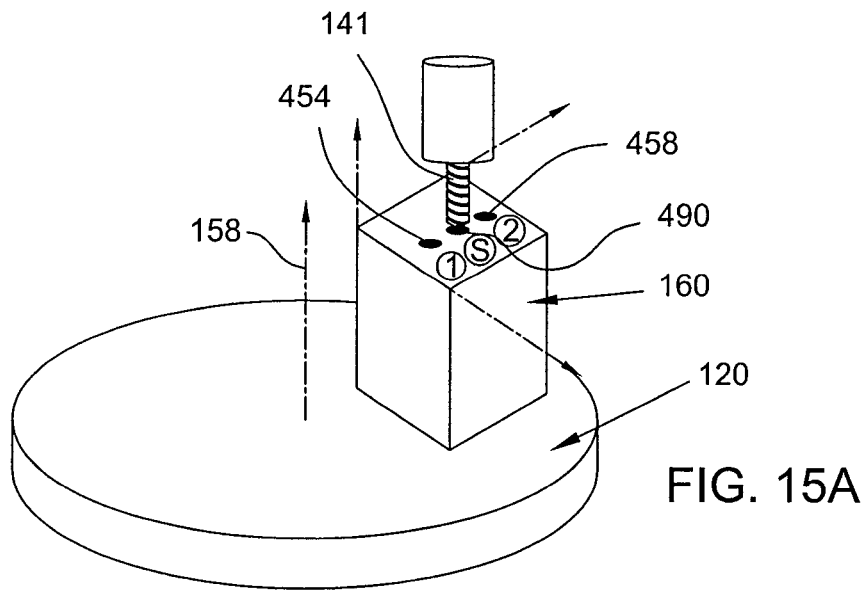
FIGS. 15A-C represent a method which interpolates the tool vector from last position to the machine singularity point, rotates about the machine singularity point, and then interpolates the tool vector from the machine singularity point to next tool position.
Figure 15B:
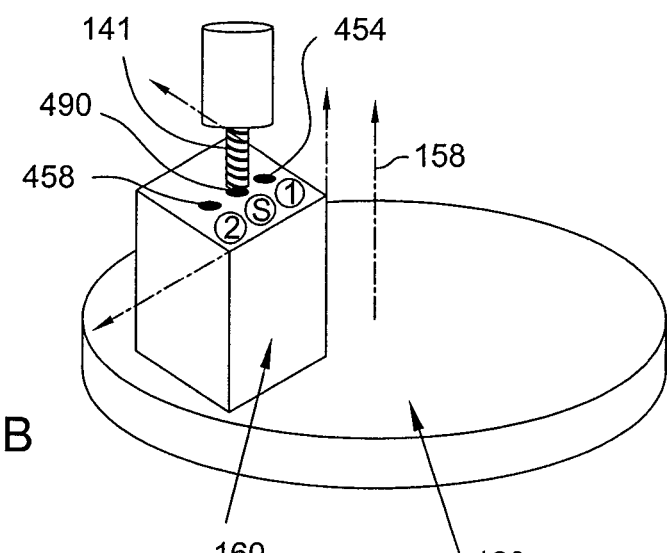
Figure 15C:
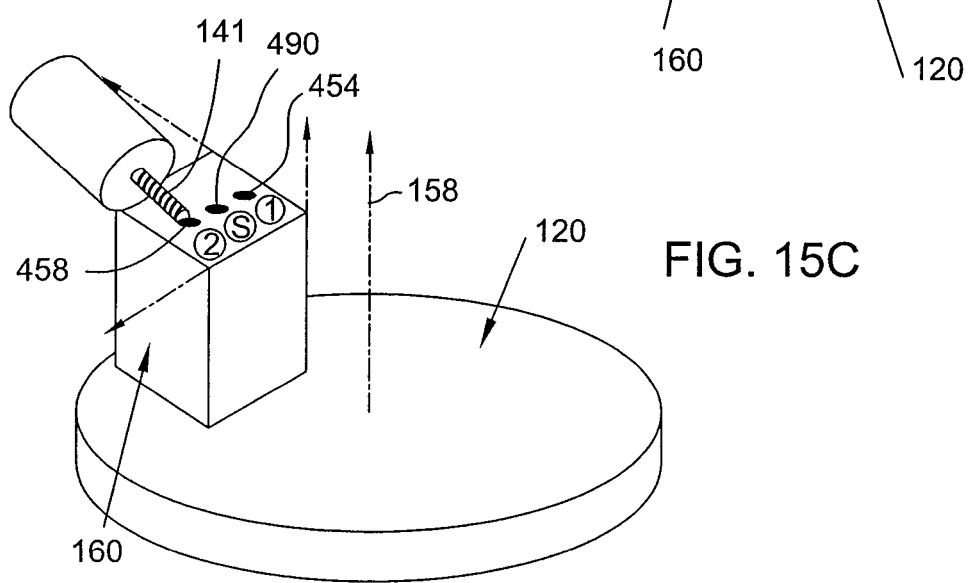

In this scenario, the method will select solution 2 to keep the tilt axis on the preference side provided solution 2 is within machine limits. Then as illustrated in FIGS. 15A-C, the method interpolates the tool vector from last position 454 to the machine singularity point 490 (FIG. 15A), then using the MSP Interpolation rotates about the machine singularity point 490 (FIG. 15B), and then interpolates the tool vector from the machine singularity point 490 to next tool position 458 using Solution 2 (FIG. 15C).

Figure 16A:
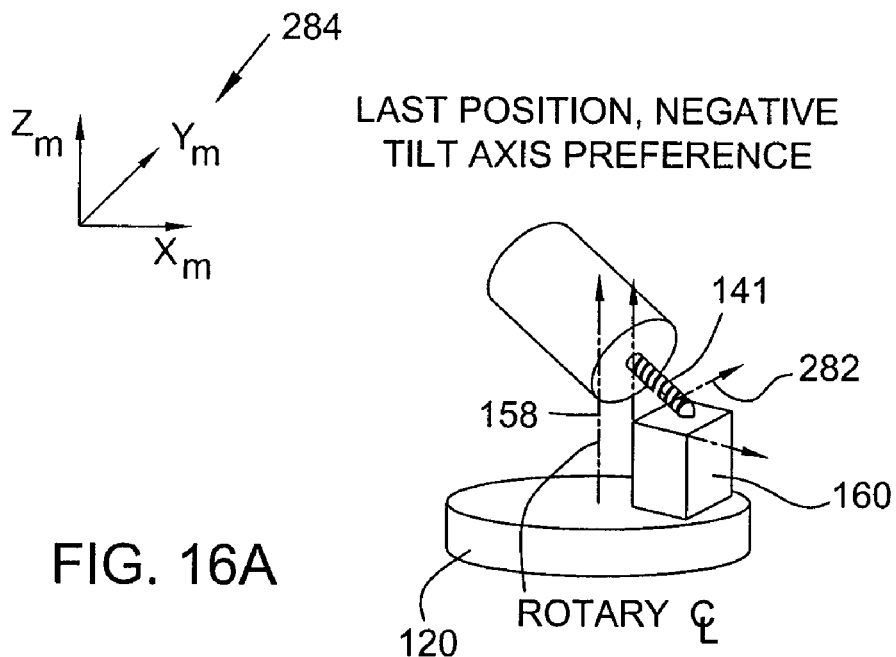
FIGS. 16A and 16B illustrate a last position and a first solution of a next position, both the last position and the first solution of next position having a negative tilt angle on the same side of the machine singularity point.
Figure 16B:
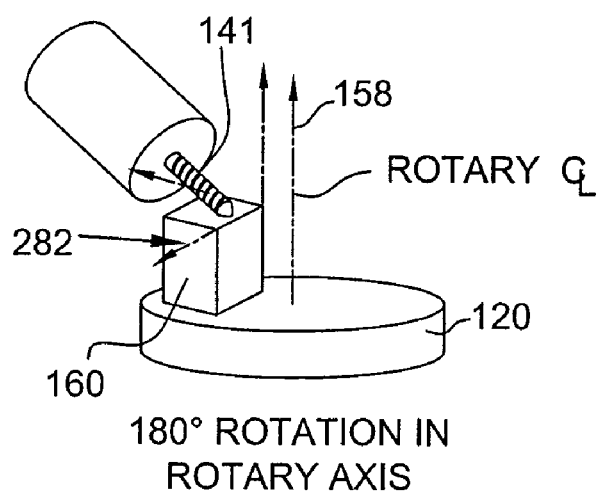
Figure 17A:
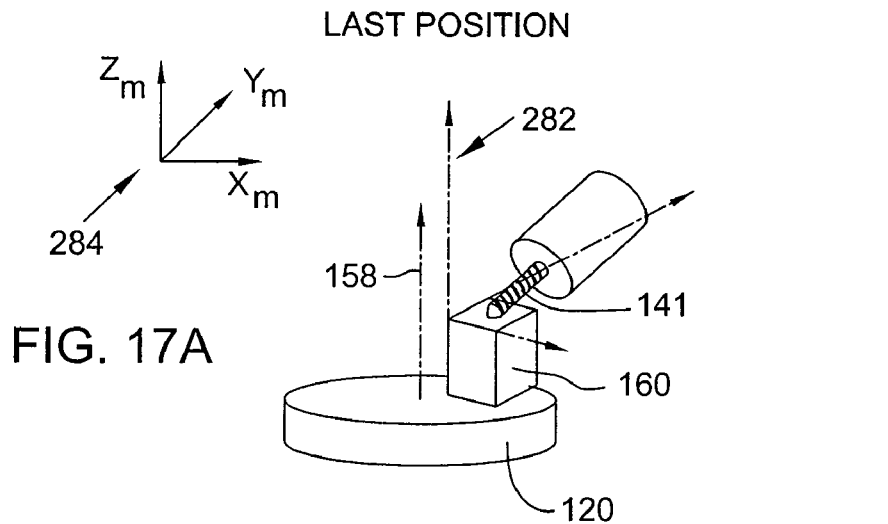
FIGS. 17A-B illustrate a last position and a first solution of a next position having a tilt axis angle on the tilt axis preference side with a 180 degree rotary axis rotation.
Figure 17B:
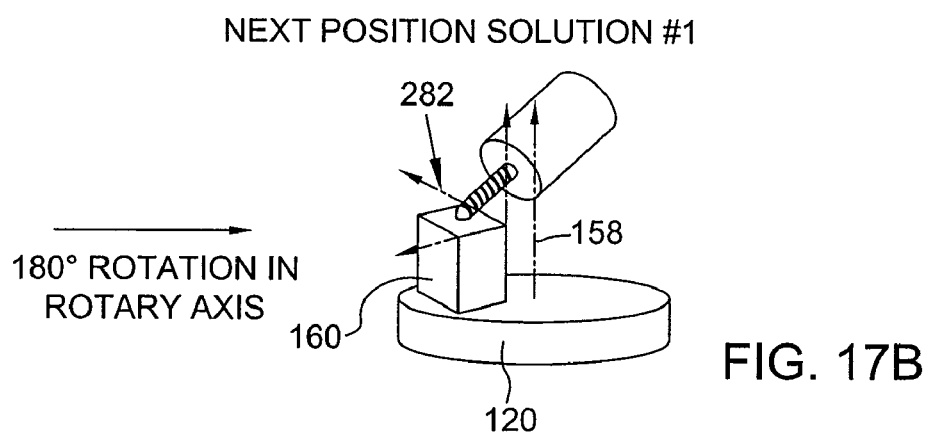

In a third scenario, solution 1 has a 180 degree rotation of the rotary axis 158 and solution 1 tilt axis is on the same side of the machine singularity point as the last tool position as shown in FIGS. 16A and 16B. In this scenario, the outcome changes depending on whether the tilt axis angle for solution 1 is on the tilt axis preference side or not. If the tilt axis angle for solution 1 is on the tilt axis preference side, the method will interpolate from the last position to the machine singularity point 490, then invoke the MSP Interpolation, followed by interpolating the tool vector from the machine singularity point 490 to next tool position which corresponds to solution 1. This is the concept illustrated in FIGS. 15A-C herein and shown in FIGS. 17A and 17B.

Figure 17C:
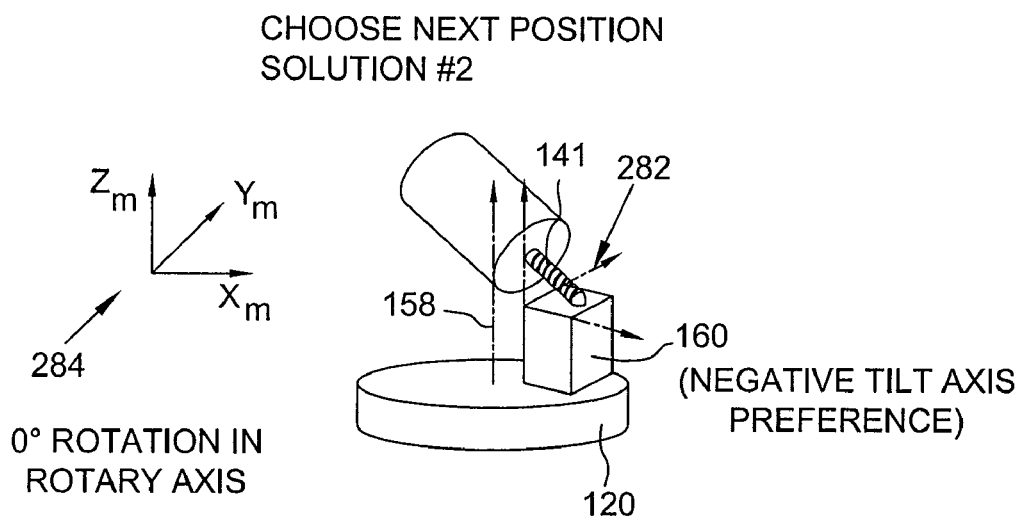
FIG. 17C illustrates a second solution of the next position for FIG. 17A which is chosen if the tilt axis angle for the first solution in FIG. 17B is not on the tilt axis preference side with a zero degree rotary axis rotation.

If the tilt axis angle for solution 1 is not on the tilt axis preference side, the method will select solution 2 and no rotation about the singularity point is necessary. This is illustrated in FIG. 17C.

Figure 18A:
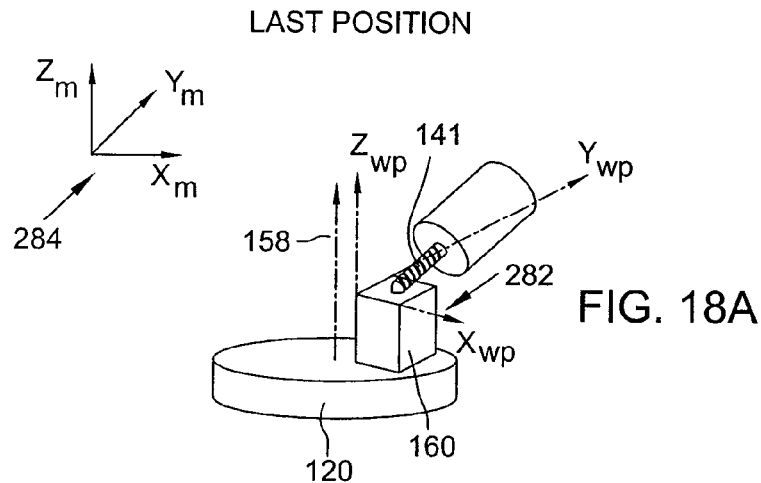
FIGS. 18A-C represents a case where the tool vector should not interpolate through the singularity point and the correct Solution #2 must be selected.
Figure 18B:
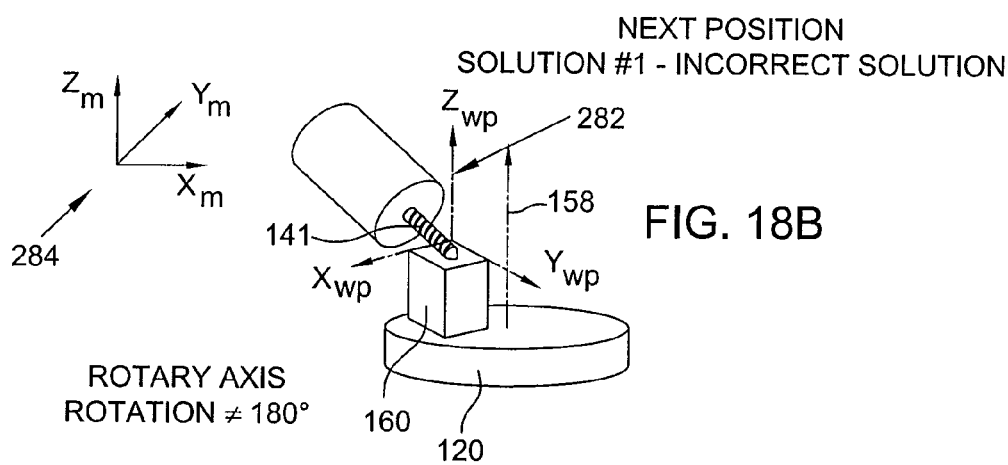
Figure 18C:
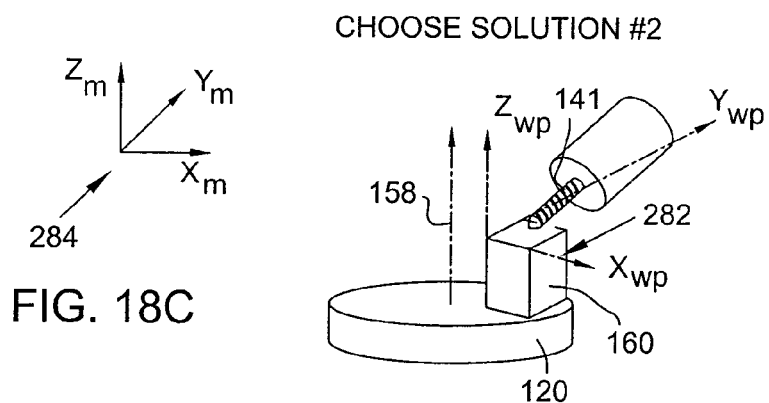

In a fourth scenario (FIGS. 18A-C) wherein none of the prior three scenarios apply, solution 1 has any other rotation of the rotary axis 158 and the tilt axis angle is not on the same side of the machine singularity point 490 as the last position. In this scenario, solution 2 is selected, otherwise the tool vector will not interpolate the correct trajectory relative to the workpiece since solution 1 would interpolate the tool moving through the singularity point.

Once the correct solution is determined, the movement from the last position to the next position is determined through interpolation, if interpolation is selected and not yet active. In some scenarios as described herein this movement includes the tool vector passing through the machine singularity point. In other situations also described herein, this movement does not include the tool vector passing through the machine singularity point. Once the interpolation is completed, the positions which are Type I data 408 are provided to method 430 in the cascading method 400.

Interpolate Tool Vector Passing Through Machine Singularity Point

In the scenarios as described herein wherein the movement from the last tool positions to the next tool position includes the tool vector passing through the machine singularity point 490 the following method is implemented. The path interpolated by this method rotates the tool about the machine singularity point 490 such that the tool tip and tool vector remain stationary relative to the workpiece coordinate system 282. The method is used when the following conditions are satisfied: (1) Tool vector interpolation is active; (2) the last position machine position was previously set; and (3) the rotary axis 158 is present in the machine.

The method follows the following steps. First, it is determined if the last position tilt angle is equal to the machine singularity point tilt angle. If not, the motion is interpolated from the last position to the machine singularity position point by defining an intermediate position at the machine singularity point 490 as described below. The interpolation is done by sending the intermediate machine singularity position through cascade method 400. The motion is then interpolated from the last position to the defined intermediate position at the machine singularity point 490. A rotation is then performed at the machine singularity point 490. Finally, the motion is then interpolated from the intermediate position at the machine singularity point to the next position 490. In the case of interpolating from the last position to the intermediate position at the machine singularity point and from the intermediate position at the machine singularity point to the next position, the interpolation methods either Stage 2 or Stage 1 and Stage 2 discussed herein are implemented.

Identification of Intermediate Position at Machine Singularity Point and Interpolation Thereto For Type 4 input data, if (AngleLastAndNextSurfaceNormal=0) then the surface normal vector for the prior position and the surface normal vector for the next interpolated position are collinear. AngleLastAndNextSurfaceNormal is based on the relationship in following equation.

$$AngleLastAndNextSurfaceNormal = \arccos(\overrightarrow{LastSurfaceNormal} \cdot \overrightarrow{NextSurfaceNormal})$$

If (AngleLastAndNextSurfaceNormal≠0) then the surface normal vector for the prior position and the surface normal vector for the next interpolated position are not collinear.

The surface normal vector for the machine singularity position is provided based on the relationship shown in following equation.

$$\overrightarrow{SingularitySurfaceNormal} = RotateAboutCrossVector2(\overrightarrow{LastSurfaceNormal}, SurfaceNormRotationAngle)$$

wherein $\overrightarrow{CrossVector2}$ is the vector about which the prior position surface normal vector will rotate is determined based on the relationship in equation (19)

$$\overrightarrow{CrossVector2} = \frac{\overrightarrow{LastSurfaceNormal} \otimes \overrightarrow{NextSurfaceNormal}}{|\overrightarrow{LastSurfaceNormal} \otimes \overrightarrow{NextSurfaceNormal}|} \quad (19)$$

and SurfNormRotationAngle is the magnitude of the angular rotation based on the relationship in equation 20

$$SurfNormRotationAngle = \left(\frac{|\Delta 1|}{\Delta 3}\right) * AngleLastAndNextSurfaceNormal \quad (20)$$

wherein

Δ1=ΔSingularityToLastTiltAngle=LastTiltAngle−SingularityTiltAngle

Δ2=ΔSingularityToNextTiltAngle=NextTiltAngle−SingularityTiltAngle

Δ3=ΔTotalTiltAngleTraverse=|ΔSingularityToLastTiltAngle|+|ΔSingularityToNextTiltAngle|   (21-23)

The surface contact point for the machine singularity position is determined based on equation $$SingularitySurfacePoint = \quad (24)$$
$$LastSurfacePoint + \left(\frac{|\Delta 1|}{\Delta 3}\right) * (NextSurfacePoint - LastSurfacePoint)$$

The SingularitySurfaceNormal, SingularitySurfacePoint, and Tool Vector define an intermediate position at the machine singularity point relative to the workpiece. The intermediate position corresponding to the machine singularity point 490 is sent to Type 4 input in the cascade method 400. The movement from the last position to the machine singularity point may now be interpolated as discussed herein.

In cases wherein Type 4 data is not provided the intermediate machine singularity point is determined as follows. If (AngleLastAndNextToolVector=0) then the tool vector for the prior position and the tool vector for the next interpolated position are collinear. AngleLastAndNextToolVector is based on the relationship in equation 25.

$$AngleLastAndNextToolVector = \quad (25)$$
$$\arccos(\overrightarrow{LastToolVector} \cdot \overrightarrow{NextToolVector})$$

If (AngleLastAndNextToolVector≠0) then the tool vector for the prior position and the tool vector for the next interpolated position are not collinear.

The tool vector for the machine singularity position is provided based on the relationship shown in equation 26

$$\overrightarrow{SingularityToolVector} = RotateAboutCrossVector1( \overrightarrow{LastToolVector}, ToolVectorRotationAngle) \quad (26)$$

wherein z,7 is the vector about which the prior position tool vector will rotate is determined based on the relationship in equation 27

$$\overrightarrow{CrossVector1} = \frac{\overrightarrow{LastToolVector} \otimes \overrightarrow{NextToolVector}}{|\overrightarrow{LastToolVector} \otimes \overrightarrow{NextToolVector}|} \quad (27)$$

and ToolVectorRotationAngle is the magnitude of the angular rotation based on the relationship in equation 28

$$ToolVectorRotationAngle = \left(\frac{|\Delta 1|}{\Delta 3}\right) * AngleLastAndNextToolVector \quad (28)$$

wherein

Δ1=ΔSingularityToLastTiltAngle=LastTiltAngle−SingularityTiltAngle

Δ2=ΔSingularityToNextTiltAngle=NextTiltAngle−SingularityTiltAngle

Δ3=ΔTotalTiltAngleTraverse=|ΔSingularityToLastTiltAngle|+|ΔSingularityToNextTiltAngle|   29-31

The tool tip position for the machine singularity position is determined based on equation 32

$$SingularityToolTip = \quad (32)$$
$$LastToolTip + \left(\frac{|\Delta 1|}{\Delta 3}\right) * (NextToolTip - LastToolTip)$$

The SingularityToolTip and SingularityToolVector define an intermediate position at the machine singularity point relative to the workpiece. The intermediate position corresponding to the machine singularity point is sent to Type 3 input in the cascade method 400. The movement from the last position to the machine singularity point may now be interpolated as discussed herein.

Rotation About Machine Singularity Point

Once the tool position is interpolated from the last position to the machine singularity position, the next step is to rotate the tool and/or the part about the machine singularity point. The number of interpolation steps to rotate the tool and/or the part about the machine singularity point is determined. In one embodiment, a measure of the chord error of the tool tip rotating about the machine's singularity point is used to determine the number of interpolation steps. In one embodiment, a fixed increment is used to determine the number of interpolation steps. An exemplary fixed increment is a fixed angular increment.

Number of Interpolation Steps—Chord Error

The perpendicular radial distance of the tool tip at the machine singularity position to the rotary axis centerline is defined as the RotaryRadialDistance. The RotaryRadialDistance is determined as discussed herein.

Figure 19:
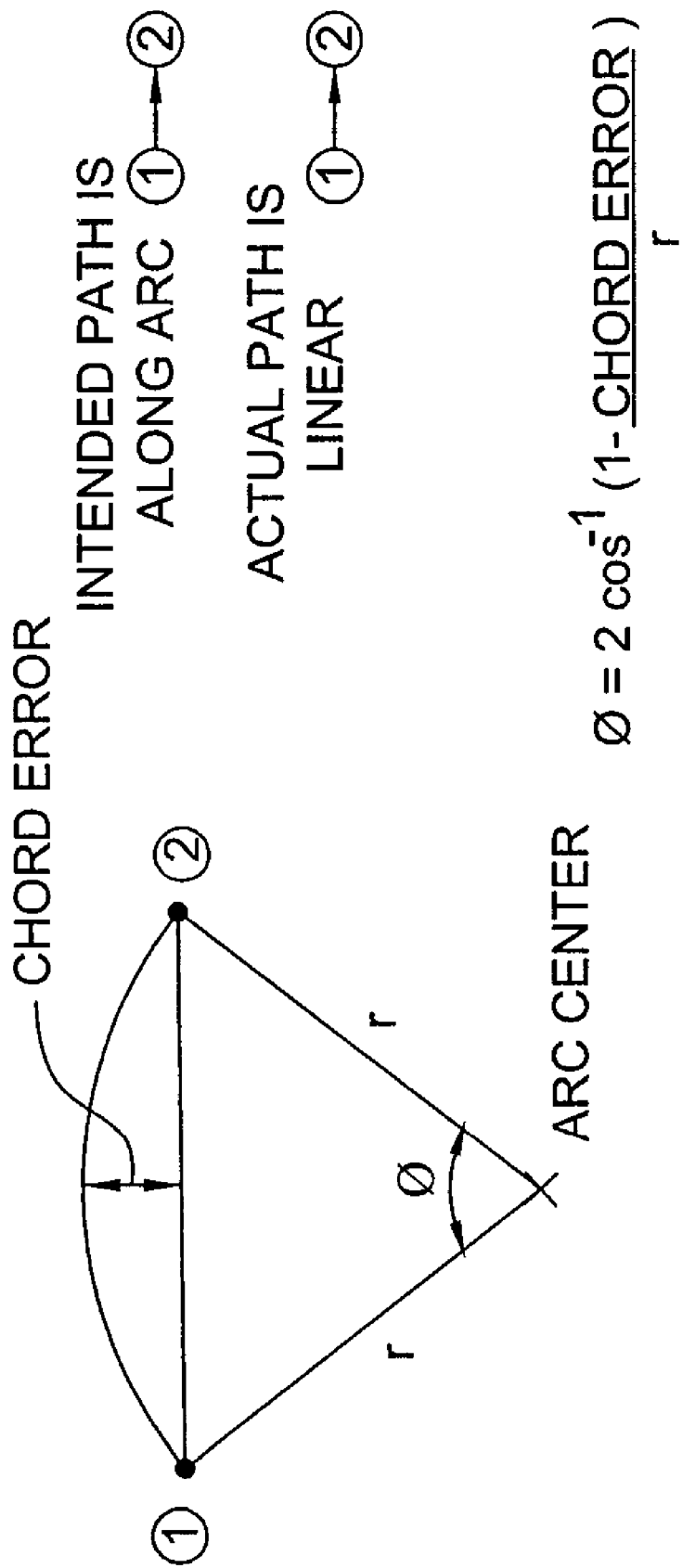
FIG. 19 represents a chord error.

The interpolation is a linear interpolation. The number of positions is determined based on a chord error tolerance 494 (see FIG. 21) received from an operator. The chord error tolerance and its relationship to the arc angle is shown in FIG. 19. The number of iterations is coupled by the following method.

Assuming the relationship provided in equation A is satisfied, (RotaryRadialDistance>0 and
RotaryRadialDistance≧ChordError and |Δ4|>0) (33)

the number of iterations is determined by equation 34

$$\text{\# Iterations} = \text{ceil}\left(\frac{\Delta 4}{2*\left(\arccos\left(1 - \frac{ChordError}{RotaryRadialDistance}\right)\right)}\right), \quad (34)$$

wherein
the ceil( ) function rounds up to the next integer;
ChordError is the operator specified tolerance;

Δ4=ShortestAngularTraverse(NextRotaryAngle−LastRotaryAngle) (35), wherein the function ShortestAngularTraverse( ) returns the angular difference between two angular positions that is less than or equal to 180 degrees. If the relationship in equation 33, is not satisfied, the interpolation method sets the number of iterations to one.

Number of Interpolation Steps—Fixed Angular Step

In one embodiment, an operator may specify the number of interpolation steps based on a fixed angular step 496, 498 (see FIG. 21). Exemplary angular steps include about every tenth of a degree. This is represented in equation 36

$$\text{\# Iterations} = \text{ceil}\left(\frac{\Delta 4}{FixedRotaryAngularStep}\right) \quad (36)$$

wherein the term FixedRotaryAngular Step corresponds to the specified angular step. Otherwise the number of iterations is set to one.

Once the number of iterations has been determined, machine tool system 100 rotates about the machine singularity point. In order to rotate about the machine singularity point one or more of the positions of the various axes are changed. For each iteration, the tilt angle is fixed to the singularity point tilt angle, the rotary angles are known, and the positions of the linear axes are determined through cascading method 400.

In one embodiment, a CurrentRotaryAngle is set equal to the prior rotary angle as represented in equation 37 and the angular step ($\theta_{step}$) is provided by equation 38.

CurrentRotaryAngle=LastPositionRotaryAngle (37)

$$\theta_{step} = \frac{\Delta 4}{\text{\# Iterations}} \quad (38)$$

It should be noted that angular step ($\theta_{step}$) is less than or equal to the FixedRotaryAngularStep specified by the operator.

Next, the rotary angular and tool tip positions for each position are determined in a loop. The Machine Singularity Position Tool Vector, Tool Tip, Tilt Angle and CurrentRotaryAngle are provided to the cascading method 400 to determine the positions of the linear axes. If all of the computed axis positions are within the machine limits, the positions are stored for output. If a position is outside of the machine limits, all of the determined positions are deleted and it is attempted to rotate about the machine singularity position in the other direction (i.e. the longer angular traverse for Δ4) of equation 35) by inverting the step angle, determining a new Δ4, and re-computing the number of iterations. The new Δ4 is determined based on the value of the previous Δ4 with the following two conditions If ($\Delta 4_{previous}$<0) then $\Delta 4_{new}=\Delta 4_{previous}+2\pi$; or If ($\Delta 4_{previous}$>0) then $\Delta 4_{new}=\Delta 4_{previous}-2\pi$.

Note that Δ4 cannot equal zero; otherwise there would be no rotation about the singularity point. If this attempt fails due to a position being outside of the machine limits, then both interpolation directions cannot be executed and the method throws an error of machine out of limits.

Finally, assuming that the rotation about the machine singularity point 490 was successful, the next position is sent through cascading method 400 and the movement from the intermediate machine singularity position to the next position is interpolated.

Interpolation from a First Position to a Second Position

At several locations throughout this disclosure, it is mentioned that a movement is interpolated from a first position, such as the last position, to a second position, such as an intermediate position at the machine singularity position. The following two stage interpolation method is an exemplary method for interpolating from a first position to a second position. The two-stage interpolation method includes a first stage whereby the tool vector is interpolated from a first tool vector 422A corresponding to the first position to a second tool vector 422B corresponding to the second position. (Refer to FIGS. 24 and 25)

Stage #1—Tool Vector Interpolation

In this stage, the tool vector is interpolated relative to the workpiece coordinate system 282 between the first position and the second position. Although a linear interpolation system is disclosed, with the object-oriented design of software controller 202, the linear interpolation system can be overloaded to use Spline, non-uniform rational B-splines (NURBS), or any other interpolation scheme. Further, this stage is an optional stage and the operator or host software application 215 may chose to simply skip stage#1 and go straight to stage#2.

For linear interpolation of the tool vector, the tool vector direction will interpolate through a plane about the coordinate system origin (see FIG. 25) between tool positions, the first position and the second position. Three exemplary interpolated tool vector positions 1.1, 1.2, and 1.3 are shown in FIGS. 24 and 25. Two exemplary methods to determine the number of interpolated steps between the two tool positions are provided.

A first exemplary method to determine the number of interpolated steps uses a fixed angular step. The operator provides a desired angular step 501 (see FIG. 21) for the tool vector between the two tool positions. The #Iterations for interpolation is determined from the relationship in equation 39:

$$\text{\# Iterations} = \text{ceil}\left(\frac{|\arccos(\overrightarrow{NextToolVector} \cdot \overrightarrow{LastToolVector})|}{MaxAngleStep}\right) \quad (39)$$

wherein
Iterations is the number of iterations;
NextToolVector is a unit vector in the direction of the second tool position tool vector;
LastToolVector is a unit vector in the direction of the first tool position tool vector; and
MaxAngleStep is the desired angular step.

Equation 39 is used if Type 3 data is provided for both of the two tool positions. If Type 4 data is provided for both of the two tool positions, the #Iterations is determined based on equations 40 and 41.

$$\text{\# IterationsSurfNormal} = \quad (40, 41)$$
$$\text{ceil}\left(\frac{|\arccos(\overrightarrow{NextSurfaceNormal} \cdot \overrightarrow{LastSurfaceNormal})|}{MaxAngleStep}\right)$$
$$\text{\# Iterations} = \max(\text{\# Iterations}, \text{\# IterationsSurfNormal})$$

wherein
IterationsSurfNormal is the number of iterations based on the surface normals;
LastSurfaceNormal is a unit vector in the direction of the surface normal for the first position;
NextSurfaceNormal is a unit vector in the direction of the surface normal for the second position; and
MaxAngleStep is the desired angular step.
The number of iterations then is chosen as the larger of the number of iterations determined in equation 39 and equation 40, as represented by equation 41.

A second exemplary method to determine the number of interpolated steps uses a desired time step. The operator provides a desired time step 503 (see FIG. 21) for the tool vector between the two tool positions. The #Iterations for interpolation is determined from the relationship in equation 42:

TimeStepFromLastToNext=GetMinTimeStepBetweenPositions
(LastPosition, NextPosition, WorkpieceRelative-
Feedrate)    (42)

wherein
TimeStepFromLastToNext is the time step from the last position to the next position specified in the part program;
LastPosition corresponds to the first position;
NextPosition corresponds to the second position; and
WorkpieceRelativeFeedrate corresponds to the feedrate of the tool tip relative to the workpiece specified in the part program.

The function GetMinTimeStepBetweenPositions determines the linear interpolation axes velocities between the two tool positions and clamps the time step and hence the feedrate to the maximum axes velocities if any of the axes maximum velocities are violated by the original feedrate. The function returns the clamped time step for the move. However, this time stamp is only an approximation of the final time step since linear interpolation of the tool vector will inevitably alter the machine axes interpolations, which may increase the time step for the computed linearly interpolated move. As the tool path interpolated positions are computed, the Type #1 position input in the Tool Position Cascade will calculate and clamp the actual final time step and feedrate for each interpolated position. Finally, the number of iterations are provided by the relationship in equation (43)

$$\text{\# Iterations} = \text{ceil}\left(\frac{TimeStepFromLastToNext}{MaxTimeStep}\right) \quad (43)$$

wherein
Iterations is the number of iterations; and
MaxTimeStep corresponds to the interpolation time step specified by an operator input parameter.

Once the number of iterations are determined, the interpolated tool vectors and corresponding interpolated tool positions are determined. Each of the interpolated tool vectors and corresponding interpolated tool positions are sent through cascade method 400 to determine the positions of each of the axes for the interpolated positions.

In one embodiment, the tool vectors and the tool positions are interpolated in the following manner. The angle between the prior position and the next interpolated position is determined by the relationship shown in equation (44).

$$AngleLastAndNextToolVector = \quad (44)$$
$$\arccos(\overrightarrow{LastToolVector} \cdot \overrightarrow{NextToolVector})$$

wherein
AngleLastAndNextToolVector is the angle between the prior position and the next interpolated position;
LastToolVector is the tool vector for the prior position; and
NextToolVector is the tool vector for the next interpolated position.

Interpolation of the Tool Vector

If (AngleLastAndNextToolVector=0) then the tool vector for the prior position and the tool vector for the next interpolated position are collinear. If (AngleLastAndNextToolVector≠0) then the tool vector for the prior position and the tool vector for the next interpolated position are not collinear.

The vector about which the prior position tool vector will rotate is determined based on the relationship in equation (45)

$$\overrightarrow{CrossVector1} = \frac{\overrightarrow{LastToolVector} \otimes \overrightarrow{NextToolVector}}{|\overrightarrow{LastToolVector} \otimes \overrightarrow{NextToolVector}|} \quad (45)$$

wherein CrossVector1 is the vector (in workpiece coordinates) about which the prior position tool vector will rotate as the tool positions are interpolated;

LastToolVector is the tool vector for the prior position; and
NextToolVector is the tool vector for the next interpolated position.

A similar exercise is completed for the surface normals, assuming Type 4 data has been provided.

$$AngleLastAndNextSurfaceNormal = \arccos\left(\frac{\overrightarrow{LastSurfaceNormal} \cdot}{\overrightarrow{NextSurfaceNormal}}\right) \quad (46)$$

wherein
AngleLastAndNextSurfaceNormal is the angle between the prior position surface normal and the next interpolated position surface normal;
LastSurfaceNormal is the surface normal for the prior position; and
NextSurfaceNormal is the surface normal for the next interpolated position.
If (AngleLastAndNextSurfaceNormal=0) then the surface normal vector for the prior position and the surface normal vector for the next interpolated position are collinear. If (AngleLastAndNextSurfaceNormal≠0) then the surface normal vector for the prior position and the surface normal vector for the next interpolated position are not collinear.
The vector about which the prior position surface normal vector will rotate is determined based on the relationship in equation (47)

$$\overrightarrow{CrossVector2} = \frac{\overrightarrow{LastSurfaceNormal} \otimes \overrightarrow{NextSurfaceNormal}}{|\overrightarrow{LastSurfaceNormal} \otimes \overrightarrow{NextSurfaceNormal}|} \quad (47)$$

wherein CrossVector2 is the vector (in workpiece coordinates) about which the prior position surface normal vector will rotate as the tool positions are interpolated;
LastSurfaceNormal is the surface normal vector for the prior position; and
NextSurfaceNormal is the surface normal vector for the next interpolated position.

Knowing CrossVector1 the interpolated tool vectors and the interpolated tool tip positions (tool bottom centers) may be determined. For each iteration wherein (AngleLastAndNextTool Vector=0) the interpolated tool vector is set equal to the tool vector of the prior position as indicated in equation 48

$$\overrightarrow{InterpolatedToolVector} = \overrightarrow{NextToolVector} \quad (48)$$

If (AngleLastAndNextToolVector≠0) for a given iteration then the interpolated tool vector is determined based on the relationship in equation 49

$$\overrightarrow{InterpolatedToolVector} = RotateAboutCrossVector \quad (49)$$
$$1(\overrightarrow{LastToolVector}, ToolVectorRotationAngle)$$

wherein
InterpolatedToolVector corresponds to the interpolated tool vector;
ToolVectorRotationAngle is the angle the tool vector is to be rotated and is determined based on the relationship in equation 50; and RotateAboutCrossVector1 is a function that rotates the LastToolVector about CrossVector1 through an angle equal to the value of ToolVectorRotationAngle.

The ToolVectorRotationAngle is determined based on the relationship in equation 50

$$ToolVectorRotationAngle = \quad (50)$$
$$\left(\frac{i}{\#\text{Iterations}}\right) * AngleLastAndNextToolVector$$

The interpolated tool tip is determined based on the relationship provided in equation (51).

$$InterpolatedToolTip = \quad (51)$$
$$LastToolTip + \left(\frac{i}{\#\text{Iterations}}\right) * (NextToolTip - LastToolTip)$$

The InterpolatedToolTip and InterpolatedToolVector correspond to the Type 3 data for the interpolated tool tip and interpolated tool vector. This data is input into cascading method 400 to determine the positions of the various axes.

In one embodiment wherein Type 4 data is provided, the surface normal vectors and the surface point positions are interpolated in the following manner. The angle between the surface normal of the prior position and the surface normal of the next interpolated position (AngleLastAndNextSurfaceNormal) is determined by the relationship shown in equation (46).

If AngleLastAndNextSurfaceNormal is equal to zero for a given iteration then the interpolated surface normal vector is set equal to the surface normal vector of the prior position as indicated in equation 52.

$$\overrightarrow{InterpolatedSurfaceNormal} = \overrightarrow{NextSurfaceNormal} \quad (52)$$

If (AngleLastAndNextSurfaceNormal≠0) for a given iteration then the interpolated surface normal vector is determined based on the relationship in equation (53)

$$\overrightarrow{InterpolatedSurfaceNormal} = RotateAboutCrossVector \quad (53)$$
$$2(\overrightarrow{LastSurfaceNormal}, SurfaceNormRotationAngle)$$

wherein
InterpolatedSurfaceNormal corresponds to the interpolated surface normal vector;
SurfaceNormalRotationAngle is the angle the surface normal vector is to be rotated and is determined based on the relationship in equation 54; and
RotateAboutCrossVector2 is a function that rotates the LastSurfaceNormal about CrossVector2 through an angle equal to the value of SurfaceNormalRotationAngle.

The SurfaceNormalRotationAngle is determined based on the relationship in equation 54

$$SurfNormalRotationAngle = \left(\frac{i}{\#Iterations}\right) * AngleLastAndNextSurfaceNormal \quad (54)$$

The interpolated surface point is determined based on the relationship provided in equation 55.

$$InerpolatedSurfacePoint = LastSurfacePoint + \left(\frac{i}{\#Iterations}\right) * (NextSurfacePoint - LastSurfacePoint) \quad (55)$$

The InterpolatedSurfacePoint and InterpolatedSurfaceNormal correspond to the Type 4 data for the interpolated surface contact point and interpolated surface normal vector. This data is input into cascading method 400 to determine the positions of the various axes.

Stage 2 Interpolation

Once the machine positions are determined through the cascading method 400, whether based on the InterpolatedToolTip and the InterpolatedToolVector or based on the InterpolatedSurfacePoint and the InterpolatedSurfaceNormal, a second interpolation stage is performed. The second stage interpolation determines whether further interpolation should be determined and is based on one of two methods (1) a tolerance method and (2) a fixed angular step method. In either interpolation method, the tool tip is interpolated in the workpiece coordinate system. Once again, although a linear interpolation system is presented, with the object-oriented design of the software controller 202, the linear interpolation system may be replaced with other exemplary interpolation systems. Exemplary interpolation systems in Spline, NURBS, or any other suitable interpolation scheme.

An exemplary tolerance based interpolation system is based on the chord error associated with the B-axis and the C-axis. The angular change in the B-axis and the C-axis are given in equations 56 and 57, respectively.

$$\Delta 5 = (NextTiltAngle - LastTiltAngle) \quad (56)$$

$$\Delta 4 = (NextRotaryAngle - LastRotaryAngle) \quad (57)$$

For the chord error tolerance method, the chord error of the tool tip moving about the rotary and tilt axes centerlines is used to compute the number of interpolation points. The maximum perpendicular radial distance from the tool tip to the C-axis for the last position and the next position is selected as represented in equation 58

$$MaxRotaryRadialDistance = max(RotaryRadialDistance1, RotaryRadialDistance2) \quad (58)$$

wherein

RotaryRadialDistance1 is the perpendicular radial distance of the tool tip to the rotary axis centerline of last position (This may be the last position computed in the Stage #1 Tool Vector interpolation method.); and RotaryRadialDistance2 is the perpendicular radial distance of the tool tip to the rotary axis centerline of next position (This may be the next position computed in the Stage #1 Tool Vector interpolation algorithm).

In a similar manner maximum perpendicular radial distance from the tool tip to the B-axis for the last position and the next position is selected as represented in equation 59

$$MaxTiltRadialDistance = max(TiltRadialDistance1, TiltRadialDistance2) \quad (59)$$

TiltRadialDistance1 is the perpendicular radial distance of the tool tip to the tilt axis centerline of last position (This may be the last position computed in the Stage #1 Tool Vector interpolation method.); and TiltRadialDistance2 is the perpendicular radial distance of the tool tip to the tilt axis centerline of last position (This may be the next position computed in the Stage #1 Tool Vector interpolation method).

The distances RotaryRadialDistance1, RotaryRadialDistance2, TiltRadialDistance1, and TiltRadialDistance2 are determined based on the method discussed herein in the section Compute Tool Tip Radial Distance to Rotational Axes Centerlines.

The interpolation is a linear interpolation within the chord error tolerance specified by the user. The chord error tolerance is represented in FIG. 19. The method determines if additional interpolations are needed or if the number of interpolations determined in Stage 1 satisfies the desired tolerance. Both the rotary axis (C-axis) and the tilt axis (B-axis) are checked.

Regarding the rotary axis, additional interpolations may be needed if the relationship in equation 60 is true.

(MaxRotaryRadialDistance>0 and
  MaxRotaryRadialDistance≧ChordError and
  |Δ4|>0) (60)

If the relationship in equation 60 is true, then the number of iterations is determined based on equation 61

$$\#RotaryIterations = ceil\left(\frac{\Delta 4}{2*\left(arccos\left(1 - \frac{ChordError}{MaxRotaryRadialDistance}\right)\right)}\right) \quad (61)$$

Otherwise, the number of iterations is set equal to 1 as represented in equation 62. By setting the number of iterations to 1, no additional interpolation is needed because the next iteration corresponds to the next position from stage 1.

$$\#RotaryIterations = 1 \quad (62)$$

Regarding the tilt axis, additional interpolations may be needed if the relationship in equation 63 is true.

(MaxTiltRadialDistance>0 and
  MaxTiltRadialDistance≧ChordError and |Δ5|>0) (63)

If the relationship in equation 63 is true, then the number of iterations is determined based on equation 64

$$\#TiltIterations = ceil\left(\frac{\Delta 5}{2*\left(arccos\left(1 - \frac{ChordError}{MaxTiltRadialDistance}\right)\right)}\right) \quad (64)$$

Otherwise, the number of iterations is set equal to 1 as represented in equation 65. By setting the number of iterations to 1, no additional interpolation is needed because the next iteration corresponds to the next position from stage 1.

$$\#TiltIterations = 1 \quad (65)$$

Assuming the number of iteration of at least one of the B-axis and C-axis is not 1, additional interpolated positions are determined. The number of iterations is the greater of the number of iterations determined for the B-axis and for the C-axis as represented by equation 66

Iterations=max(#RotaryIterations, #TiltIterations)　(66)

The change between interpolated positions are indicated by equations 67-69 and the initial positions are set to the LastPosition and the interpolated positions are determined by equations 70-72.

$\Delta\text{ToolTip}_{WP}=(\text{NextToolTip}_{WP}-\text{LastToolTip}_{WP})/\#\text{Iterations}$ (67)

$\Delta\text{RotaryAngle}=(\text{NextRotaryAngle}_{Mach}-\text{LastRotaryAngle}_{Mach})/\#\text{Iterations}$ (68)

$\Delta\text{TiltAngle}=(\text{NextTiltAngle}_{Mach}-\text{LastTiltAngle}_{Mach})/\#\text{Iterations}$ (69)

$\text{InterpolatedToolTip}_{WP}=\text{LastToolTip}_{WP}$ (70)

$\text{InterpolatedRotaryAngle}_{Mach}=\text{LastRotaryAngle}_{Mach}$ (71)

$\text{InterpolatedTiltAngle}_{Mach}=\text{LastTiltAngle}_{Mach}$ (72)

The intermediate positions are then determined by adding an additional change value from equations 67-69 to the values in equations 70-72 as represented for the first intermediate position in equations 73-75.

$\text{InterpolatedToolTip}_{WP}=\text{InterpolatedToolTip}_{WP}+\Delta\text{ToolTip}_{WP}$ (73)

$\text{InterpolatedRotaryAngle}_{Mach}=\text{InterpolatedRotaryAngle}_{Mach}+\Delta\text{RotaryAngle}$ (74)

$\text{InterpolatedTiltAngle}_{Mach}=\text{InterpolatedTiltAngle}_{Mach}+\Delta\text{TiltAngle}$ (75)

Once the interpolated positions are determined through equations 73-75, the data is provided as Type 2 input to the cascading method 400 to determine the corresponding machine positions.

An exemplary angular step based interpolation system is based on an angular step specified by the operator. Regarding the angular step, additional interpolations are needed relative to the rotary axis if the relationship in equation 76 is true.

$(|\Delta 4|>0)$ (76)

If the relationship in equation 76 is true, then the number of iterations is determined based on equation 77

$$\# RotaryIterations = \text{ceil}\left(\frac{\Delta 4}{FixedRotaryAngularStep}\right)$$ (77)

Otherwise, the number of iterations is set equal to 1 as represented in equation 78. By setting the number of iterations to 1, no additional interpolation is needed because the next iteration corresponds to the next position from stage 1 unless the tilt axis indicates the need for additional interpolation.

RotaryIterations=1　(78)

Regarding the angular step, additional interpolations are needed relative to the tilt axis if the relationship in equation 79 is true.

$(|\Delta 5|>0)$ (79)

If the relationship in equation 79 is true, then the number of iterations is determined based on equation 80

$$\# TiltIterations = \text{ceil}\left(\frac{\Delta 5}{FixedRotaryAngularStep}\right)$$ (80)

Otherwise, the number of iterations is set equal to 1 as represented in equation TT. By setting the number of iterations to 1, no additional interpolation is needed because the next iteration corresponds to the next position from stage 1 unless the rotary axis indicates the need for additional interpolation.

TiltIterations=1　(81)

Assuming the number of iteration of at least one of the B-axis and C-axis is not 1, additional interpolated positions are determined. The number of iterations is the greater of the number of iterations determined for the B-axis and for the C-axis as represented by equation 82

Iterations=max(#RotaryIterations, #TiltIterations)　(82)

The change between interpolated positions are indicated by equations 83-85 and the initial positions are set to first position from the two positions from stage 1 that are being interpolated as represented by equations 86-88.

$\Delta\text{ToolTip}_{WP}=(\text{NextToolTip}_{WP}-\text{LastToolTip}_{WP})/\#\text{Iterations}$ (83)

$\Delta\text{RotaryAngle}=(\text{NextRotaryAngle}_{Mach}-\text{LastRotaryAngle}_{Mach})/\#\text{Iterations}$ (84)

$\Delta\text{TiltAngle}=(\text{NextTiltAngle}_{Mach}-\text{LastTiltAngle}_{Mach})/\#\text{Iterations}$ (85)

$\text{InterpolatedToolTip}_{WP}=\text{LastToolTip}_{WP}$ (86)

$\text{InterpolatedRotaryAngle}_{Mach}=\text{LastRotaryAngle}_{Mach}$ (87)

$\text{InterpolatedTiltAngle}_{Mach}=\text{LastTiltAngle}_{Mach}$ (88)

The intermediate positions are then determined by adding an additional change value from equations 83-85 to the values in equations 86-88 as represented for the first intermediate position in equations 89-91.

$\text{InterpolatedToolTip}_{WP}=\text{InterpolatedToolTip}_{WP}+\Delta\text{ToolTip}_{WP}$ (89)

$\text{InterpolatedRotaryAngle}_{Mach}=\text{InterpolatedRotaryAngle}_{Mach}+\Delta\text{RotaryAngle}$ (90)

$\text{InterpolatedTiltAngle}_{Mach}=\text{InterpolatedTiltAngle}_{Mach}+\Delta\text{TiltAngle}$ (91)

Once the interpolated positions are determined through equations 89-91, the data is provided as Type 2 input to the cascading method 400 to determine the corresponding machine positions.

Compute Tool Tip Radial Distance to Rotational Axes Centerlines

This method computes the perpendicular radial distance of the tool tip to the machine's rotary and tilt axes centerlines for the current machine position stored in the axis objects. The method is used herein in the Stage 2 interpolation methods and in the interpolation about the machine singularity point.

The method incrementally transforms the tool tip relative to the spindle zero coordinate system to each axis' coordinate system. The transformation direction is from tool tip towards the workpiece coordinate system. During the incremental transformation process, when the current transformed point is in a rotational axis' coordinate system, the perpendicular radial distance is computed. In the illustrated example, the machine tool system 100 has a single tilt axis and a single rotary axis.

The current point is set equal to the tool bottom center relative to the spindle zero point as represented by equation 92

$$\text{CurrentPoint} = \text{ToolBottomCenter}_{Spindle} \quad (92)$$

The CurrentPoint is transformed through the Tool Matrix Stack from the spindle coordinate system to the machine reference coordinate system. For an ith axis, the transformation is represented by equation 93.

$$\text{CurrentPoint} = \text{ToolMatrixStack}[i] \rightarrow \text{GetMatrix}()^* \text{CurrentPoint} \quad (93)$$

As the CurrentPoint traverses the Tool Matrix Stack, each axis is checked to determine if it is a rotary or tilt axis. If the ith axis is a rotary axis then a distance from the CurrentPoint in the ith axis coordinate system to the ith axis is determined as represented by equation 94

$$\text{RotaryRadialDistance} = \text{ToolMatrixStack}[i] \rightarrow \text{GetPerpendicularDistanceToAxis}(\text{CurrentPoint}) \quad (94)$$

If the ith axis is a tilt axis then a distance from the CurrentPoint in the ith axis coordinate system to the ith axis is determined as represented by equation 95.

$$\text{TiltRadialDistance} = \text{ToolMatrixStack}[i] \rightarrow \text{GetPerpendicularDistanceToAxis}(\text{CurrentPoint}) \quad (95)$$

Once the Tool Matrix Stack is traversed, CurrentPoint holds the value of the tool tip with respect to the machine reference coordinate system. Further, in the case of machine tool system 100 TitlRadialDistance is equal to the perpendicular distance from the tool bottom center in the B-axis coordinate system to the B-axis.

Next, the Part Matrix Stack is traversed from the machine reference coordinate system towards the workpiece coordinate system stopping at the last axis (i.e. up to but not including the workpiece coordinate system). Thus, the Part Matrix Stack is traversed from bottom to top using inverse transformation matrices.

The CurrentPoint is transformed through the Part Matrix Stack from the machine reference coordinate system to the workpiece coordinate system. For an ith axis, the transformation is represented by equation 96.

$$\text{Matrix} = \text{PartMatrixStack}[i] \rightarrow \text{GetMatrix}() \, \text{Matrix.InvertRigidTransformation}()$$

$$\text{CurrentPoint} = \text{Matrix}^* \text{CurrentPoint} \quad (96)$$

As the CurrentPoint traverses the Part Matrix Stack, each axis is checked to determine if it is a rotary or tilt axis. If the ith axis is a rotary axis then a distance from the CurrentPoint in the ith axis coordinate system to the ith axis is determined as represented by equation 97

$$\text{RotaryRadialDistance} = \text{PartMatrixStack}[i] \rightarrow \text{GetPerpendicularDistanceToAxis}(\text{CurrentPoint}) \quad (97)$$

If the ith axis is a tilt axis then a distance from the CurrentPoint in the ith axis coordinate system to the ith axis is determined as represented by equation 98.

$$\text{TiltRadialDistance} = \text{PartMatrixStack}[i] \rightarrow \text{GetPerpendicularDistanceToAxis}(\text{CurrentPoint}) \quad (98)$$

Once the Part Matrix Stack is traversed, CurrentPoint holds the value of the tool tip with respect to the workpiece coordinate system.

Compute and Clamp Time Step Using Max Axes Speeds

This method checks a given TimeStep to make sure that it is not going to cause a given axis to attempt to move faster than its maximum speed. This method is used in method 430 of cascade method 400 and stage #1 time step tool vector interpolation. Further, the TimeStep results in a movement having a generally constant feedrate of the tool relative to the workpiece coordinate system as represented by equation 99.

$$\text{TimeStep} = \text{ComputeTimeStepForConstantWorkpieceFeedrate}() \quad (99)$$

The time step is then clamped if any of the axes maximum speeds are violated for the move. Each axis is checked and if multiple axis maximum speeds are violated, then the smallest time step is that is acceptable is used.

For each axis the relationship provided in equation 100 is true then the TimeStep needs to be clamped $$\text{if}\left(\frac{\Delta \text{AxisMove}}{\text{TimeStep}} > \text{Max}\text{AxisSpeed}\right) \quad (100)$$

wherein $$\Delta\text{AxisMove} = |\text{NextPosition.MachinePosition}[i] - \text{LastPosition.MachinePosition}[i]| \quad (101)$$

$$\text{MaxAxisSpeed} = \text{Axis}[i] \times \text{GetMaxSpeed}() \quad (102)$$

The value for the time step is given by equation 103.

$$\text{TimeStep} = \frac{\Delta \text{AxisMove}}{\text{Max}\text{AxisSpeed}} \quad (103)$$

Homogeneous Transformation Matrix and Matrix Stacks

The matrix stacks, such as the Tool Matrix Stack and the Part Matrix Stack, are a general method used in the Generalized Kinematics Library to concatenate multiple transformations into a single matrix. In one embodiment, for the Generalized Kinematics Library, only rotation and translation transformations are used to describe the kinematics relationship between machine axes. Using homogeneous transformations allows the Matrix Stacks to concatenate rotation and translation transformations into a single transformation matrix. Thus, when a Matrix Stack's forward or inverse transformation matrices are used for more than one computation, the multiplication of all matrices in the Matrix Stack is done only once.

A matrix stack can contain any number of matrices. A matrix stack may also have forward or inverse transformation matrices of other matrix stacks pushed onto it. A matrix stack can be turned on and off without having to pop all the matrices off the stack.

As explained in the following sections due to the nature of the matrices in the Tool Matrix Stack and the Part Matrix Stack, the calculations may be simplified. Further, due to the nature of the matrices in the Tool Matrix Stack and the Part Matrix Stack, matrix inversion of the transformation matrices used in the Generalized Kinematics Library may take advantage of the methods explained herein.

Sub-Matrix Method for Transformation Matrix Operations

The sub-matrix method reduces the execution time for matrix operations by decomposing a homogeneous geometric transformation matrix into sub-matrices and applying operations to the sub-matrices based on whether the sub-matrices are identity matrices or zero transforms.

The sub-matrix method is based on the following decision rule:

$$\text{Choose to} \begin{cases} \text{Compute,} & \Leftarrow \neg \, (\text{primitive} \cdot \text{identical} \vee \text{primitive} \cdot \text{zero}); \\ \text{Skip,} & \Leftarrow \text{otherwise.} \end{cases} \quad (104)$$

This decision rule is driven by the identity of the geometric sub-matrix. The decision-making process is based on Boolean logic, such as binary. In the decision-making process itself, the identity state of the sub-matrices are tracked to avoid computation of the identity. A 2-by-2 Boolean Decision Matrix (D), represented by equation 105, is added to the matrix class to support the decision-making and identity tracking of the following homogeneous Transformation Matrix (T) with four sub-matrices.

$$T = \begin{bmatrix} R & t \\ s^T & k \end{bmatrix} \quad (105)$$

wherein R is the rotation sub-matrix,
t is the translation matrix,
s is the shear matrix, and
k is the scaling matrix.

Each element of the 2-by-2 Boolean Decision Matrix corresponds to its counterpart of the 4-by-4 Transformation Matrix (T).

$$D = \begin{bmatrix} d_R & d_t \\ d_s & d_k \end{bmatrix} \quad (106)$$

The correspondence between the Boolean Decision Matrix and the Transformation Matrix is one-to-one as shown in FIG. 26.

Relationship of Sub-Matrices

The computational complexity of Transformation Matrix (T) multiplication can be optimized using the Boolean Decision Matrix (D).

$$T_3 = T_1 \cdot T_2 \quad (107)$$

Inserting 105 into 107 gives:

$$\begin{bmatrix} R_3 & t_3 \\ s_3^T & k_3 \end{bmatrix} = \begin{bmatrix} R_1 & t_1 \\ s_1^T & k_1 \end{bmatrix} \cdot \begin{bmatrix} R_2 & t_2 \\ s_2^T & k_2 \end{bmatrix} \quad (108)$$

Because the geometric transforms for machine tools are rigid transformations, the shear primitive is zero. Consequently, the following individual resulting sub-matrices result in an equivalent transformation that may be re-assembled into a full homogeneous transformation matrix $T_3$:
First, we have rotation sub-matrix.

$$R_3 = R_1 \cdot R_2 + t_1 \cdot s_2^T = R_1 \cdot R_2, \quad (109)$$

Next, translation sub-matrix.

$$t_3 = R_1 \cdot t_2 + t_1 \cdot k_2, \quad (110)$$

Then, shear sub-matrix.

$$s_3^T = s_1^T \cdot R_2 + k_1 \cdot s_2^T = 0^T, \quad (111)$$

Last, scaling $$k_3 = s_1^T \cdot t_2 + k_1 \cdot k_2 = k_1 \cdot k_2. \quad (112)$$

The operations of the sub-matrices are multiplications and additions, which are binary and have two operands and following properties.

Property 1. Identity operand of multiplication (i.e. value of 1) contributes the other matrix's operand directly to the resulting matrix.

Property 2. Zero operand of multiplication results in a zero in the resulting matrix.

Processes with the Sub-Matrices

The Decision Boolean Matrix m_bDefaultSubmatrix is added as a class variable of Matrix class. An element of the Decision Boolean Matrix is true only when the corresponding sub-matrix is either a zero or identity matrix. Otherwise, the element is false. A transformation matrix is initialized with zero (translation and shear) and identity (rotation and scaling) sub-matrices. Therefore, the Decision Boolean Matrix is initialized with all boolean values as true.

The following rules apply to the processes.
1. When the situation fits Property 1, the multiplication is skipped.
2. When the situation fits Property 2, the multiplication and addition are skipped.

The decision-making rule (1) is expended in the following manner for the implementation of skipping operations:
1. $R_3 = R_2$ if $d_{R1} = $ true.
2. $R_3 = R_1$ if $d_{R2} = $ true.
3. Skip $R_1 \cdot t_2$ if $d_{R1} = $ true.
4. Skip addition if $d_{t1} = $ true or $d_{t2} = $ true.

The Boolean Decision Matrix is then updated. When multiplication of matrix elements must be executed, then both elements are checked for the following conditions:
If either element is zero, no multiplication is performed on the elements.
If either element is equal to one, no multiplication is performed. The element operation returns the element not equal to one.

Similar optimizations using the Boolean Decision Matrix are implemented for matrix addition, subtraction, and multiplication with vectors and points.

Transformation Matrix Inversion

General matrices are inverted using computationally expensive Gauss-Jordan elimination, LU decomposition or other similar methods. The properties of a rigid transformation matrix with an orthogonal rotational sub-matrix allow it to be inverted by applying simple operations to the individual transformation sub-matrices instead of using the more computationally expensive methods. The following equations show the matrix inversion optimization as described in I. Zeid, "CAD/CAM Theory and Practice", McGraw-Hill, 1991, the disclosure of which is expressly incorporated by reference:

$$T_2 = T_1^{-1} \quad (113)$$

Inserting 105 into 113 gives:

$$\begin{bmatrix} R_2 & t_2 \\ s_2^T & k_2 \end{bmatrix} = \begin{bmatrix} R_1 & t_1 \\ s_1^T & k_1 \end{bmatrix}^{-1} \quad (114)$$

wherein $$R_2 = T_1^T \quad (115)$$

$$t_2 = -R_2 \cdot t_1 \quad (116)$$

$$s_2^T = s_1^T = [0 \; 0 \; 0] \quad (117)$$

$$k_2 = k_1 = 1 \quad (118)$$

Determination of Part Setup Matrix

The Part Setup Matrix defines the transformation from the last axis coordinate system in the Part Kinematics chain to the workpiece coordinate system for the part on the machine. The input to compute the Part Setup Matrix is the machine axes positions relative to the machine reference coordinate system for the part setup and the probe or tool length used when determining the machine axes positions for the part setup. Knowing the kinematics relationships between all the axes of the machine, the Part Setup Matrix may be determined in the following manner.

Let the Part Setup Matrix be a 4×4 identity matrix in the Part Matrix Stack for the following calculations.

$$\text{WorkpieceZero}_{TableLastAxis} = \text{PartMatrixStack.InverseMatrix} \\ ()|_{PartSetupPositions} * \text{ToolMatrixStack.ForwardMatrix} \\ ()|_{PartSetupPositions} * \text{ToolTipTransformMatrix} \quad (119)$$

$* [0\ 0\ 0\ 1]^T$ wherein

PartMatrixStack.InverseMatrix( )|ZeroCalibration is the Part Matrix Stack inverse transformation matrix evaluated when all part axes are set to their Part Setup Axes Positions. (120)

ToolMatrixStack.ForwardMatrix( )|PartSetupPositions is the Tool Matrix Stack forward transformation matrix stack evaluated when all tool axes are set to their Part Setup Axes Positions. (121)

ToolTipTransformMatrix is the transformation from the tool tip coordinate system to the Spindle Axis coordinate system. It is a simple translation matrix containing the offset of the tool tip relative to the Spindle Axis coordinate system.

Any point in the workpiece coordinate system may be defined relative to the table last axis by:

$$\text{WorkpiecePoint}_{TableLastAxis} = \text{PartMatrixStack.InverseMatrix} \\ ()|_{PartSetupPositions} * \text{ToolMatrixStack.ForwardMatrix} \\ ()|_{PartSetupPositions} * \text{ToolTipTransformatrix} * \\ \text{WorkpiecePoint}_{Workpiece}$$

Therefore, the Part Setup Matrix may be determined with the following equation, noting that the Part Setup Matrix in the Part Matrix Stack is a 4×4 Identity matrix.

$$\text{PartSetupMatrix} = \text{PartMatrixStack.InverseMatrix} \\ ()|_{PartSetupPositions} * \text{ToolMatrixStack.ForwardMatrix} \\ ()|_{PartSetupPositions} * \text{ToolTipTransformMatrix}$$

The new Part Setup Matrix is then pushed onto the top of the Part Matrix Stack.

It should be noted that all of the surface normal vectors and tool vectors referenced herein are assumed to be normalized for the methods disclosed herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method for controlling a movement of a plurality of moveable axes of a machine tool system to machine a part, the method comprising the steps of:
   contacting the part with a tool, the tool being used to remove material from the part; and
   moving the tool relative to the part from a first position to a second position along a trajectory while the tool remains in contact with the part, the tool interpolating through a machine singularity point of the machine tool system by determining a plurality of interpolated tool positions having both a point corresponding to a location of the tool relative to the part and a direction corresponding to an orientation of the tool relative to the part, the plurality of interpolated tool positions being used to determine machine positions for the plurality of moveable axes at each of the plurality of interpolated tool positions.

2. The method of claim 1, wherein the step of moving the tool from the first position to the second position while the tool remains in contact with the part comprises the steps of:
   moving the tool relative to the part from the first position to an intermediate position generally aligned with the machine singularity point;
   rotating about the intermediate position; and
   moving the tool relative to the part from the intermediate position to the second position.

3. The method of claim 2, wherein the tool remains stationary relative to the part during the step of rotating about the intermediate position.

4. The method of claim 2, wherein the step of rotating about the intermediate position comprises the steps of:
   determining an angular rotation; and
   rotating through the angular rotation at a plurality of positions, the plurality of positions being within a tolerance.

5. The method of claim 2, wherein the step of rotating about the intermediate position comprises the steps of:
   determining an angular rotation; and
   rotating through the angular rotation at a plurality of positions, the plurality of positions corresponding to a fixed angular step.

6. The method of claim 2; wherein the step of moving the tool relative to the part from the first position to the intermediate position comprises the steps of:
   determining the intermediate position; and
   interpolating a plurality of positions between the first position and the intermediate position.

7. The method of claim 6, wherein the step of interpolating the plurality of positions between the first position and the intermediate position includes the steps of:
   determining a plurality of vectors and a corresponding plurality of points from a first vector corresponding to the first position and a second vector corresponding to the intermediate position, each of the plurality of vectors and corresponding points correspond to an interpolated position; and
   determining if a tolerance condition is violated between adjacent interpolated positions and determining additional interpolated positions if the tolerance condition is violated.

8. The method of claim 7, wherein a number of the plurality of vectors is determined based on a fixed angular step.

9. The method of claim 7, wherein a number of the plurality of vectors is determined based on a fixed time step.

10. The method of claim 7, wherein the plurality of vectors are each tool vectors.

11. The method of claim 7, wherein the plurality of vectors are each surface normal vectors.

12. The method of claim 7, wherein the tolerance condition is a chord error.

13. A method for determining position information for a plurality of moveable axes of a machine tool system to machine a part, the method comprising the steps of:

providing a cascading method accepting a plurality of different tool position input types;
receiving a first tool position, the first tool position corresponding to one of the plurality of different input types; and
determining with the cascading method the positional information based on the received first tool position.

14. The method of claim 13, wherein the positional information for each rotatable axis is determined through an inverse kinematics operation and the positional information for each linear axis is determined through a forward kinematics operation.

15. The method of claim 13, further comprising the step of moving the plurality of moveable axes based on the positional information determined with the cascading method.

16. The method of claim 13, wherein the step of determining with the cascading method the positional information includes the steps of:
determining a first solution having a corresponding angle for each rotatable axis of the plurality of moveable axis; and
determining a position for each linear axis of the plurality of moveable axis.

17. The method of claim 13, wherein the first tool position includes a surface contact point, a surface normal vector at the surface contact point, and a tool vector and the step of determining with the cascading method the positional information includes the steps of:
determining a tool bottom center point based on the surface contact point, the surface normal vector at the surface contact point, and the tool vector;
determining for each rotary axis of the plurality of moveable axes an angle based on the tool bottom center and the tool vector; and
determining for each linear axis of the plurality of moveable axes a position.

18. The method of claim 13, wherein the first tool position includes a tool bottom center point and a tool vector and the step of determining with the cascading method the positional information includes the steps of:
determining for each rotary axis of the plurality of moveable axes an angle based on the tool bottom center and the tool vector; and
determining for each linear axis of the plurality of moveable axes a position.

19. The method of claim 13, wherein a first tool position input type is determinable from a second tool position input type through a first method of the cascading method, the second tool position input type is determinable from a third tool position input type through a second method of the cascading method, and the third tool position input type is determinable from a fourth tool position input type through a third method of the cascading method.

20. The method of claim 19, wherein the cascading method determines the positional information in the first tool position input type from any other of the plurality of different tool position input types.

21. A method for controlling a movement of a machine tool system to machine a part, the machine tool system having a plurality of rotatable axes, the method comprising the steps of:
contacting the part with a tool at a first position;
identifying a second position to move the tool; and
selecting a shortest angular traverse solution for each of the plurality of rotatable axes from a plurality of possible solutions for each of the plurality of rotatable axes.

22. A method for controlling a movement of a machine tool system to machine a part, the machine tool system having a plurality of rotatable axes including a tilt axis, the method comprising the steps of:
contacting the part with a tool at a first position;
identifying a second position to move the tool;
selecting a first solution for each of the plurality of rotatable axes from a plurality of possible solutions for each of the plurality of rotatable axes based on a specified tilt axis preference, the first solution having a tilt angle for the tilt axis which satisfies the tilt axis preference for a tilt axis of the plurality of rotatable axes; and
moving the tool relative to the part from the first position to the second position and rotating the plurality of rotatable axes according to the first solution.

23. A method for controlling a movement of a machine tool system to machine a part, the machine tool system having a plurality of moveable axes, the method comprising the steps of:
contacting the part with a tool at a first position;
identifying a second position to move the tool; and
determining a plurality of interpolated positions from the first position to the second position with a two stage interpolation method.

24. The method of claim 23, wherein the two-stage interpolation method includes a first stage which determines a first plurality of the interpolated positions and a second stage having a tolerance condition, a second plurality of the interpolated positions being determined by the second stage due to a violation of the tolerance condition.

25. A machine tool system for machining a part with at least one tool, the apparatus comprising:
a frame;
a moveable support supported by and moveable relative to the frame, the moveable support supporting the part;
a machine tool spindle supported by the frame and moveable relative to the part, the machine tool spindle adapted to couple the at least one tool, the moveable support and the machine tool spindle including a plurality of moveable axes, the machine tool spindle being moveable independent of the moveable support; and
a motion control system operably coupled to the machine tool spindle and the moveable support, the motion control system executing the machining of the part through a controlled movement of the plurality of moveable axes of the machine tool spindle and the moveable support, wherein the motion control system contacts the part with a first tool at a first position and moves the first tool relative to the part from the first position to a second position while the first tool remains in contact with the part, the first tool interpolating through a machine singularity point of the machine tool system.

26. The machine tool system of claim 25, wherein the motion control system moves the first tool from the first position to the second position while the first tool remains in contact with the part by moving the first tool relative to the part from the first position to an intermediate position generally aligned with the machine singularity point; rotating about the intermediate position; and moving the first tool relative to the part from the intermediate position to the second position.

27. An apparatus for machining a part with at least one tool, the apparatus comprising:
a frame;
a moveable support supported by and moveable relative to the frame, the moveable support supporting the part;
a machine tool spindle supported by the frame and moveable relative to the part, the machine tool spindle adapted to couple the at least one tool, the moveable support and the machine tool spindle including a plurality of moveable axes; and a motion control system operably coupled to the machine tool spindle and the moveable support, the motion control system executing the machining of the part through a controlled movement of the plurality of moveable axes of the machine tool spindle and the moveable support, wherein the motion control system contacts the part with a first tool at a first position and moves the first tool relative to the part from the first position to a second position by selecting a shortest angular traverse solution for each of a plurality of rotatable axes of the plurality of moveable axes from a plurality of possible solutions for each of the plurality of rotatable axes.

28. An apparatus for machining a part with at least one tool, the apparatus comprising:

a frame;

a moveable support supported by and moveable relative to the frame, the moveable support supporting the part;

a machine tool spindle supported by the frame and moveable relative to the part, the machine tool spindle adapted to couple the at least one tool, the moveable support and the machine tool spindle including a plurality of moveable axes; and a motion control system operably coupled to the machine tool spindle and the moveable support, the motion control system executing the machining of the part through a controlled movement of the plurality of moveable axes of the machine tool spindle and the moveable support, wherein the motion control system contacts the part with a first tool at a first position and moves the first tool relative to the part from the first position to a second position by selecting a first solution for each of a plurality of rotatable axes of the plurality of moveable axes from a plurality of possible solutions for each of the plurality of rotatable axes based on a specified tilt axis preference, the first solution having a tilt angle which satisfies the tilt axis preference for a tilt axis of the plurality of the moveable axes.

29. An apparatus for machining a part with at least one tool, the apparatus comprising:

a frame;

a moveable support supported by and moveable relative to the frame, the moveable support supporting the part;

a machine tool spindle supported by the frame and moveable relative to the part, the machine tool spindle adapted to couple the at least one tool, the moveable support and the machine tool spindle including a plurality of moveable axes; and a motion control system operably coupled to the machine tool spindle and the moveable support, the motion control system executing the machining of the part through a controlled movement of the plurality of moveable axes of the machine tool spindle and the moveable support, wherein the motion control system contacts the part with a first tool at a first position and moves the first tool relative to the part from the first position to a second position by determining a plurality of interpolated positions from the first position to the second position with a two stage interpolation method.

30. The apparatus of claim 29, wherein the two-stage interpolation method includes a first stage which determines a first plurality of the interpolated positions and a second stage having a tolerance condition, a second plurality of the interpolated positions being determined by the second stage due to a violation of the tolerance condition.

* * * * *